US007992614B2

(12) United States Patent
Yamada et al.

(10) Patent No.: US 7,992,614 B2
(45) Date of Patent: Aug. 9, 2011

(54) HORIZONTAL HOTPRESS SYSTEM

(75) Inventors: Reiji Yamada, Aichi (JP); Yasuyuki Ohdaira, Aichi (JP); Fumio Kurita, Aichi (JP); Mineo Masuda, Aichi (JP)

(73) Assignee: Taihei Machinery Works, Aichi (JP)

( * ) Notice: Subject to any disclaimer, the term of this patent is extended or adjusted under 35 U.S.C. 154(b) by 0 days.

(21) Appl. No.: 13/000,074

(22) PCT Filed: Jul. 15, 2009

(86) PCT No.: PCT/JP2009/062799
§ 371 (c)(1),
(2), (4) Date: Dec. 20, 2010

(87) PCT Pub. No.: WO2010/008018
PCT Pub. Date: Jan. 21, 2010

(65) Prior Publication Data
US 2011/0120654 A1 May 26, 2011

(30) Foreign Application Priority Data
Jul. 16, 2008 (JP) ................................ 2008-185283
Jul. 16, 2008 (JP) ................................ 2008-185284

(51) Int. Cl.
*B32B 37/00* (2006.01)

(52) U.S. Cl. ..... 156/358; 156/368; 156/580; 156/583.1; 100/194

(58) Field of Classification Search .................. 156/358, 156/367, 368, 580, 581, 583.1; 700/301; 100/43, 46, 315, 193, 194, 258 A, 258 R
See application file for complete search history.

(56) References Cited

U.S. PATENT DOCUMENTS 3,826,601 A * 7/1974 Hutter .......................... 425/338
4,222,724 A * 9/1980 van Hullen .................. 425/141
4,846,925 A * 7/1989 Ishida et al. .............. 156/583.1
6,550,377 B2 * 4/2003 Urano .......................... 100/194
6,598,520 B2 * 7/2003 Kono ............................ 100/325

FOREIGN PATENT DOCUMENTS

JP 61-102201 A 5/1986
JP 3-39444 B2 6/1991
JP 3-74163 B2 11/1991
JP 3-77761 B2 12/1991
JP 4-40120 B2 7/1992
JP 2007-313864 A 12/2007

OTHER PUBLICATIONS

The International Search Report (JP) dated Oct. 20, 2009 with an English translation.
Office Action dated Oct. 15, 2009 of corresponding JP application JP2008-185284.

* cited by examiner

*Primary Examiner* — James Sells
(74) *Attorney, Agent, or Firm* — Thomas, Kayden, Horstemeyer & Risley, LLP

(57) ABSTRACT

A horizontal hotpress system is provided, which can maintain the thickness of the boards (laminated boards) after hot-pressing within the allowable range, by driving and controlling the press cylinders individually, even when, for example, the size or material of the boards changes. Also, A horizontal hotpress system is provided, which can maintain the thickness of the boards (laminated boards) after hot-pressing within the allowable range, by driving and controlling the press cylinders individually or jointly without adjusting the pressing positions of the press cylinders, even when, for example, the size or material of the boards changes, and further, being able to adapt to change of the material of the boards or the like.

22 Claims, 34 Drawing Sheets

HORIZONTAL HOTPRESS SYSTEM

CROSS REFERENCE TO RELATED APPLICATION

This application is the 35 U.S.C. §371 national stage of PCT application PCT/JP2009/062799, filed Jul. 15, 2009, with Japanese Patent Office claiming priority of Japanese Patent Application 2008-185283 filed on Jul. 16, 2008 and Japanese Patent Application 2008-185284 filed on Jul. 16, 2008, herein incorporated by reference in its entirety.

BACKGROUND OF THE INVENTION

1. Field of the Invention

This invention relates to a horizontal hotpress system for hot-pressing boards.

2. Description of the Related Art

Regarding a horizontal hotpress system (hotpress) for hot-pressing boards (boards-to-be-processed) such as plywood, decorative sheets and veneers, so as to form them to have a predetermined thickness, the horizontal system is known, which sends a plurality of boards in a standing state between a plurality of hot plates disposed, and hot-presses them by driving at least one of press plates disposed at the both outer sides. This horizontal system (horizontal hotpress) has an advantage of less likely causing unevenness by forming (unevenness of thickness) influenced by the weight of the boards or hot plates themselves, compared to the vertical method (vertical hotpress) which vertically and alternately piles up boards and hot plates held horizontally to be hot-pressed.

Further, this horizontal hotpress generally sends the boards to a press system, having one long side (lower side) of the rectangular boards as a conveying reference plane, and orients the pressing positions of two press cylinders (hydraulic cylinders) disposed in a long side direction of the rectangular boards (horizontally) to a center position of a short side (vertically) of the boards, so as to be hot-pressed. However the size of boards varies nowadays, not only conventionally general so-called 6-shaku boards (approximately 6 feet (1.8 m)×3 feet (0.9 m)), but also so-called 8-shaku (approximately 8 feet (2.4 m)×4 feet (1.2 m)) and so-called 10-shaku (approximately 10 feet (3 m)×5 feet (1.5 m)) are widely available.

As described above, when the size of boards being fed changes, the pressing positions of the press cylinders to the boards change, and inclination of the board increases, so as to possibly result in partial unevenness of the thickness after hot-pressing. Therefore, conventionally according to the size of the board being fed, the pressing positions of the press cylinders have been hitherto controlled to shift (elevated) to the pressing surfaces of the press plates by a control-to-shift feature□e.g. an elevating hydraulic cylinder□so as to prevent the relative pressing positions of the press cylinders to the boards from shifting (Referred to Patent Document 1).

RELATED ART DOCUMENT

[Patent Document 1] Japanese Laid-Open Patent Publication No. 2007-313864

According to Patent Document 1, variation of the board size can be dealt to some extent by controlling to shift the pressing positions of the press cylinders to the press plates (press surfaces). However, controlling to shift of the press cylinders to the press plates (press surfaces) is only limited to one direction (usually vertical) because of its structure, thus it is difficult to adjust (equalize) the thickness precisely, and especially the thickness of the rectangular boards at the corners can be uneven easily.

Also, the boards have a variety of sizes as well as different characteristics depending on their materials (wood material). For example, regarding boards being hard and having relatively high elasticity and repulsive force (hard boards) such as zelkova, lauan or the like, they can be easily inclined and their thickness can be easily uneven due to bounce phenomenon (spring-back) by repulsion. On the other hand, regarding boards made of a soft material and having relatively low elasticity and repulsive force (soft boards) such as cedar, paulownia or the like, their thickness can be easily decreased by pressing, and the thickness after hot-pressing can be easily decreased partially (especially at the cylinder pressing positions) more than specified, even with the specified applied pressure. Accordingly, these differences by the board sizes and materials cannot be dealt fully only with the pressing position control-to-shift feature of the press cylinders, and the laminated board, which is the board after hot-pressing, could easily have unevenness in thickness due to inclination occurrence, irregular thickness at the cylinder pressing positions or the like.

SUMMARY OF THE INVENTION

Problems to be Solved by the Invention

The first problem of this invention is to provide a horizontal hotpress system which can maintain thickness of the boards (laminated boards) after hot-pressing within the allowable size range, by controlling drive of a plurality of the press cylinders individually, even when the size or material of the fed boards changes.

Also, the second problem of this invention is to provide a horizontal hotpress system which can maintain thickness of the boards (laminated boards) after hot-pressing within the allowable size range, and further can deal with variation of the board materials or the like, by controlling drive of a plurality of the press cylinders individually or jointly, without controlling to shift the pressing positions of the press cylinders when, for example, the fed board size changes.

Means of Solving the Problems and Advantageous Effects of the Invention

In order to solve the above problems, a horizontal hotpress system of the first invention manufactures a plurality of wooden laminated boards all at once, by constructing an object-to-be-processed by sending stacked boards of veneers applied adhesive on bonding surfaces respectively in a standing position between a plurality of hot plates, so as to be superposed in a thickness direction, and hot-pressing the boards by pressing from outside in a superposition direction of the object-to-be-processed, and further comprising;

- a plurality of press cylinders disposed at a plurality of positions different from each other to board surfaces of the boards, and pressing the object-to-be-processed from a superposition direction respectively; and
- a cylinder controller of controlling each drive of a plurality of the press cylinders individually.

More specifically, it manufactures a plurality of wooden laminated boards all at once, by constructing an object-to-be-processed by sending stacked boards of veneers applied adhesive on bonding surfaces respectively in a standing position between a plurality of hot plates disposed, so as to be superposed in a thickness direction, and hot-pressing the boards by driving at least one of press plates disposed on both outer sides in a superposition direction of the object-to-be-processed, and further comprising;

a plurality of press cylinders disposed at a plurality of positions different from each other to a pressing surfaces of the press plates, and pressing the object-to-be-processed from a superposition direction respectively by driving the press plates; and a cylinder controller of controlling each drive of a plurality of the press cylinders individually.

Further, in order to solve the above problems, a horizontal hotpress system of the first invention in a specific mode manufactures a plurality of wooden laminated boards all at once, by constructing an object-to-be-processed by sending stacked rectangular boards, having a longer side thereof as a conveying reference plane, of veneers applied adhesive on bonding surfaces respectively in a standing position between a plurality of hot plates disposed, so as to be superposed in a thickness direction, and hot-pressing the boards by driving at least one of press plates disposed on both outer sides in a superposition direction of the object-to-be-processed, and further comprising;

a opening-closing cylinder disposed near center on pressing surfaces of the press plates, and opening and closing the press plates according to moving away and closer to each other thereof;

a plurality of press cylinders disposed at a plurality of positions different from each other to the pressing surfaces of the press plates in order to surround the opening-closing cylinder (radially), and pressing the object-to-be-processed from a superposition direction respectively by driving the press plates; and a cylinder controller of controlling each drive of a plurality of the press cylinders individually.

These horizontal hotpress systems can maintain the board (laminated board) thickness within the allowable size range after hot-pressing, by controlling drive of a plurality of the press cylinders (e.g. four hydraulic cylinders (fluid pressure cylinders)) individually, even when the size or material of the board being fed varies. Also, Not thickness of each board (laminated boards) after hot-pressing, but entire thickness of the object-to-be-processed (the boards and the hot plates) can be detected by the driven distances of the press cylinders, and then time consumed for detection can be reduced. Accordingly, uneven thickness caused by the board inclination due to delay of control or irregular thickness due to delay of arrest of the press cylinder can be prevented.

Moreover, when a opening-closing cylinder (e.g. a hydraulic cylinder (fluid pressure cylinder)) exclusively for opening and closing the press plates is provided other than the press cylinders, the opening-closing cylinder, which requires high speed shifting in a long span, and the press cylinder, which requires fine shifting in a short span can be used selectively. Therefore, acceleration of opening-closing movement of the press plates improves operation efficiency of the hot-press, and also drive control of the press cylinders can be conducted highly accurately without influence of opening-closing movement of the press plates.

Further, a plurality of the press cylinders are disposed surrounding the opening-closing cylinder (radially) to the pressing surfaces of the press plates. Because of this, even when a plurality of the press cylinders are driven to press concurrently to the press plates, inclination to the boards (that is the press plates) less likely occurs. For example, when a plurality of the press cylinders are disposed to be positioned line-symmetrically and/or point-symmetrically to each other in respect to the opening-closing cylinder, driven pressures of the press cylinders act on the press plates concurrently and equally.

Also, a plurality of the press cylinders may be fixed styled having s fixed pressing position, mobile styled being able to shift (elevate) a pressing position to a direction intersecting (orthogonal) the sending direction of the boards (e.g. vertically), or combined styled of combining the both. In this regard, when a plurality of the cylinders are fixed styled partially or entirely, the pressing position control-to-shift features of the press cylinders can be simplified.

Further, a plurality of the press cylinders can be disposed dispersively to be aligned to a plurality of lines (e.g. two lines), having the pressing positions to the board surfaces of the boards (the pressing surfaces of the press plates) along the conveying reference plane. In this way, by aligning a plurality of the press cylinders to a plurality of lines along the conveying reference plane, driven pressures and driven distances for the press cylinders can be set commonly for the press cylinder family aligned on the same line having the same distance from the conveying reference plane, and thus the pressing control can be achieved smoothly.

Then, the cylinder controller comprises;

distance detecting means of detecting driven distances respectively when a plurality of the press cylinders press the object-to-be-processed; and pressure detecting means of detecting driven pressures applied to a plurality of the press cylinders respectively, and desirably controlling drive of the respective press cylinders individually so as to closely achieve equal driven distances of the respective press cylinders detected by the distance detecting means without unevenness within a predetermined setting range, in order to have thickness of the object-to-be-processed within the allowable size range after hot-pressing.

As described above, driven pressures applied to the respective press cylinders and driven distances of the respective press cylinders are detected and controlled individually for the respective press cylinders, and thus drive of each press cylinder can be individually controlled directly based on the detected values (the driven pressure and the driven distance) obtained from each press cylinder, so as to achieve simplification and acceleration of the control. Further, as a pressure detecting means of detecting driven pressure applied the press cylinders, for example, a pressure censor, which detects cylinder inner pressure of the press cylinder, can be used. Also, as a distance detecting means of detecting driven distance of the press cylinder, for example, a linear encoder, which detects ram travel distance of the press cylinder, can be used.

Regarding this horizontal hotpress system, for example, in a case of boards made of a hard material and high elasticity and repulsive force (hard board), the cylinder controller can stop drive of pressing of a plurality of the press cylinders, when the driven pressures of the respective press cylinder are reached to a predetermined target range along drive of pressing of a plurality of the press cylinder, if the driven distances of the respective press cylinders detected by the distance detecting means are within the setting range, and also being within an even range regarded as even without unevenness.

Specifically, the cylinder controller can stop drive for pressing a plurality of the press cylinders, when the driven pressures of the respective press cylinder are reached to a predetermined target range along drive for pressing a plurality of the press cylinder, if the driven distances of the respective press cylinders detected by the distance detecting means are within the predetermined setting range, and also being within an even range regarded as even without unevenness, whereas, when any driven distances of the press cylinders are not within the even range, the driven pressure of the corresponding press cylinder can be increased or decreased by reducing an upper limit of raising a lower limit of the target range of the driven pressure of the press cylinder.

Regarding boards made of a hard material and having relatively high elasticity and repulsive force (hard board) such as zelkova, lauan or the like, the boards can be easily inclined due to bounce phenomenon (spring-back) by repulsion. Therefore, firstly when the driven pressures of the respective press cylinders are reached within the target range, if the driven distances of the respective press cylinders are within the setting range and also within the even range then, it is considered that inclination of the board is 0 or very small, and thus drive of the press cylinders is stopped to press. On the other hand, if any driven distances of the press cylinders are not within the even range, it is considered that inclination to be corrected (reduced) occurs on the boards, and thus the driven pressure of the corresponding press cylinder is increased (or decreased) by extending upper and lower limits of the target range of the driven pressures of the press cylinders to the allowable range. Accordingly, drive of the press cylinders are controlled individually focusing on the pressure, when the boards are temporally inclined especially due to bounce phenomenon of the hard boards, inclination of the boards can be corrected (reduced) on the process of accomplishing the entire thickness of the object-to-be-processed (the boards and the hot plates) to be a predetermined allowable size, so as to suppress occurrence of the irregular products and to improve the production yield.

On the other hand, for example, in a case of boards made of a soft material and having low elasticity and repulsive force (soft boards), the cylinder controller can stop drive of pressing of a plurality of the press cylinders, when the driven distances of the respective press cylinder are reached to the setting range along drive of pressing of a plurality of the press cylinder, if the driven pressures of the respective press cylinders detected by the pressure detecting means are within a predetermined target range, and also being within an even range regarded as even without unevenness.

Specifically, the cylinder controller can stop drive of pressing of a plurality of the press cylinders, when the driven distances of the respective press cylinder are reached to a lower limit of the setting range along drive of pressing of a plurality of the press cylinder, if the driven pressures of the respective press cylinders detected by the pressure detecting means are equal to a upper limit of the predetermined target range or less, and also being within an even range regarded as even without unevenness, whereas, when any driven distances of the press cylinders are not within the even range and, if the driven distance of the corresponding press cylinder is equal to the upper limit of the predetermined setting range or less, the driven pressure can be increased.

Regarding boards made of a soft material and having low elasticity and repulsive force (soft boards) such as cedar, paulownia or the like, their thickness can be easily decreased by pressing, and the thickness after hot-pressing can be easily decreased partially (especially at the cylinder pressing positions) more than specified even with the specified applied pressure. Therefore, firstly when the driven distances of the respective press cylinders are reached to (the lower limit of) the target range, if the driven pressures of the respective press cylinders are within the predetermined target range (equal to the upper limit of the target range or less) and also the driven distances of the respective press cylinders are within the even range, it is considered that inclination of the boards is 0 or very small, and thus drive of the press cylinders is stopped to press. On the other hand, if any driven distances of the press cylinders are not within the even range, it is considered that inclination to be corrected (reduced) occurs on the boards, and thus if the driven distance of the corresponding press cylinder is equal to the upper limit of the setting range or less, the driven pressure is increased. Accordingly, drives of the press cylinders are controlled individually focusing on the distance, thus occurrence of excessive pressing to especially soft boards can be prevented, and inclination of the boards can be corrected (reduced) on the process of accomplishing the entire thickness of the object-to-be-processed (the boards and the hot plates) to be a predetermined allowable size, so as to suppress occurrence of the irregular products and to improve the production yield.

By the way, it can be determined if driven distances of the press cylinders are within the even range or not, by difference level of the driven distances of the respective press cylinders detected by the distance detecting means, or inclination level of the boards calculated with the detected values of the driven distances.

Herewith, on the process of accomplishing the entire thickness of the object-to-be-processed (the boards and the hot plates) to be a predetermined allowable size, inclination of the boards can be corrected (reduced) promptly, by obtaining difference of the driven distances or inclination of the board from the detected values of the driven distances of the respective press cylinder, and determining if the driven distances are within the even range or not, so that occurrence of the irregular products can be suppressed and the production yield can be improved significantly. Also, in a case of determining if the drive differences are within the even range or not with difference level of the driven distances, the differences of the driven distances (the maximum allowable width; e.g. 20 mm) to be used for determination is usually set smaller (e.g. ½) than the width of the setting range of the driven distance (the maximum allowable width; e.g. 40 mm=+−20 mm).

Next, in order to solve the above problems, a horizontal hotpress system of the second invention manufactures a plurality of wooden laminated boards all at once, by constructing an object-to-be-processed by sending stacked rectangular boards, having a longer side thereof as a conveying reference plane, of veneers applied adhesive on bonding surfaces respectively in a standing position between a plurality of hot plates disposed, so as to be superposed in a thickness direction, and hot-pressing the boards by pressing from outside in a superposition direction of the object-to-be-processed, and further comprising;

a plurality of press cylinders disposed at a plurality of positions different from each other to board surfaces of the boards, and pressing the object-to-be-processed from a superposition direction individually; and a cylinder controller of controlling each drive of a plurality of the press cylinders individually or jointly, wherein at least a press cylinder disposed closer to the conveying reference plane of the boards of a plurality of the press cylinders has a fixed pressing position to the board surfaces of the boards (constructing fixed press cylinders).

More specifically, it manufactures a plurality of wooden laminated boards all at once, by constructing an object-to-be-processed by sending stacked rectangular boards, having a longer side thereof as a conveying reference plane, of veneers applied adhesive on bonding surfaces respectively in a standing position between a plurality of hot plates disposed, so as to be superposed in a thickness direction, and hot-pressing the boards by driving at least one of press plates disposed on both outer sides in a superposition direction of the object-to-be-processed, and further comprising;

a plurality of press cylinders disposed at a plurality of positions different from each other to a pressing surfaces of the press plates, and pressing the object-to-be-processed from a superposition direction respectively by driving the press plates; and a cylinder controller of controlling each drive of a plurality of the press cylinders individually or jointly, wherein at least a press cylinder disposed closer to the conveying reference plane of the boards of a plurality of the press cylinders has a fixed pressing position to the board surfaces of the boards (constructing fixed press cylinders).

Further, in order to solve the above problems, a horizontal hotpress system of the second invention in a specific mode manufactures a plurality of wooden laminated boards all at once, by constructing an object-to-be-processed by sending stacked rectangular boards, having a longer side thereof as a conveying reference plane, of veneers applied adhesive on bonding surfaces respectively in a standing position between a plurality of hot plates disposed, so as to be superposed in a thickness direction, and hot-pressing the boards by driving at least one of press plates disposed on both outer sides in a superposition direction of the object-to-be-processed, and further comprising;

an opening-closing cylinder disposed near center on pressing surfaces of the press plates, opening and closing the press plates according to moving away and closer to each other thereof;

a plurality of press cylinders disposed at a plurality of positions different from each other to the pressing surfaces of the press plates in order to surround the opening-closing cylinder (radially), and pressing the object-to-be-processed from a superposition direction individually by driving the press plates; and a cylinder controller of controlling each drive of a plurality of the press cylinders individually or jointly, wherein at least a press cylinder disposed closer to the conveying reference plane of the boards of a plurality of the press cylinders has a fixed pressing position to the pressing surfaces of the pressing plates (constructing fixed press cylinders).

These horizontal hotpress systems can maintain the board thickness within the allowable size range after hot-pressing, by controlling drive of a plurality of the press cylinders (e.g. four hydraulic cylinders (fluid pressure cylinders)) individually or jointly, even when size or material of the boards being fed varies. Accordingly, regarding the press cylinders having a rigid and heavy structure, at least the ones disposed closer to the conveying reference plane of the boards do not have to be provided with a pressing position control-to-shift feature for aligning the pressing position, thus the structure can be simplified, and the manufacturing cost required for assembling and installation and the running cost required for operation and repair can be reduced. Also, Not the thickness of each board (laminated board) after hot-pressing, but the entire thickness of the object-to-be-processed (the boards and the hot plates) can be detected by the driven distances of the press cylinders, and thus time consumed for the detection can be reduced. Accordingly, the uneven thickness caused by the board inclination due to delay of control or the irregular thickness due to delay of arrest of the press cylinders can be prevented.

Moreover, when a opening-closing cylinder (e.g. a hydraulic cylinder (fluid pressure cylinder)) exclusively for opening and closing the press plates is provided other than the press cylinders, the opening-closing cylinder which requires high speed shifting in a long span, and the press cylinders which require fine shifting in a short span can be used selectively. Therefore, acceleration of opening-closing operation of the press plates improves operation efficiency of the hotpress, and also the drive control of the press cylinders can be conducted highly accurately without influence of opening-closing operation of the press plates.

Further, a plurality of the press cylinders are disposed surrounding the opening-closing cylinder (radially) to the pressing surfaces of the press plates. Because of this, even when a plurality of press cylinders are driven to press concurrently to the press plates, inclination to the boards (that is the press plates) occurs less likely. For example, when a plurality of the press cylinders are disposed to be positioned line-symmetrically and/or point-symmetrically to each other in respect to the opening-closing cylinder, driven pressures of the respective press cylinders act on the press plates concurrently and equally.

Also, at least any of a plurality of the press cylinders (e.g. two of the four) has to be fixed, having a fixed press position to the surfaces of the boards (the pressing surfaces of the press plates). Accordingly, even when the rest (e.g. the two) of the press cylinders are mobile styled, being able to shift (elevate) the pressing position to a direction intersecting (orthogonal) the sending direction of the boards (e.g. vertically), the pressing position control-to-shift feature of the press cylinder can be simplified.

Further, a plurality of the press cylinders can be disposed dispersively to be aligned to a plurality of lines (e.g. two lines), having the pressing position to the board surfaces of the boards (the pressing surfaces of the press plates) along the conveying reference plane. In this way, by aligning a plurality of the press cylinders to a plurality of lines along the conveying reference plane, driven pressures and driven distances for the press cylinders can be set commonly for the press cylinders family aligned on the same line having the same distance from the conveying reference plane, and thus pressing control can be achieved smoothly.

Then, a plurality of the press cylinders may include;

a plurality of fixed press cylinders disposed in an area closer (lower side) to the conveying reference plane (than the opening-closing cylinder), also having fixed pressing positions to board surfaces of the boards (the pressing surfaces of the press plates); and (similarly) a plurality of mobile press cylinders disposed in an area farther (upper side) from the conveying reference plane (than the opening-closing cylinder), also having pressing positions to board surfaces of the boards (the pressing surfaces of the press plates) being shiftable (vertically) to the fixed pressing positions of the fixed press cylinders.

In this way, the pressing position control-to-shift feature of the press cylinders can be simplified by having some of the press cylinders as the fixed press cylinders (e.g. two of the four). Also, as having the press cylinders on a farther side from the conveying reference plane being position-shiftable as mobile press cylinders, even if the board size changes and then a relative positional relation with the boards (the conveying reference plane and the opposite long side) changes, the pressing positions of the mobile press cylinders can be shifted. Further, for example an elevator hydraulic cylinder (fluid pressure cylinder) can be used as the pressing position control-to-shift feature for the mobile press cylinders. In this way, when the board size changes, this can suppress an adjusted width of the driven pressures of the press cylinders (allowable difference of the target value) and an adjusted width of the driven distances of the press cylinders (allowable difference of the setting value) to a small width.

Alternatively, a plurality of the press cylinders are constructed as an even number of fixed press cylinders having fixed pressing positions to the pressing surfaces of the press plates, and being disposed point-symmetrically and/or line-symmetrically to each other to the opening-closing cylinder.

In this way, further simplification can be achieved, as no pressing position control-to-shift feature of the press cylinder needs to be provided, by having all the press cylinders as fixed ones. Also, when a plurality of the press cylinders are disposed point-symmetrically and/or line-symmetrically to each other to the opening-closing cylinder, driven pressures of the relative press cylinders can act on the press plates concurrently and equally.

BEST MODES FOR CARRYING OUT THE INVENTION

Embodiment 1

Figure 1:
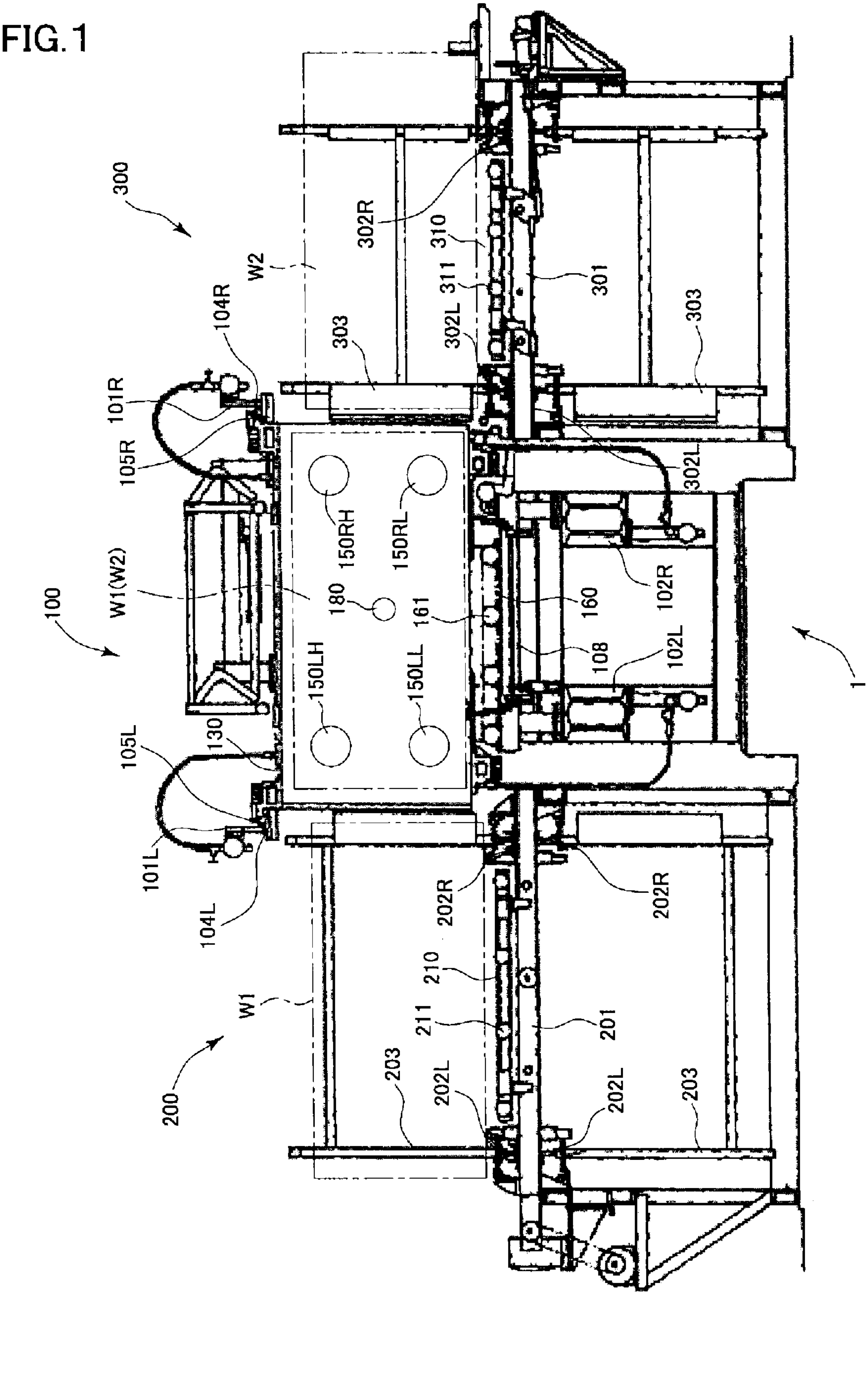
FIG. 1 is a plan view showing an example of a horizontal hotpress system related to this invention.

Hereinafter, embodiments of this invention will be explained, referring to the embodiments shown in the attached drawings. FIG. 1 is an elevation view showing an example of a horizontal hotpress system including a press structure. Regarding a horizontal hotpress system 1 shown in FIG. 1, a plurality of veneers having adhesive applied on bonding surfaces are stacked so as to be a plurality of rectangular boards-to-be-processed W1 (boards) in a horizontal state, being held in a standing state at a loader 200 (carry-in entrance), and then sent to a hotpress 100 (hot pressurizer). After hot-pressed for a predetermined time at the hotpress 100, processed boards W2 (laminated boards) formed to have a predetermined thickness are turned to be in a horizontal state again, and then sent out by a unloader 300 (carry-out exit).

Figure 3:
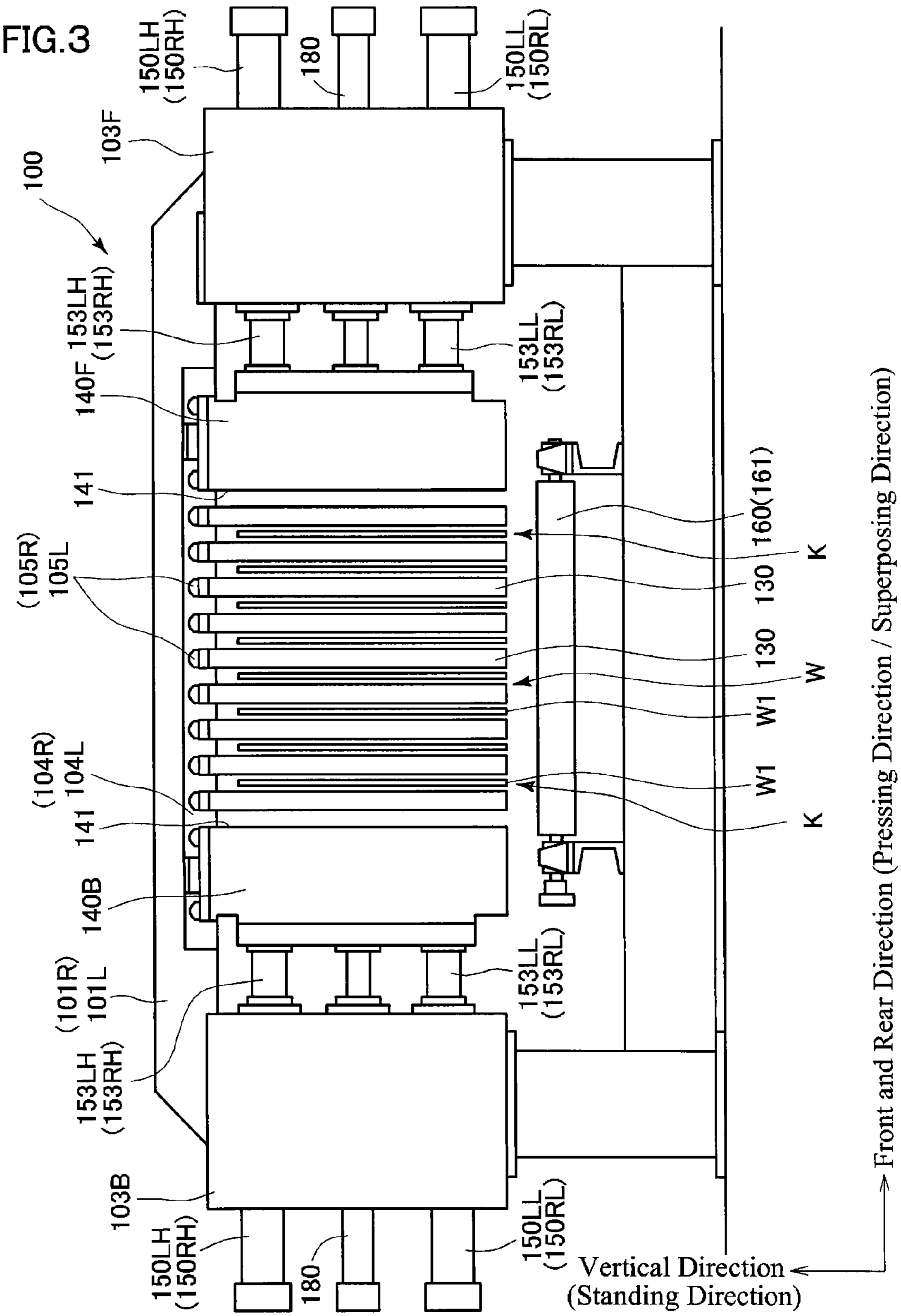
FIG. 3 is a side elevation view showing FIG. 2

The hotpress 100 comprises a pair of fixed frames 103F, 103B disposed at front and rear (in a pressing direction) over an upper pair and a lower pair of cross beams 101L, 101R, 102L, 102R disposed vertically (in a standing direction) and horizontally (in a sending direction; in a feeding direction) being spaced at respective predetermined intervals (referred to FIG. 3). Rails 104L, 104R are laid on the upper cross beams 101L, 101R, being attached with transfer rollers 105L, 105R (moving members). Multistage hot plates 130 and a pair or single (e.g. a pair of) press plates 140F, 140B at front and back (referred to FIG. 3) are suspended, having the transfer rollers 105L 105R interposed between the rails 104L, 104R. On the fixed frames 103L, 103B, a plurality (e.g. four) of press cylinders 150LH, 150RH, 150LL, 150RL (hydraulic cylinders; fluid pressure cylinders) are inserted at predetermined intervals, and ends of rams 153LH, 153RH, 153LL, 153RL thereof are attached to the press plates 140F, 140B (referred to FIG. 3). Also, one of the fixed frames 103F, 103B may play as a press plate.

On the bottom of the hot plates 130, a roller conveyer 160 (conveying member) is disposed, by which the boards-to-be-processed W1 are supported in a standing state from the bottom, and sent-in from the loader 200 to the hotpress 100. In order to send in the boards-to-be-processed W1, the roller conveyer 160 comprises a plurality (e.g. four) of claw rollers 161 having a width of the longitudinal direction so as to reach an entire sending-in route K (referred to FIG. 3), and being disposed on a device frame 108 over the lower cross beams 102L, 102R. The boards-to-be-processed W1 are sent in from the loader 200 by the roller conveyer 160, turned to be processed boards W2 after being hot-pressed with the hot plates 130, and again sent out to the unloader 300 by the roller conveyer 160.

The loader 200 is disposed on the sending-in side (upstream of the sending direction (back side)) of the hotpress 100. The loader 200 is provided with a pair of chain conveyers 202L, 202R (endless members) spaced at a predetermined interval at left and right on a mounting 201. The chain conveyers 202L, 202R are provided with a loader shelf 203. A sending-in conveyer 210 (sending-in member) is disposed on the mounting 201, in order to pass the boards-to-be-processed W1 in a standing state to the roller conveyer 160 of the hotpress 100. The sending-in conveyer 210 comprises a plurality (e.g. four) of claw rollers 211 having width of the longitudinal direction so as to reach the entire boards-to-be-processed W1 (the sending-in route K, referred to FIG. 3).

The unloader 300 is disposed on the sending-out side (downstream of the sending direction (front side)) of the hotpress 100. The unloader 300 is disposed with a pair of chain conveyers 302L, 302R (endless members) spaced at an predetermined interval at left and right on a mounting 301. The chain conveyers 302L, 302R are provided with a loader shelf 303. A sending-out conveyer 310 (sending-out member) is disposed on the mounting 301, in order to receive the processed boards W2 in a standing state from the roller conveyer 160 of the hotpress 100. The sending-out conveyer 310 comprises a plurality (e.g. four) of claw rollers 311 having a width of the longitudinal direction so as to reach the entire processed boards W2.

Figure 2:
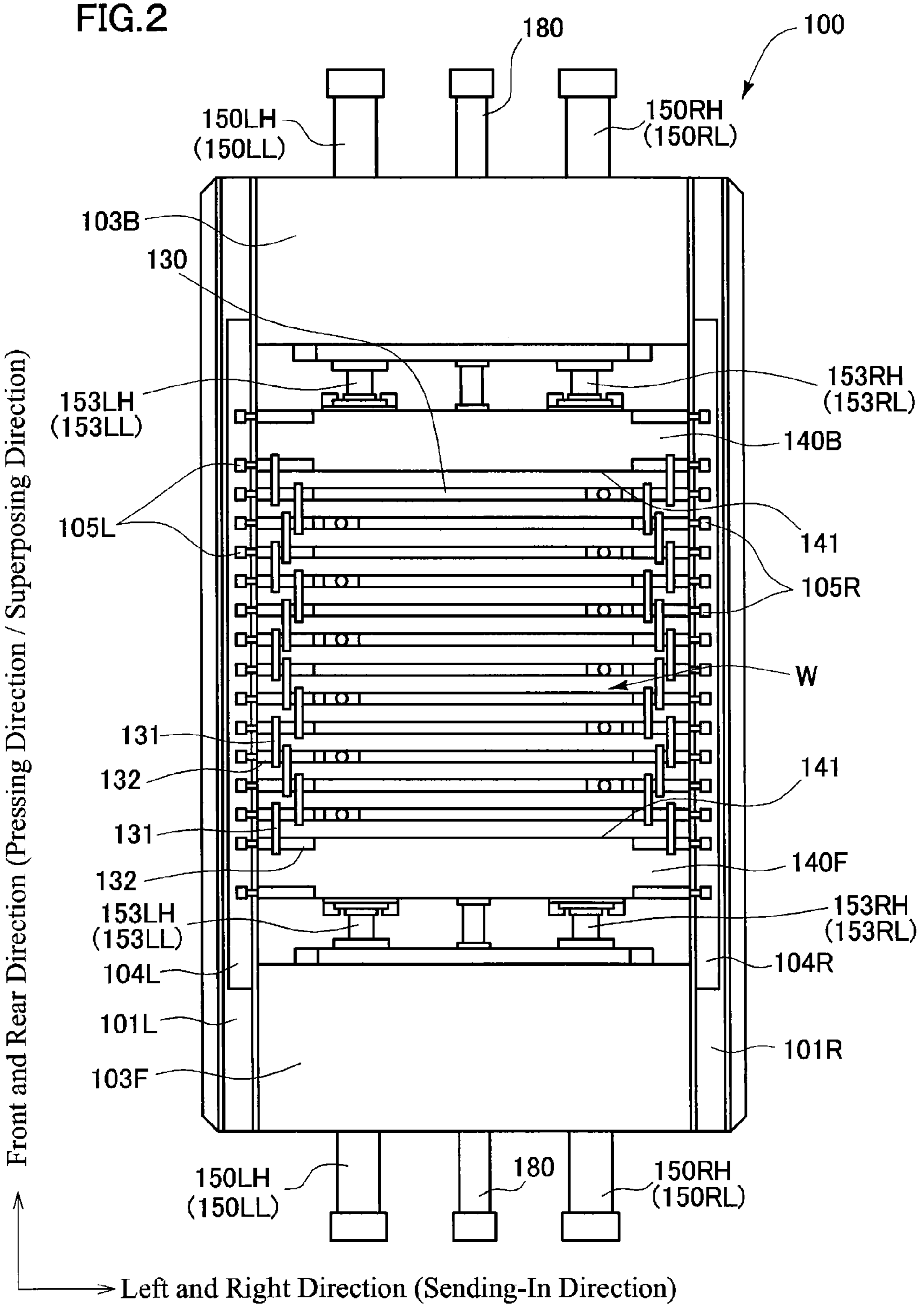
FIG. 2 is a plan view showing a press structure of FIG. 1.
Figure 4:
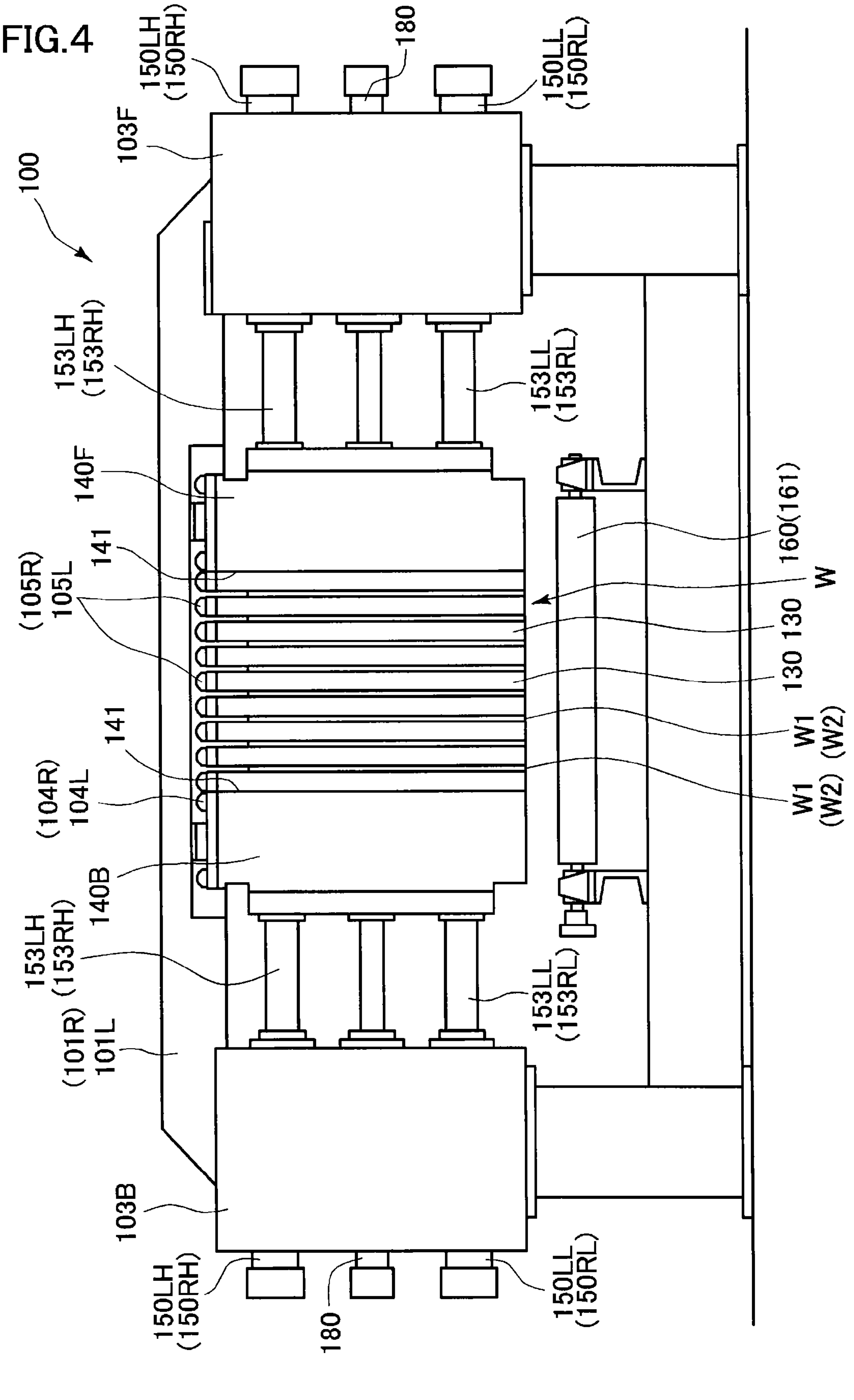
FIG. 4 is a side elevation view showing a closed state of the press.

Next, FIG. 2 is a plan view showing an example of the press structure, FIG. 3 is a side elevation view thereof, and FIG. 4 is a side elevation view showing a closed state of the press. The hotpress 100 (hot pressurizer; press structure) shown in FIG. 2 is provided with fixed frames 103F, 103B being fixed horizontally at front and back, and parallel and upper cross beams 101L, 101R on the top area between the fixed frames 103F, 103B. Rails 104L, 104R laid on the cross beams 101L, 101R are provided with a plurality of transfer rollers 105L, 105R (moving members). The transfer roller rollers 105L, 105R move according to a rolling state of the skids and a sliding state by surface contact as known, and in words they could be any means mobile linearly in a horizontal direction.

In order to heat the boards-to-be-processed W1 standing vertically being sandwiched, when the press is closed, the respective transfer rollers 105L 105R are connected to a top side of the hot plates 130, and a plurality of these hot plates 130 are suspended anteroposteriorly in a parallel state, so as to make up a hot plate group. Also, when the press is open, in order to insert the boards-to-be-processed W1 between the hot plates 130, the contiguous hot plates 130 are positioned parallel in a sending direction, maintaining predetermined intervals. Further, steam, hot oils or the like are filled in the hot plates 130, and the temperature is maintained according to the kind of the boards-to-be-processed W1.

Also, a pair of the press plates 140F, 140B at front and back are provided, which connect to the hot plates 130 of the hot plate group, move the hot plates 130 back and forth, in order to conduct press-closing and press-opening. The press plates 140F, 140B are disposed, being opposed to the respective hot plates 130 positioned on both front and back sides of the hot plate group, and suspended being mobile freely to back and forth, having the transfer rollers 105L, 105R connected to a top side of the press plates 140F, 140B. Also, the press plates 140F, 140B connect to the rams 153LH, 153RH, 153LL, 153RL of the press cylinders 150LH, 150RH, 150LL, 150RL provided on the fixed frames 103L, 103B, so as to be able to travel back and forth freely by the rams 153LH, 153RH, 153LL, 153RL. Further, the press plates 140F, 140B in FIG. 2 travel back and forth to the fixed frames 103F, 103B.

In this embodiment, the rams 153LH, 153RH, 153LL, 153RL of the press cylinders 150LH, 150RH, 150LL, 150RL are fixed to the press plates 140F, 140B respectively, so as to fix pressing positions to the pressing surfaces 141 of the press plates 140F, 140B. Then, around centers of the pressing surfaces 141, and at both outer sides of the press plates 140F, 140B, an opening-closing cylinder 180 (hydraulic cylinders; fluid pressure cylinders) is disposed, which moves the press plates 140F, 140B closer to and away from each other for closing and opening (referred to FIGS. 3 and 4).

Figure 5:
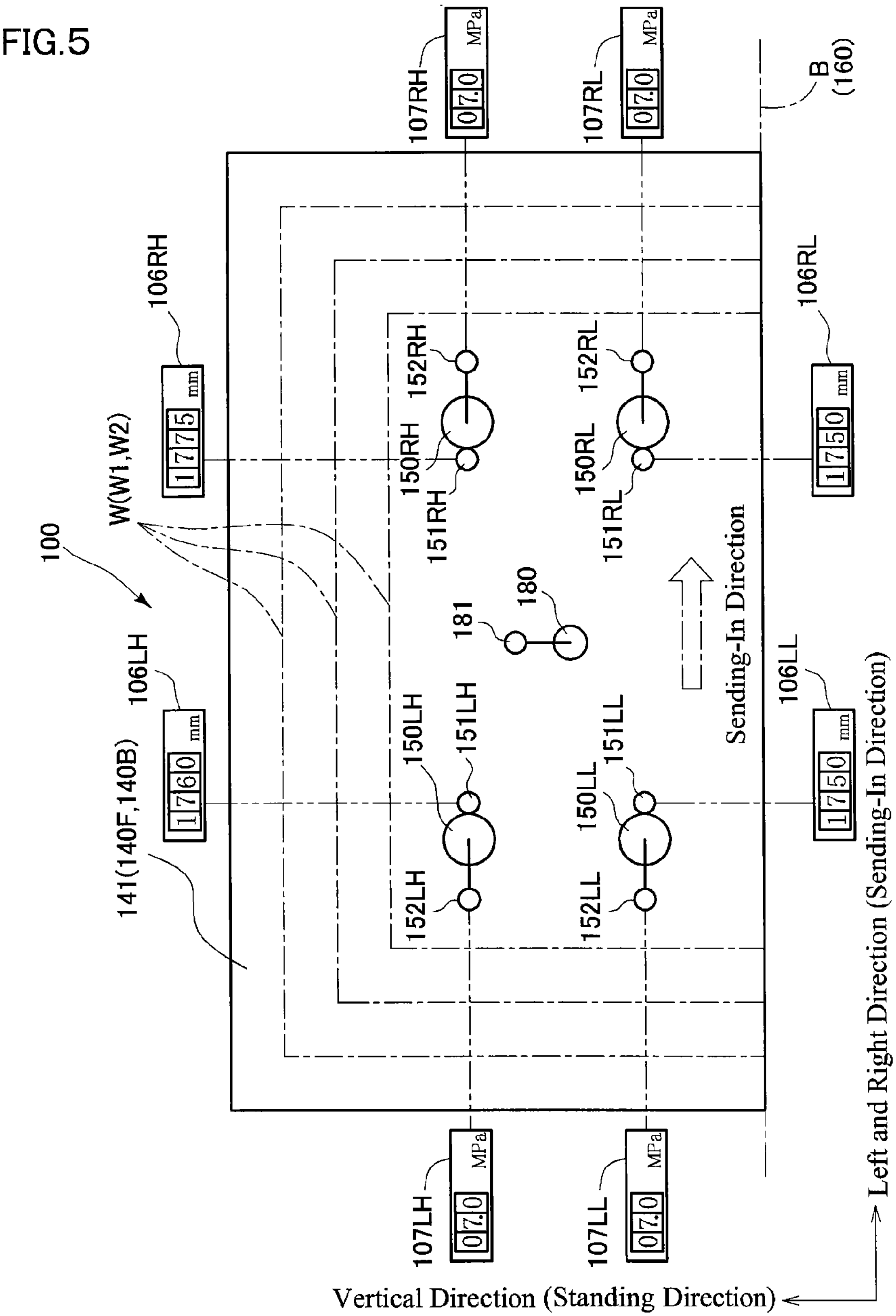
FIG. 5 is an elevation view showing an example of an alignment relation of the press control system.

Accordingly, the boards-to-be-processed W1 in a standing state are sent between the hot plates 130, having one long side (bottom side) of the rectangle as a conveying reference plane B (referred to FIG. 5). The boards-to-be-processed W1 and the hot plates 130 multi-stacked in a thickness direction configure an object-to-be-processed W. Prior to hot-pressing of the object-to-be-processed W (the boards-to-be-processed W1) by the press cylinders 150LH, 150RH, 150LL, 150RL, the opening-closing cylinder 180 closes the press plates 140F, 140B. The press cylinders 150LH, 150RH, 150LL, 150RL are individually controlled to conduct hot-pressing, in order to maintain entire thickness of the object-to-be-processed W after hot-pressing within a predetermined allowable range entirely on the pressing surfaces 141, for example, even if size or material of the board-to-be-processed W1 changes. After completing hot-pressing by the press cylinders 150LH, 150RH, 150LL, 150RL, the opening-closing cylinder 180 opens the press plates 140F, 140B.

Figure 6:
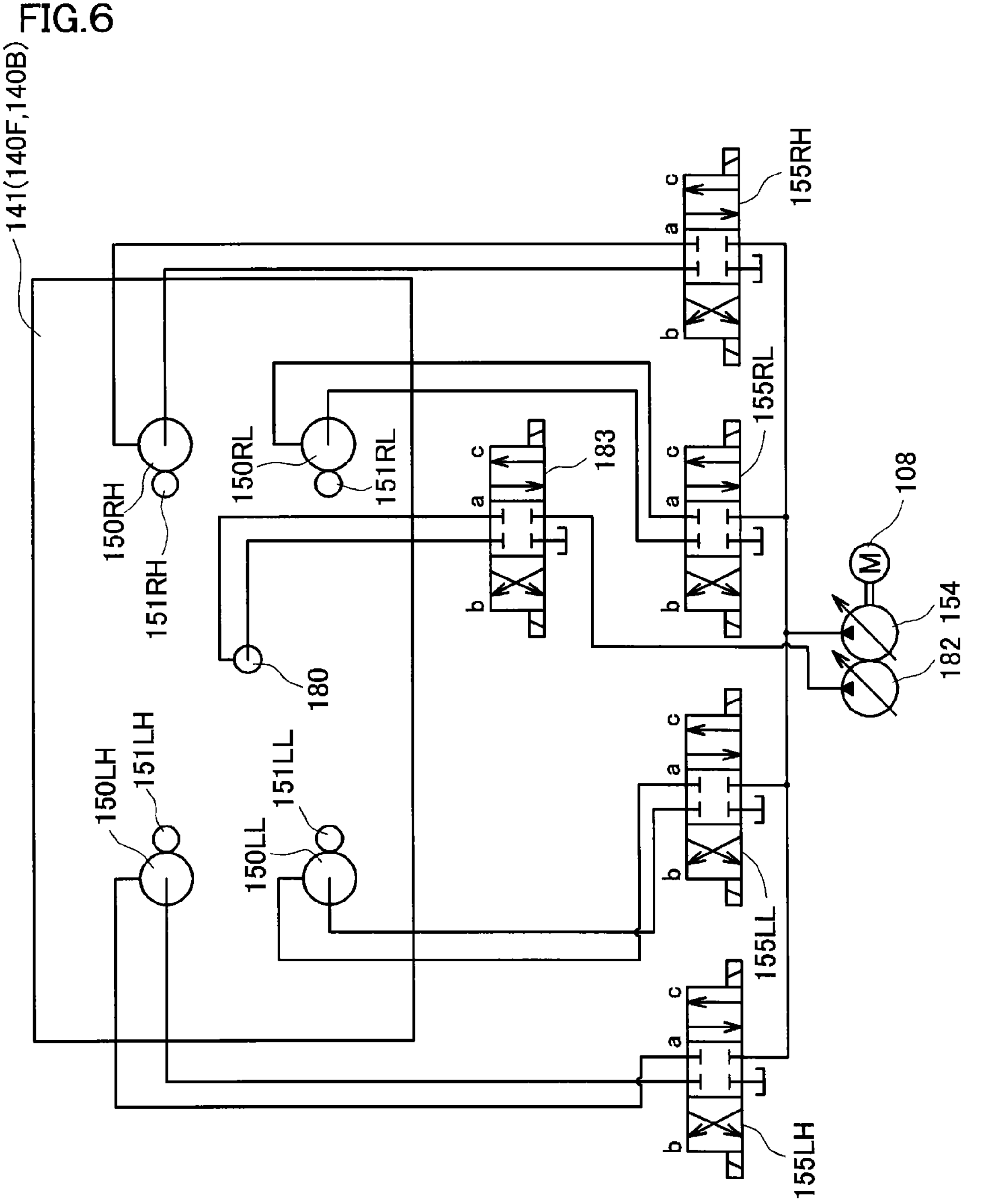
FIG. 6 is a hydraulic circuit diagram of FIG. 5.
Figure 7:
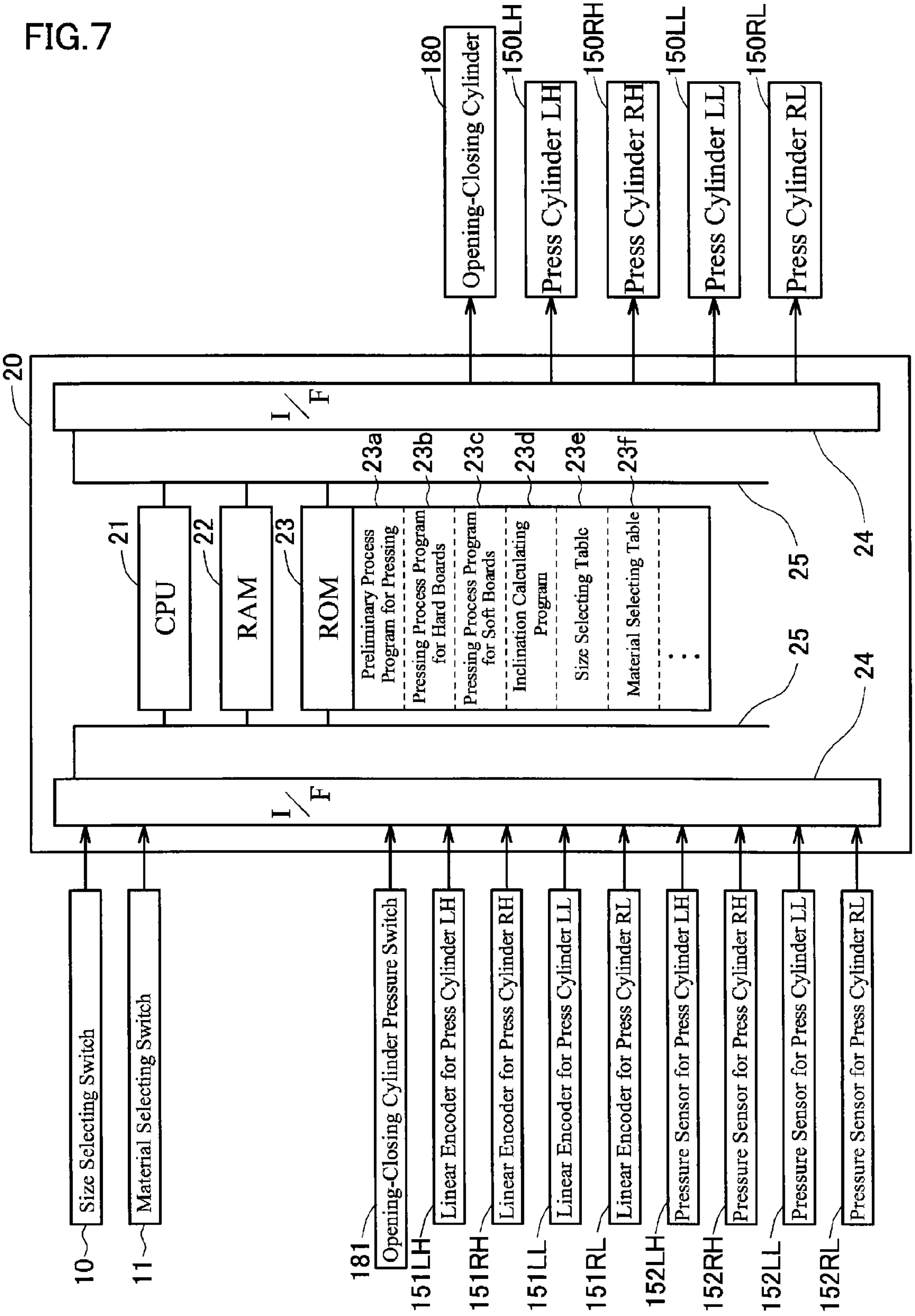
FIG. 7 is a block diagram showing an electrical configuration of FIG. 5.

Next, FIGS. 5 to 7 show specific structures of the press control system of this invention. FIG. 5 is an elevation view showing an example of an alignment relation of the press control system, FIG. 6 is a hydraulic circuit diagram thereof, and FIG. 7 is a block diagram showing an electrical configuration thereof.

As shown on the alignment relation view of FIG. 5, the four press cylinders 150LH, 150RH, 150LL, 150RL are disposed (radially) surrounding the opening-closing cylinder 180 to the pressing surfaces 141 of the press plates 140F, 140B. Specifically, the press cylinders 150LH, 150RH, 150LL, 150RL are disposed point-symmetrically and line-symmetrically to each other in relation to the opening-closing cylinder 180, and thus driven pressures applied to the respective press cylinders 150LH, 150RH, 150LL, 150RL (that are cylinder inner pressures) act concurrently and equally to the press plates 140F, 140B.

Also, the four press cylinders 150LH, 150RH, 150LL, 150RL are disposed dispersively so as to have the pressing positions to the pressing surfaces 141 of the press plates 140F, 140B to be aligned to two top and bottom lines along the conveying reference plane B (the roller conveyer 160). That means, the upper-left press cylinder 150LH and the upper-right press cylinder 150RH disposed in an upper area farther from the conveying reference plane B than the opening-closing cylinder 180 are on the upper line, and the lower-left press cylinder 150LL and the lower-right press cylinder 150RL disposed in a lower area closer to the conveying reference plane B are on the lower line. In this way, inclination of the boards-to-be-processed W1 less likely occurs during hot-pressing by disposing the press cylinders 150LH, 150RH, 150LL, 150RL evenly to the pressing surfaces 141 of the press plates 140F, 140B.

The respective press cylinders 150LH, 150RH, 150LL, 150RL comprise linear encoders for press cylinders 151LH, 151RH, 151LL, 151RL (displacement detecting means; distance detecting means) detecting loss of the entire thickness of the object-to-be-processed Was displacements (travel distances) of the rams 153LH, 153RH, 153LL, 153RL, and pressure sensors for press cylinders 152LH, 152RH, 152LL, 152RL (pressure detecting means) detecting pressing pressure of the press plates 140F, 140B as cylinder inner pressures (driven pressures) of the press cylinders 150LH, 150RH, 150LL, 150RL. Whereas, the opening-closing cylinder 180 comprises an opening-closing cylinder pressure switch 181 (pressure detecting means) detecting opening and closing of the press plates 140F, 140B with the cylinder inner pressure level. Also, ram displacement displays 106LH, 106RH, 106LL, 106RL and cylinder inner pressure displays 107LH, 107RH, 107LL, 107RL are provided to display detected values of the linear encoders 151LH, 151RH, 151LL, 151RL and the pressure sensors 152LH, 152RH, 152LL, 152RL through a transmitter (a sending device) or the like.

As shown on a hydraulic circuit diagram of FIG. 6, electromagnetic switching valves 155LH, 155RH, 155LL, 155 RL, which are a 4-port and 3-position switching type, are respectively disposed between a press cylinder hydraulic pressure pump 154, which is a variable capacity type driven by an electrical motor 108 and the respective press cylinders 150LH, 150RH, 150LL, 150RL. The respective electromagnetic switching valves 155LH, 155RH, 155LL, 155 RL connect the hydraulic pump 154 and the press cylinders 150LH, 150RH, 150LL, 150RL to a closing direction of the press plates 140F, 140B when switched from the neutral position a to the position b, and connect to a opening direction of the press plates 140F, 140B when switched to the position c. Also, in order to control drive of the press cylinders 150LH, 150RH, 150LL, 150RL highly accurately, it is desirable to apply PWM control based on duty ratio (so called duty control) or the like to these electromagnetic switching valves 155LH, 155RH, 155LL, 155RL.

An electromagnetic switching valve 183, which is a 4-port and 3-position switching type, is disposed between a opening-closing cylinder hydraulic pressure pump 182, which is a variable capacity type driven by the electrical motor 108 and the opening-closing cylinder 180. The electromagnetic switching valve 183 connects the hydraulic pump 154 and the opening-closing cylinder 180 to a closing direction of the press plates 140F, 140B when switched from the neutral position a to the position b, and connects to a opening direction of the press plates 140F, 140B when switched to the position c.

As shown in a block diagram of FIG. 7, a control board 20, which is a cylinder controller of the press control system, mainly comprises a CPU 21, which is an arithmetic unit, a ROM 23, which is a read-only memory device, a RAM 22, which is a RAN main memory device used as working area, and an input-output interface (I/F) 24. These devices are connected with bus 25 to be transmittable and receivable mutually. The ROM 23 stores preliminarily various control programs 23*a*, 23*b*, 23*c* to conduct pressing control and a calculating program 23*d* which calculates inclination of the boards-to-be-processed W1 during hot-pressing as inclination of the press plates 140F, 140B (the pressing surfaces 141), and further selecting tables 23*e*, 23*f* which initialize setting of size and material of the boards-to-be-processed W1.

As shown in FIG. 7, the following signals from respective devices of the hotpress 100 are entered to the control board 20 through the input-output interface 24.

Size selecting switch 10: switching signals when manually inputting selections by pressing a button or the like or inputting data for size of the boards-to-be-processed W1;

Material selecting switch 11: switching signals when manually inputting selections by pressing a button or the like or inputting data for material (hard board, soft board) of the boards-to-be-processed W1;

Opening-closing cylinder pressure switch 181: detection signals of the cylinder inner pressure level when opening/closing the press plates 140*f*, 140*b* by the opening-closing cylinder 180;

Linear encoders for press cylinders 151LH, 151RH, 151LL, 151RL: detection signals of displacement of the rams 153LH, 153RH, 153LL, 153RL;

Pressure sensors for press cylinders 152LH, 152RH, 152LL, 152RL: detection signals of cylinder inner pressure of the press cylinders 150LH, 150RH, 150LL, 150RL.

Similarly, the following signals are output from the control board 20 to respective devices of the hotpress 100 through the input-output interface 24. Press cylinders 150LH, 150RH, 150LL, 150RL: Control output signals for hot-pressing while pressing the press plates 140F, 140B (the pressing surfaces 141) and correcting (reducing) inclination of the object-to-be-processed W (the boards-to-be-processed W1);

Opening-closing cylinder 180: Control output signals for opening and closing by moving the press plates 140F, 140B (the pressing surfaces 141) closer to and away from each other.

Figure 8:
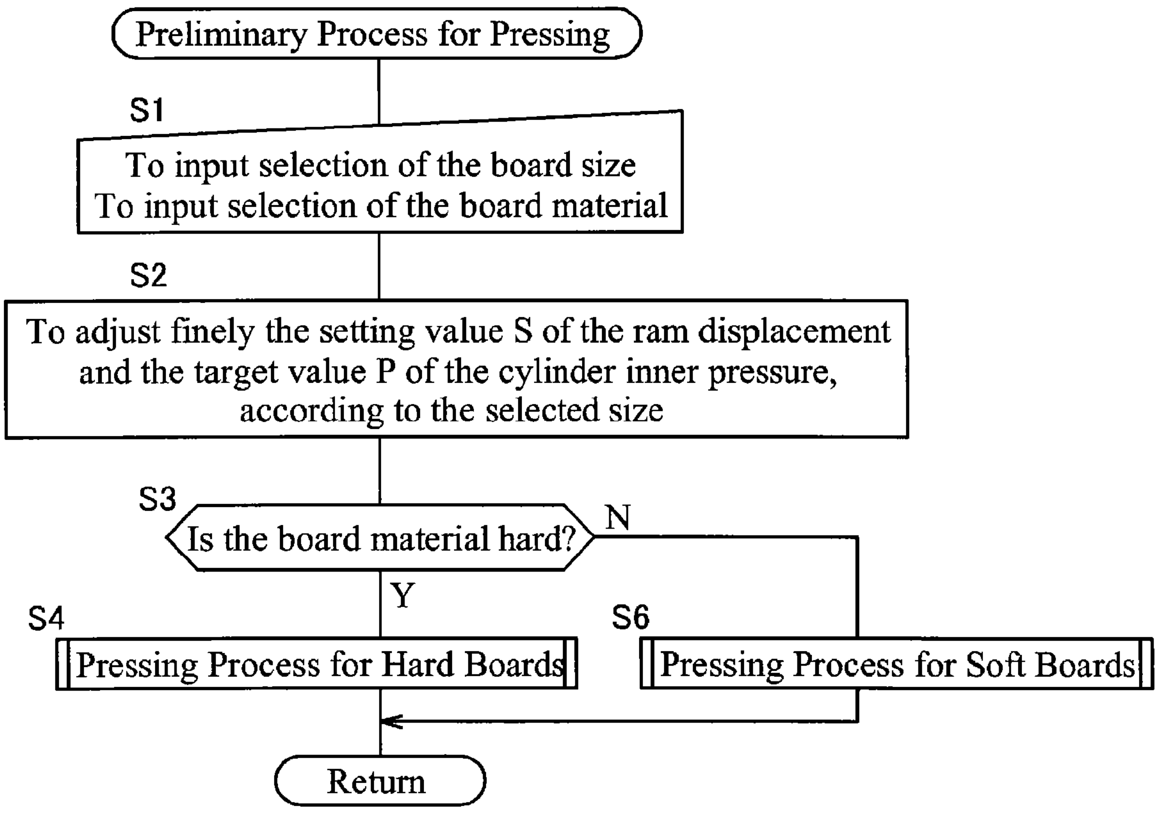
FIG. 8 is a flow chart showing a preliminary process for pressing.

Next, by using the flow charts on FIGS. 8 to 10, referred to the displays 106LH to 107RL on FIG. 5, the press control of the hotpress 100 will be explained. FIG. 8 responds to a preliminary process program for pressing 23*a* of FIG. 7. Similarly, FIG. 9 responds to a pressing process program for hard boards 23*b*, and FIG. 10 responds to a pressing process program for soft boards 23*c* respectively.

Regarding the preliminary process program shown in FIG. 8, firstly on S1, size (6-shaku board, 8-shaku board, 10-shaku board or the like) and material (hard board, soft board, or the like) of the boards-to-be-processed W1 is input manually with the size selecting switch 10 and the material selecting switch 11. According the inputs, fine adjustment is conducted, referring to the selecting tables 23*e*, 23*f* of the ROM23 (FIG. 7). Specifically, On S2, according to the size of the boards-to-be-processed W1, a setting value S of the ram displacement and a target value P of the cylinder inner pressure are adjusted finely. Next, confirming the selected material on S3, if the material is hard board (YES on S3), the pressing process for hard boards is conducted on S4 so as to complete the preliminary process for pressing, or if the material is soft board (NO on S3), the pressing process for soft boards is conducted on S6.

Figure 9:
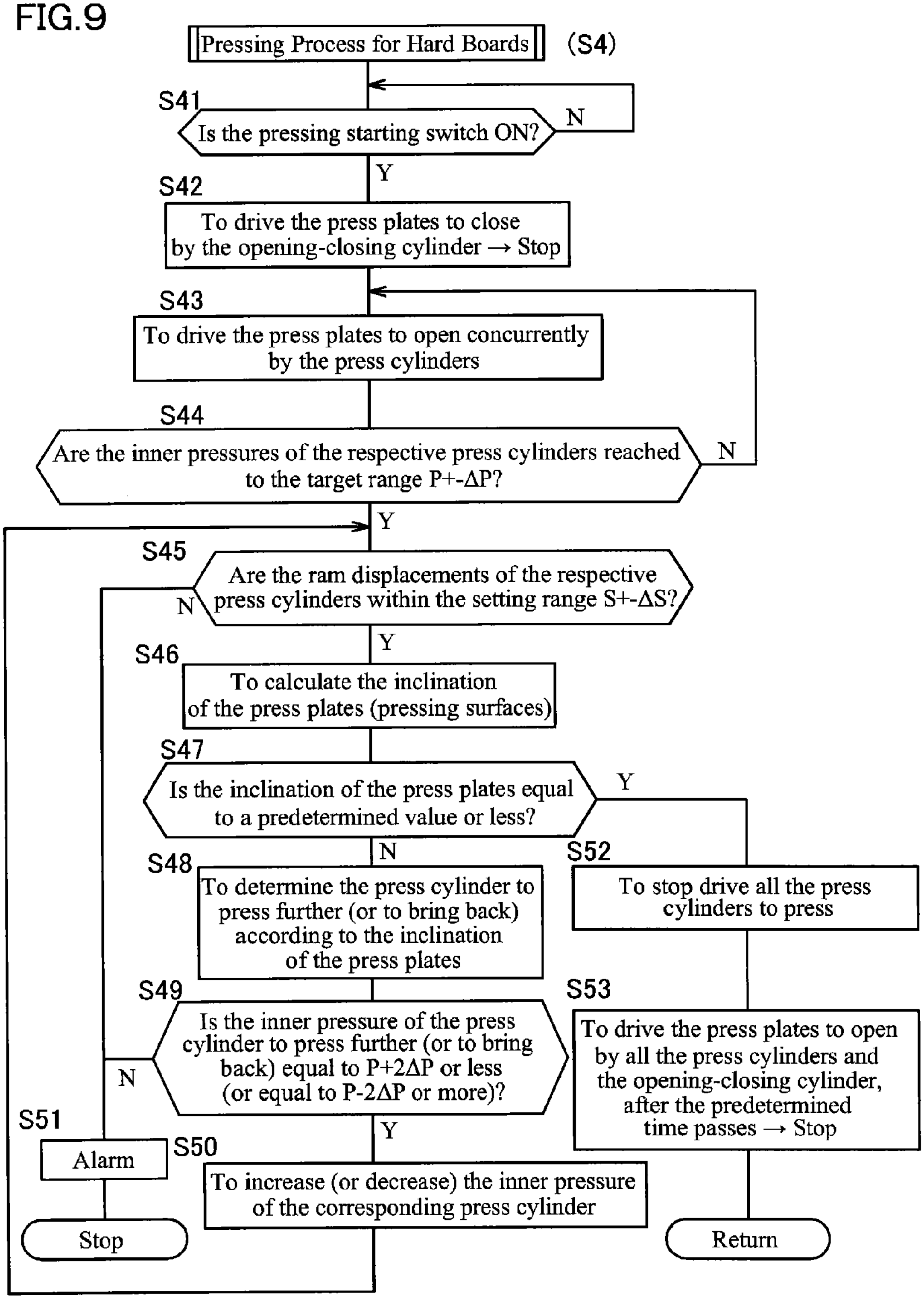
FIG. 9 is a flow chart showing a subroutine of the pressing process for hard boards.

FIG. 9 shows a subroutine of the pressing process for hard boards (S4) of FIG. 8. If the boards-to-be-processed W1 are hard boards, according to pressing of the press plates 140F, 140B by the press cylinders 150LH, 150RH, 150LL, 150RL, the inner pressures of the respective cylinders are reached to a target range P+−ΔP. If ram displacements of the respective press cylinders 150LH, 150RH, 150LL, 150RL are within the predetermined setting range S+−ΔS, inclination of the board-to-be-processed W1 is calculated as inclination of the press plates 140F, 140B (the pressing surfaces 141) from the detected values of the respective ram displacements with the inclination calculating program 23*d* (referred to FIG. 7). When the inclination exceed a predetermined value, it is considered that inclination to be corrected (reduced) occurs on the boards-to-be-processed W1, and then the corresponding cylinder inner pressure is increased (or decreased) by extending upper and lower limit values P+ΔP, P−ΔP of the target range P+−ΔP of the cylinder inner pressure respectively to P+2ΔP, P−2ΔP.

Specifically, when a pressing starting switch (not shown) is turned ON (YES on S41), the electromagnetic switching valve 183 is turned to the position b on S42, the opening-closing cylinder 180 is driven to close the press plates 140F, 140B, and then the drive is stopped by detection of the pressure switch 181. After that, on S43, the press cylinders 150LH, 150RH, 150LL, 150RL are concurrently driven to press the press plates 140F, 140B. On S44, the pressure sensors 152LH, 152RH, 152LL, 152RL determine if the inner pressures of the respective press cylinders 150LH, 150RH, 150LL, 150RL are reached within the target range P+−ΔP (e.g. 7.0+−0.2 MPa). If the inner pressures of the respective cylinders are reached within the target range P+−ΔP as shown in FIG. 5 (YES on S44), on S45 the linear encoders 151LH, 151RH, 151LL, 151RL determine if the respective ram displacements are within the setting range S+−ΔS (e.g. 1770+−20 mm). If the respective ram displacements are within the setting range S+−ΔS as shown in FIG. 5 (YES on S45), on S46 inclination of the press plates 140F, 140B (the pressing surfaces 141) is calculated from the respective ram displacements.

Next, on S47, level of the inclination calculated on S46 is determined. If the inclination exceeds a predetermined value (e.g. 5 degrees) (NO on S47), a press cylinder, which need to press further (or pull back for some cases) is selected in order to correct (reduce) the inclination, by determining from the inclination of the press plates 140F, 140B (the pressing surfaces 141) on S48. Further on S 49, in a case of further pressing in order to correct (reduce) the inclination, it is confirmed if the inner pressure of the press cylinder is equal to P+2ΔP (e.g. 7.0+0.4 MPa) or less, whereas in a case of pulling back, it is determined if the inner pressure of the press cylinder is equal to P−2ΔP (e.g. 7.0−0.4 MPa) or more. If the cylinder inner pressure is equal to P+2ΔP or less (or P−2ΔP or more) (YES on S49), the inclination of the press plates 140F, 140B (the pressing surfaces 141) are corrected (reduced) by increasing (or decreasing) the inner pressure of the corresponding press cylinder on S50, and then returning to S45.

On FIG. 5, if ram displacements (1750 mm) of the lower-lined press cylinders 150LL, 150RL are relatively small and it is calculated that the inclination exceeds the predetermined value (NO on S47), then it is determined that the lower-lined press cylinders 150LL, 150RL need to press further (S48). The cylinder inner pressures of the press cylinders 150LL, 150RL (7.0 MPa) are equal to P+2ΔP or less (YES on S49), and thus the duty ratio of the electromagnetic switching valves 155LL, 155RL is increased so as to increase flow to the press cylinders 150LL, 150RL, in order to correct (reduce) the inclination (S50).

In this way, when the inclination of the press plates 140F, 140B (the pressing surfaces 141) is corrected (reduced) to the predetermined value or less, or the inclination is equal to the predetermined value or less initially (YES on S47), drive of all the press cylinder 150LH, 150RH, 150LL, 150RL is stopped to press on S52. Further on S53, the electromagnetic switching valves 155LH, 155RH, 155LL, 155RL are individually turned to the position c after a predetermined time passed (e.g. after 10 seconds), the press plates 140F, 140B are driven to open by all the press cylinders 150LH, 150RH, 150LL, 150RL and the opening-closing cylinder 180, and then the drive is stopped by detection of the pressure sensors 152LH, 152RH, 152LL, 152RL and the pressure switch 181, so as to complete the pressing process for hard boards. Also, when the respective ram displacements are not within the setting range S+−ΔS (NO on S45), and when the inner pressure of the press cylinder, which needs to press further (or pull back) to correct (reduce) the inclination, exceeds P+2ΔP (or below P−2ΔP) (No on S49), alarm is set off so as to terminate the process on S 51, because of large possibility of the irregular products.

Regarding hard boards made of a hard material and having relatively high elasticity and repulsive force such as zelkova, lauan or the like, the press plates 140F, 140B can be inclined easily due to bounce (spring-back) phenomenon. Therefore, firstly the respective cylinder inner pressures are reached to the target range P+−ΔP, and when the ram displacements of the relative press cylinders 150LH, 150RH, 150LL, 150RL are within the setting range S+−ΔS and the inclination of the press plates 140F, 140B exceeds the predetermined value at that time, the inclination is corrected (reduced) by further increasing the cylinder inner pressures to the allowable range P+2ΔP. In this way, drive of the press cylinders 150LH, 150RH, 150LL, 150RL is controlled individually focusing on the pressures. Even when the press plates 140F, 140B are inclined especially due to bounce phenomenon of the hard boards, the inclination of the press plates 140F, 140B can be corrected (reduced) on the process of finishing the object-to-be-processed W (the boards-to-be-processed W1+the hot plates 130) to have the entire thickness of a predetermined allowable size, so as to suppress occurrence of the irregular products, and improve the production yield.

Figure 10:
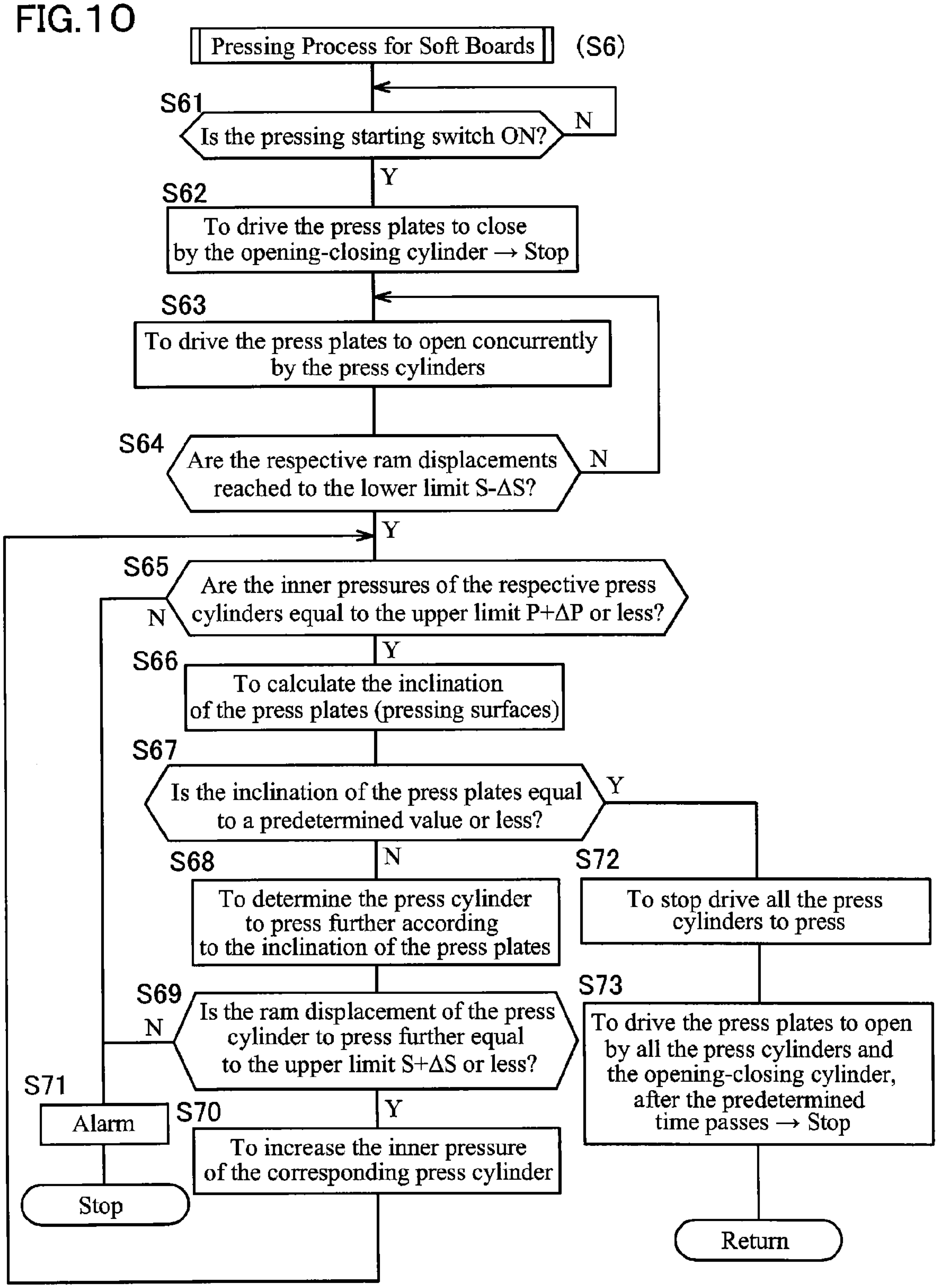
FIG. 10 is a flow chart showing a subroutine of the pressing process for soft boards.

FIG. 10 shows a subroutine of the pressing process for soft boards (S6) of FIG. 8. If the boards-to-be-processed W1 are soft boards, according to the pressing pressure of the press plates 140F, 140B by the press cylinders 150LH, 150RH, 150LL, 150RL, the respective ram displacements are reached to the lower limit S−ΔS of the predetermined setting range S+−ΔS. If the respective cylinder inner pressures are equal to the upper limit P+ΔP of the predetermined target range P+−ΔP or less, then the inclination of the press plates 140F, 140B (the pressing surfaces 141) is calculated from the detected values of the respective ram displacements with the inclination calculating program 23*d* (referred to FIG. 7). When the inclination exceeds a predetermined value, it is considered that inclination to be corrected (reduced) occurs on the boards-to-be-processed W1, and then the corresponding cylinder inner pressure is increased within the target range P+−ΔP while having the ram displacement of the corresponding press cylinder within the setting range S+−ΔS.

Specifically, when a pressing starting switch (not shown) is turned ON (YES on S61), the electromagnetic switching valve 183 is turned to the position b on S62, the opening-closing cylinder 180 is driven to close the press plates 140F, 140B, and then the drive is stopped by detection of the pressure switch 181. After that, on S63, the press cylinders 150LH, 150RH, 150LL, 150RL are concurrently driven to press the press plates 140F, 140B. On S64, the linear encoders 151LH, 151RH, 151LL, 151RL determine if the displacements of the respective rams 153LH, 153RH, 153LL, 153RL are reached to the lower limit S−ΔS (e.g. 1750 mm) of the setting range S+−ΔS (e.g. 1770+−20 mm). As shown on FIG. 5, if the respective ram displacements are equal to the lower limit S−ΔS or more (YES on S64), the pressure sensors 152LH, 152RH, 152LL, 152RL determine if the inner pressures of the respective press cylinders 150LH, 150RH, 150LL, 150RL are equal to the upper limit P+ΔP (e.g. 7.2 MPa) of the target range P+−ΔP (e.g. 7.0+−0.2 MPa) or less. As shown on FIG. 5, if the respective cylinder inner pressures are equal to the upper limit P+ΔP or less (YES on S65), on S66 the inclination of the press plates 140F, 140B (the pressing surfaces 141) is calculated from the respective ram displacements.

Next, on S67, level of the inclination calculated on S66 is determined. If the inclination exceeds a predetermined value (e.g. 5 degrees) (NO on S67), a press cylinder which needs to press further is selected in order to correct (reduce) the inclination, by determination from the inclination of the press plates 140F, 140B (the pressing surfaces 141) on S68. Further on S69, it is confirmed if the displacement of the press cylinder, which presses further in order to correct (reduce) the inclination, is equal to the upper limit S+ΔS (e.g. 1790 mm) of the setting range S+−ΔS or less. If the ram displacement is equal to the upper limit S+ΔS or less (YES to S69), the inclination of the press plates 140F, 140B (the pressing surfaces 141) are corrected (reduced) by increasing the inner pressure of the corresponding press cylinder on S70, and then returning to S65.

On FIG. 5, if ram displacements (1750 mm) of the lower-lined press cylinders 150LL, 150RL are relatively small, and it is calculated that the inclination exceeds the predetermined value (NO on S67), it is determined that the lower-lined press cylinders 150LL, 150RL need to press further (S68). The ram displacements (1750 mm) of the press cylinders 150LL, 150RL are equal to the upper limit S+ΔS or less (YES on S69), and thus the duty ratio of the electromagnetic switching valves 155LL, 155RL is increased so as to increase flow to the press cylinder 150LL, 150RL, in order to correct (reduce) the inclination (S70).

In this way, when the inclination of the press plates 140F, 140B (the pressing surfaces 141) is corrected (reduced) to the predetermined value or less, or the inclination is equal to the predetermined value or less initially (YES on S67), drive of all the press cylinders 150LH, 150RH, 150LL, 150RL is stopped to press on S72. Further on S73, the electromagnetic switching valves 155LH, 155RH, 155LL, 155RL are individually turned to the position c after a predetermined time passed (e.g. after 10 seconds), the press plates 140F, 140B are driven to open by all the press cylinders 150LH, 150RH, 150LL, 150RL and the opening-closing cylinder 180, and then the drive is stopped by detection of the pressure sensors 152LH, 152RH, 152LL, 152RL and the pressure switch 181, so as to complete the pressing process for soft boards. Also, when the respective cylinder inner pressures exceed the upper limit P+ΔP (NO on S65), and when the ram displacement of the press cylinder, which needs to press further to correct (reduce) the inclination, exceeds the upper limit S+ΔS (No on S69), alarm is set off so as to terminate the process on S 71, because of large possibility of the irregular products.

Regarding soft boards made of a soft material and having low elasticity and repulsive force such as cedar, paulownia or the like, their thickness can be easily decreased by pressing, and even when the cylinder inner pressures are within the target range P+−ΔP, the thickness after hot-pressing can be easily decreased partially (especially at the cylinder pressing positions) more than specified. Therefore, firstly the respective ram displacements are reached to the lower limit S−ΔS of the setting range S+−ΔS, and when the cylinder inner pressures of the relative press cylinders 150LH, 150RH, 150LL, 150RL are equal to the upper limit P+ΔP or less, and the inclination of the press plates 140F, 140B exceeds a predetermined value at that time, the inclination is corrected (reduced) by further increasing the respective ram displacements to the upper limit S+ΔS. In this way, drive of the press cylinders 150LH, 150RH, 150LL, 150RL is controlled to press individually focusing on the distance. Occurrence of excessive pressing especially to the soft boards can be prevented (controlled) as well as the inclination of the press plates 140F, 140B can be corrected (reduced) on the process of finishing the object-to-be-processed W (the boards-to-be-processed W1+the hot plates 130) to have the entire thickness of a predetermined allowable size, so as to suppress occurrence of the irregular products, and improve the production yield.

As described above, even when size or material of the boards-to-be-processed W1 changes, by controlling drive of the press cylinders 150LH, 150RH, 150LL, 150RL individually, the thickness of the processed board W2 can be maintained within the allowable size range. Accordingly the press cylinders 150LH, 150RH, 150LL, 150RL, having a rigid and heavy structure, do not have to be provided with a pressing position control-to-shift feature for aligning a pressing position, and thus the structure can be simplified, and the manufacturing cost required for assembling and installation and the running cost required for operation and repair can be reduced.

Also, the cylinder inner pressures and the ram displacements are detected and controlled by the respective press cylinders 150LH, 150RH, 150LL, 150RL individually, and thus operations of the respective press cylinders 150LH, 150RH, 150LL, 150RL can be controlled immediately based on the detected values (cylinder inner pressures and ram displacements) obtained from the respective press cylinders 150LH, 150RH, 150LL, 150RL, so as to achieve simplification and acceleration of the system. Further, Not individual thicknesses of the processed boards W2 but the entire thickness of the object-to-be-processed W (the processed boards W2+the hot plates 130) is detected by the ram displacements, and then time consumed for the detection can be reduced. Accordingly, it can be prevented that uneven thickness of the processed boards W2 is caused by inclination of the press plates 140F, 140 B or irregular thickness is caused by delay of stopping the press cylinders 150LH, 150RH, 150LL, 150RL due to delay of the control.

Moreover, the opening-closing cylinder 180 exclusively for opening and closing the press plates 140F, 140B is provided other than the press cylinders 150LH, 150RH, 150LL, 150RL, and then the opening-closing cylinder 180, which requires high speed shifting in a long span, and the press cylinders 150LH, 150RH, 150LL, 150RL, which requires fine shifting in a short span, can be used selectively. Therefore, acceleration of opening-closing movement of the press plates 140F, 140B improves operation efficiency of the hot-press, and also the drive control of the press cylinders 150LH, 150RH, 150LL, 150RL can be conducted highly accurately without influence of opening-closing movement of the press plates 140F, 140B.

Modified Example 1-1

Figure 11:
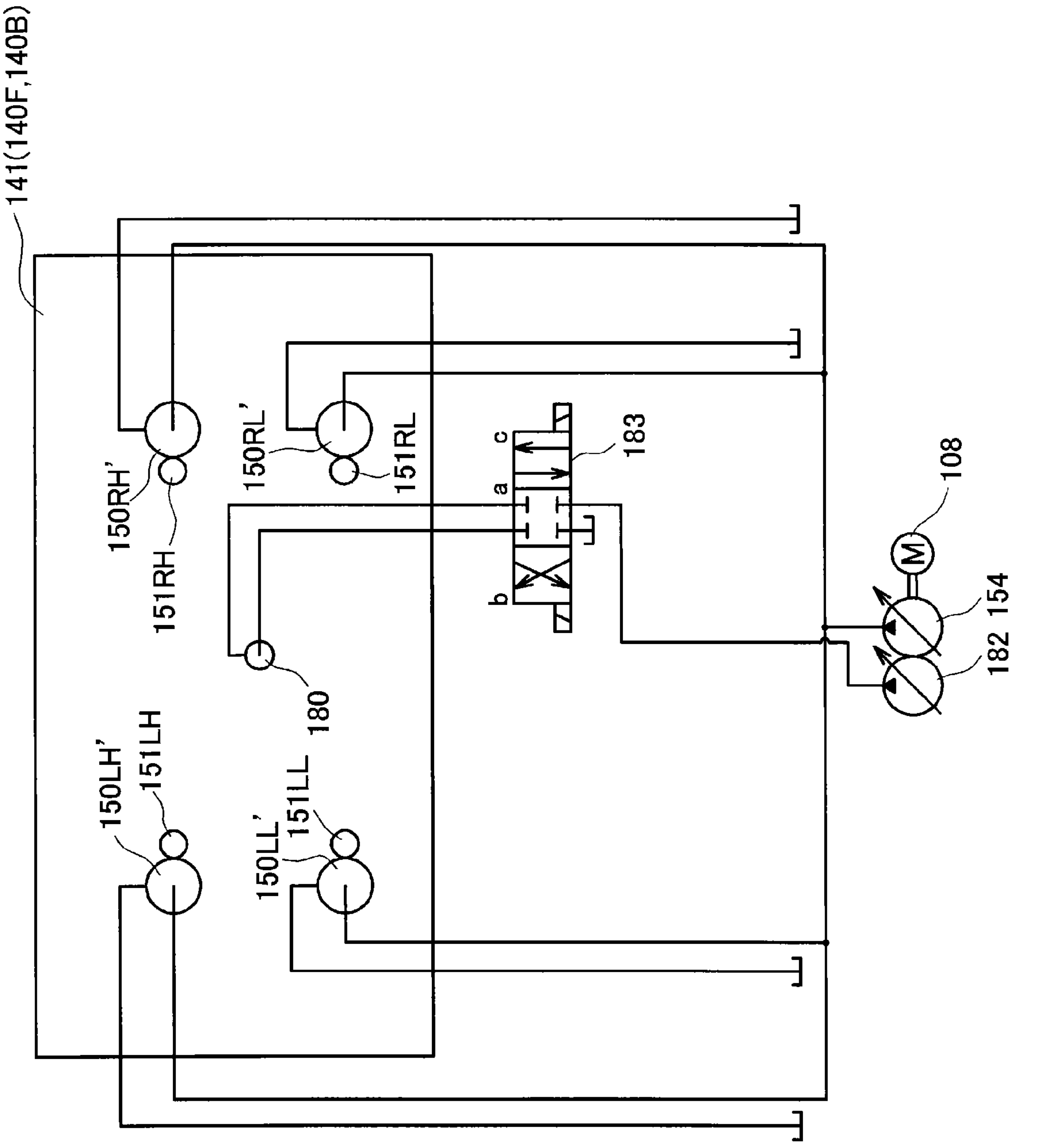
FIG. 11 is a hydraulic circuit diagram showing a modified example of FIG. 6.

FIG. 11 is a hydraulic circuit diagram showing a modified example of FIG. 6. The press cylinder shown on FIG. 11 uses servo cylinders 150LH', 150RH', 150LL', 150RL' which are servo actuators combined with control valves (servo valve) of controlling flow rate or pressure according to input signals and follow-up features of controlling to feedback the final controlled position (driven distance=ram displacement). In this way, the servo cylinders 150LH', 150RH', 150LL', 150RL' are joined/united with the servo valves (or can be seen as built in the servo valves), and thus the electromagnetic switching valves 155LH, 155RH, 155LL, 155 RL of FIG. 6 are not requires on FIG. 11, so as to achieve simplification of the hydraulic pressure circuit. Also, the servo valve has a function of controlling total flow and flow speed, and thus the ram displacements and ram shifting rates of the servo cylinders 150LH, 150RH, 150LL, 150RL can be adjusted combinedly when hot-pressing the object-to-be-processed W, so as that further precise control is possible.

Modified Example 1-2

Figure 12:
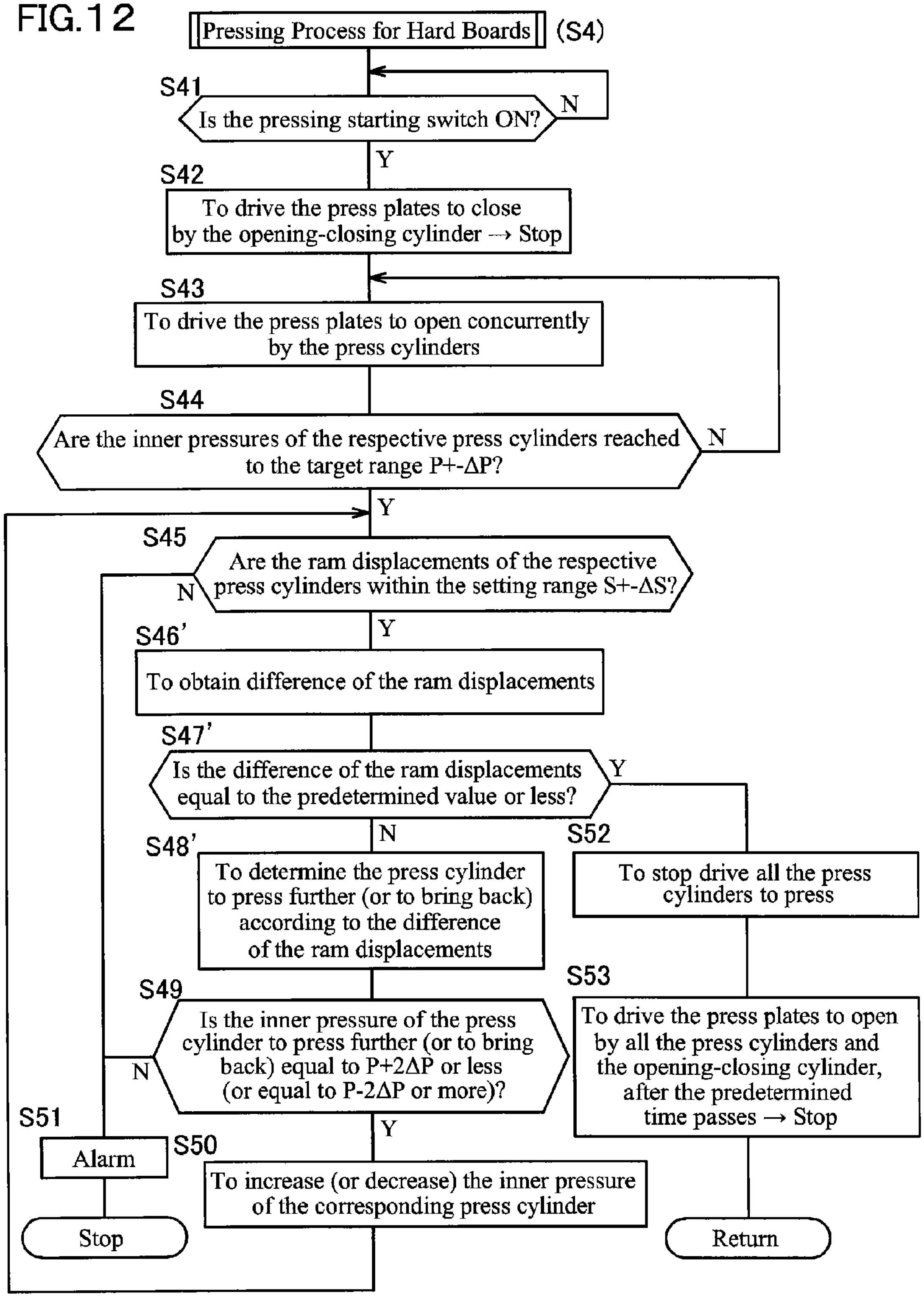
FIG. 12 is a flow chart showing a modified example of FIG. 9.

FIG. 12 is a flow chart showing a modified example of FIG. 9. The subroutine of the pressing process for hard boards (S4) shown on FIG. 12 uses difference of the respective ram displacements (S46') detected by the linear encoders 151LH, 151RH, 151LL, 151RL (displacement detecting means; distance detecting means) instead of inclination of the press plates 140F, 140B (the pressing surfaces 141) calculated on S46 of FIG. 9 (that is inclination of the boards-to-be-processed W1), as an index for determining if the ram displacements (driven distances) of the press cylinders 150LH, 150RH, 150LL, 150RL are within the even range or not. Accordingly, this modified example can simplify the control by omitting the inclination calculating program 23*d* shown on FIG. 7.

Specifically, when the difference level of the respective ram displacement are determined on S47' of FIG. 12, the difference of the ram displacement (maximum allowable width; e.g. 20 mm) used for determination is set smaller (e.g. ½) than width of the setting range of the ram displacement S+−ΔS (e.g. 1770+−20 mm) (maximum allowable width; e.g. 40 mm=+−20 mm). According FIG. 5, the width (25 mm) of the ram displacement (1750 mm) of the lower-lined press cylinders 150LL, 150RL and the ram displacement (1775 mm) of the upper-right press cylinder 150RH exceeds the maximum allowable width (20 mm) (No on S47'). Therefore, it is determined that the lower-lined press cylinders 150LL, 150RL need to press further (S48').

Modified Example 1-3

Figure 13:
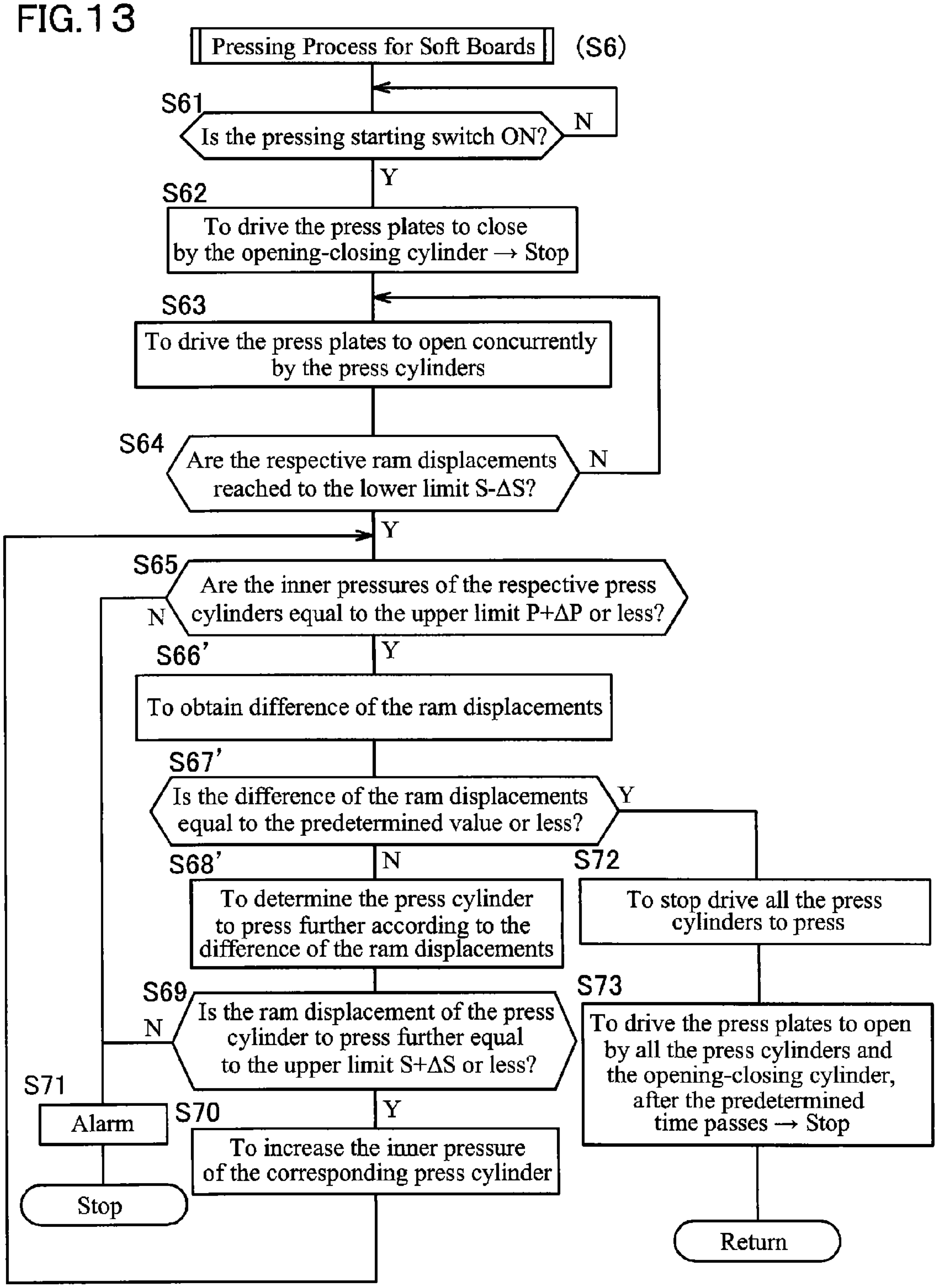
FIG. 13 is a flow chart showing a modified example of FIG. 10.

FIG. 13 is a flow chart showing a modified example of FIG. 10. The subroutine of the pressing process for soft boards (S6) shown on FIG. 13 uses difference of the respective ram displacements (S66') detected by the linear encoders 151LH, 151RH, 151LL, 151RL (displacement detecting means; distance detecting means) instead of inclination of the press plates 140F, 140B (the pressing surfaces 141) calculated on S66 of FIG. 10 (that is inclination of the boards-to-be-processed W1), as an index for determining if the ram displacements (driven distances) of the press cylinders 150LH, 150RH, 150LL, 150RL are within the even range or not. Accordingly, this modified example can also simplify the control by omitting the inclination calculating program 23*d* shown on FIG. 7.

Specifically, when the difference level of the respective ram displacements are determined on S67' of FIG. 13, the difference of the ram displacements (maximum allowable width; e.g. 20 mm) used for determination is set smaller (e.g. ½) than width of the setting range of the ram displacement S+−ΔS (e.g. 1770+−20 mm) (maximum allowable width; e.g. 40 mm=+−20 mm). According FIG. 5, the width (25 mm) of the ram displacement (1750 mm) of the lower-lined press cylinders 150LL, 150RL and the ram displacement (1775 mm) of the upper-right press cylinder 150RH exceeds the maximum allowable width (20 mm) (No on S67'). Therefore, it is determined that the lower-lined press cylinders 150LL, 150RL need to press further (S68').

Embodiment 2

Figure 14:
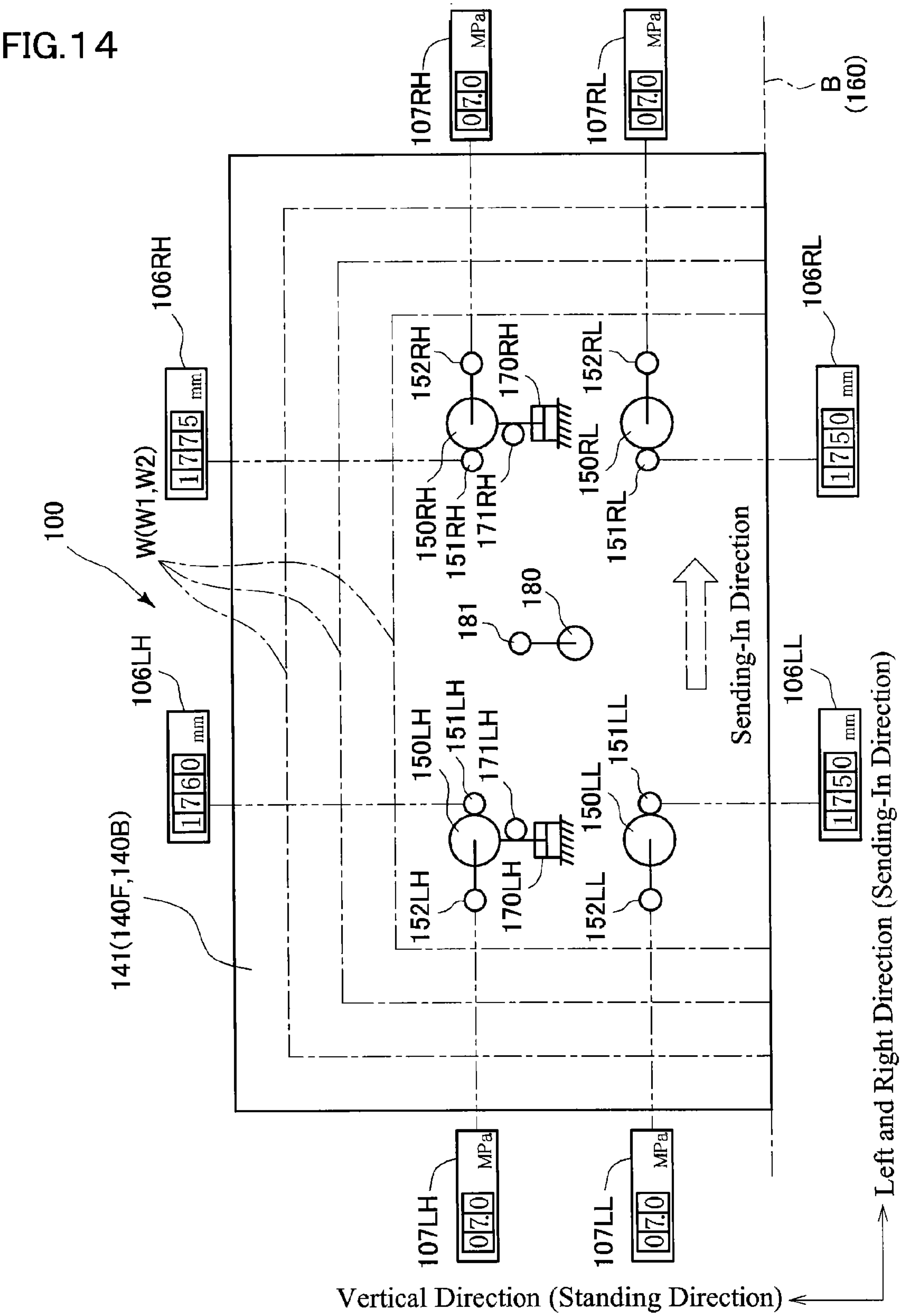
FIG. 14 is an elevation view showing another example of an alignment relation of the press control system.
Figure 15:
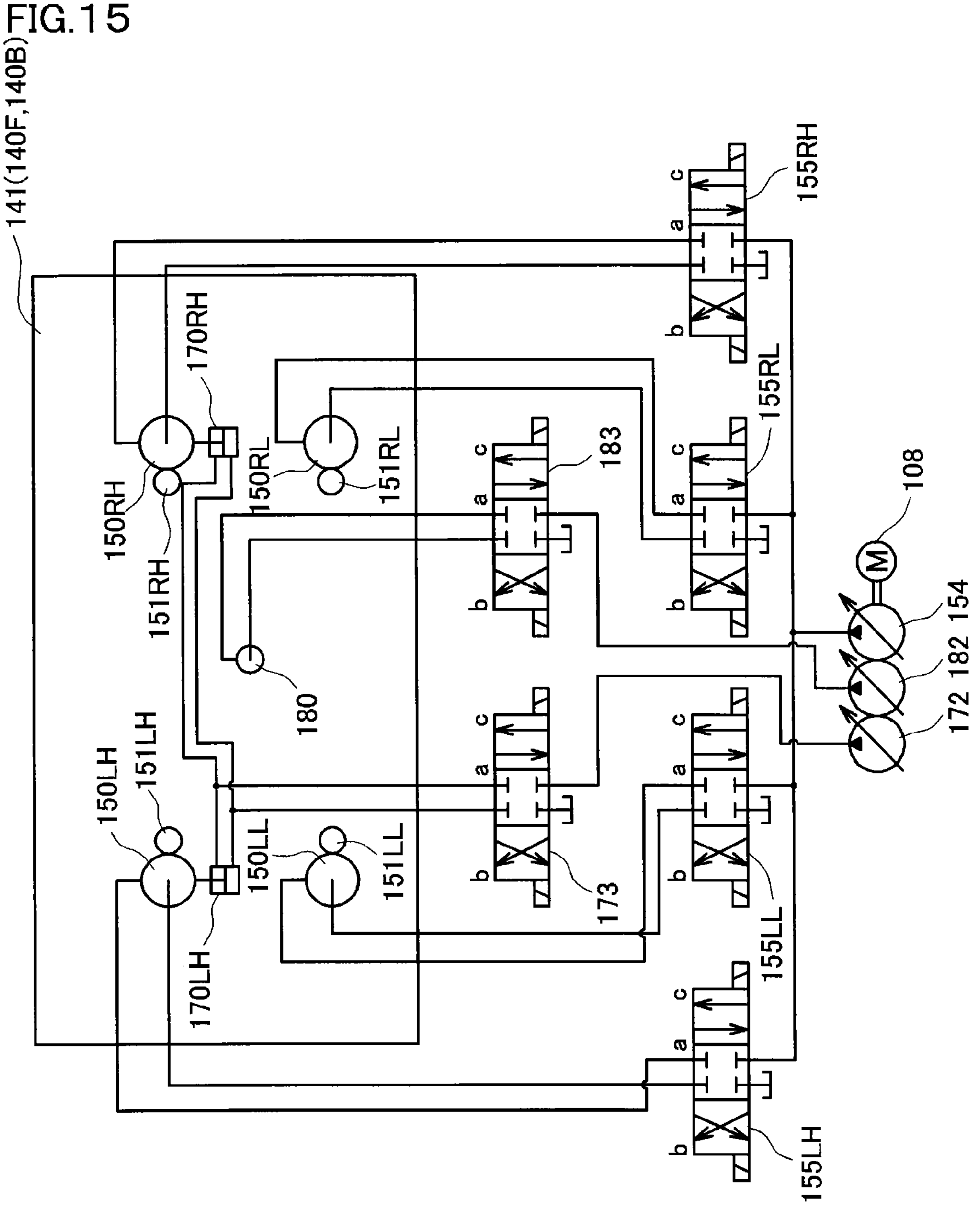
FIG. 15 is a hydraulic circuit diagram of FIG. 14.
Figure 16:
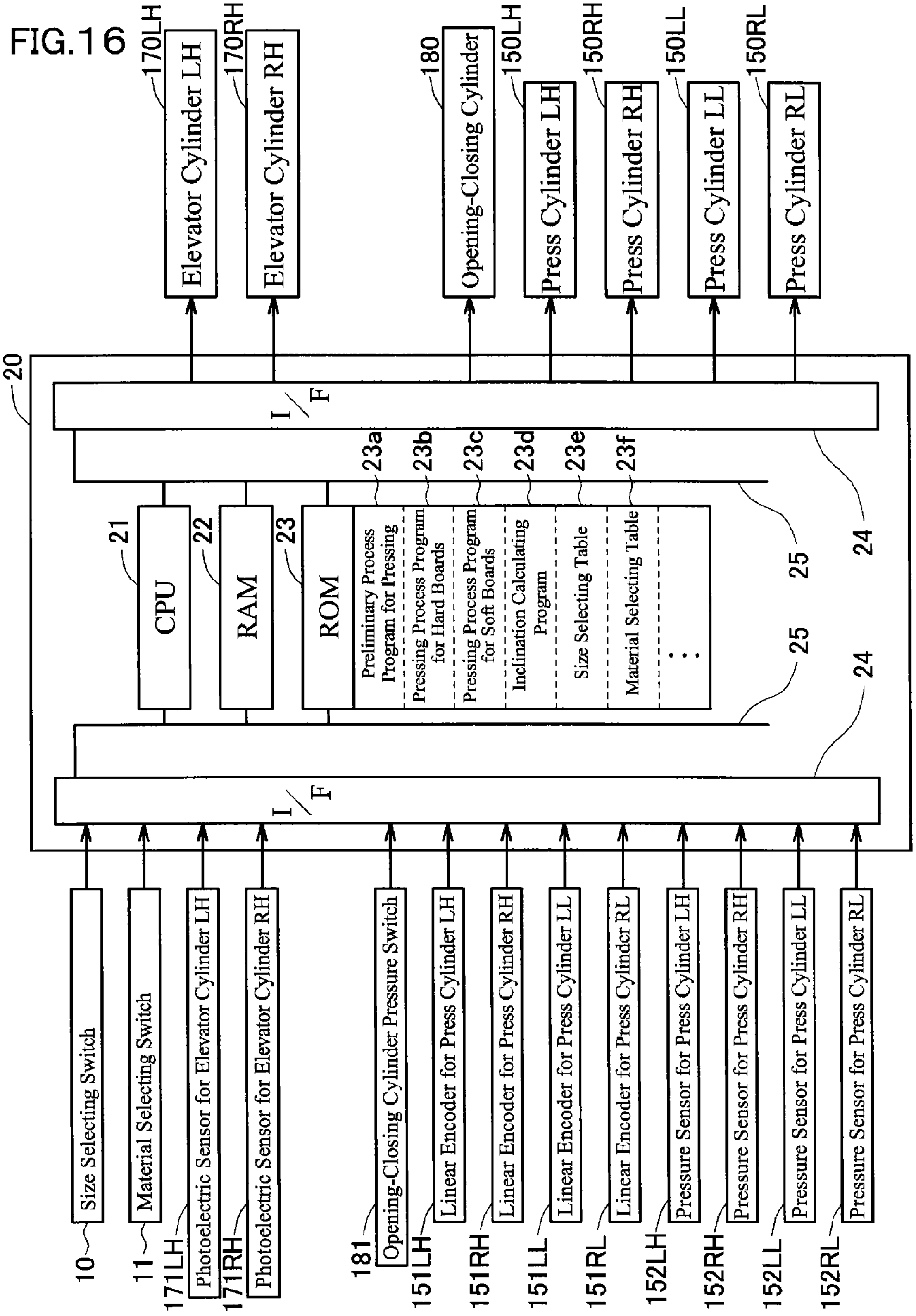
FIG. 16 is a block diagram showing an electrical configuration of FIG. 14.

FIG. 14 is an elevation view showing another example of an alignment relation of the press control system, FIG. 15 is a hydraulic circuit diagram thereof, and FIG. 16 is a block diagram showing an electrical configuration thereof. Regarding the hotpress 100 (hot-pressing member; press structure) shown on the alignment view of FIG. 14, the lower-lined press cylinders 150LL, 150RL (hydraulic cylinders; fluid pressure cylinders) are constructed as fixed press cylinders having fixed pressing positions to the pressing surfaces 141 of the press plates 140F, 140B. Whereas, the upper-lined press cylinders 150LH, 150RH (hydraulic cylinders; fluid pressure cylinders) are constructed as mobile press cylinders having pressing positions shiftable vertically to the pressing surfaces 141 of the press plates 140F 1408. Then, elevator cylinders 170LH, 170RH (hydraulic cylinders; fluid pressure cylinders) are provided as pressing position control-to-shift features of the upper press cylinders 150LH, 150RH. Also, the elevator cylinders 170LH, 170RH comprise photoelectric sensors for elevator cylinders 171LH, 171RH (shift detecting means), which detect positions of the press cylinders 150LH, 150RH shifting up or down.

As shown on the hydraulic circuit diagram of FIG. 15, an electromagnetic switching valve 173, which is a 4-port and 3-position switching type, is disposed between a elevator cylinder hydraulic pressure pump 172, which is a variable capacity type driven by an electrical motor 108, and the elevator cylinders 170LH, 170RH. The electromagnetic switching valve 173 connects the hydraulic pressure pump 172 and the respective elevator cylinders 170LH, 170RH to an elevating direction of the press cylinders 150LH, 150RH when switched from the neutral position a to the position b, and also connects to a decreasing direction when switched to the position c.

As shown on the block diagram of FIG. 16, according to input of the size selecting switch 10, a control output signal for shifting up and down the press cylinders 150LH, 150RH is input from the control board 20 (cylinder controller) through the input-output interface 24 to the respective elevator cylinders 170LH, 170RH. Whereas, according to up or down movement of the press cylinders 150LH, 150RH by the elevator cylinders 170LH, 170RH, position detection signals of the photoelectric sensors 171LH, 171RH are input to the control board 20 through the input-output interface 24.

Figure 17:
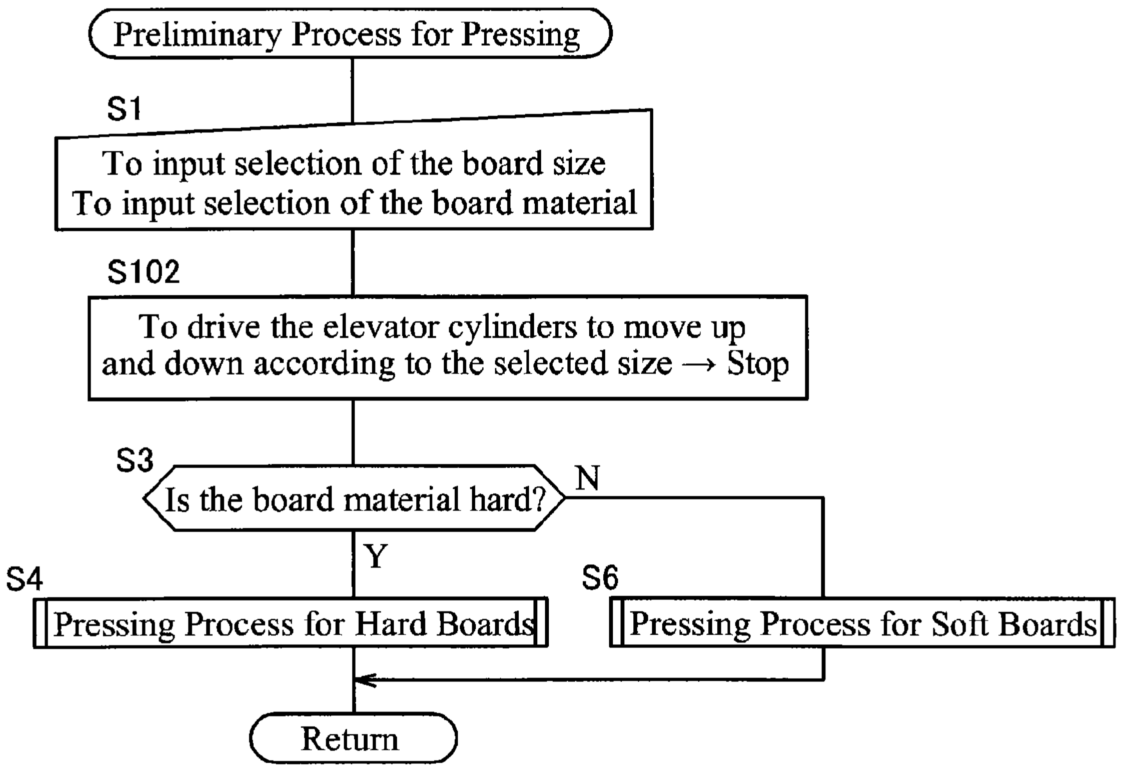
FIG. 17 is a flow chart showing a preliminary process for pressing.

Accordingly, the flow chart of the preliminary process for pressing explained for the embodiment 1 (FIG. 8) is modified for this embodiment as shown on FIG. 17.

Regarding the preliminary process for pressing shown in FIG. 17, firstly on S1, size (6-shaku board, 8-shaku board, 10-shaku board or the like) and material (hard board, soft board, or the like) of the boards-to-be-processed W1 is input manually with the size selecting switch 10 and the material selecting switch 11. Based on the inputs, on S102, according to the size of the boards-to-be-processed W1, the elevator cylinders 170LH, 170 RH are driven to shift up or down by turning the electromagnetic switching valve 173 to the position b or c, and stopped the elevation drive by detection of the photoelectric sensors 171LH, 171RH. Next, confirming the selected material on S3, if the material is hard boards (YES on S3), the pressing process for hard boards is conducted on S4 so as to complete the preliminary process for pressing, if the material is soft boards (NO on S3), the pressing process for soft boards is conducted on S6.

Regarding this embodiment, the upper-lined press cylinders 150LH, 150RH are mobile press cylinders capable of shifting pressing positions. Therefore, even when size of the boards-to-be-processed W1 changes so as that the upper side height the boards-to-be-processed W1 changes, it can still suppress inclination of the boards-to-be-processed W1 by adjusting the pressing position of the upper-lined press cylinders 150LH, 150RH.

Modified Example 2

Figure 18:
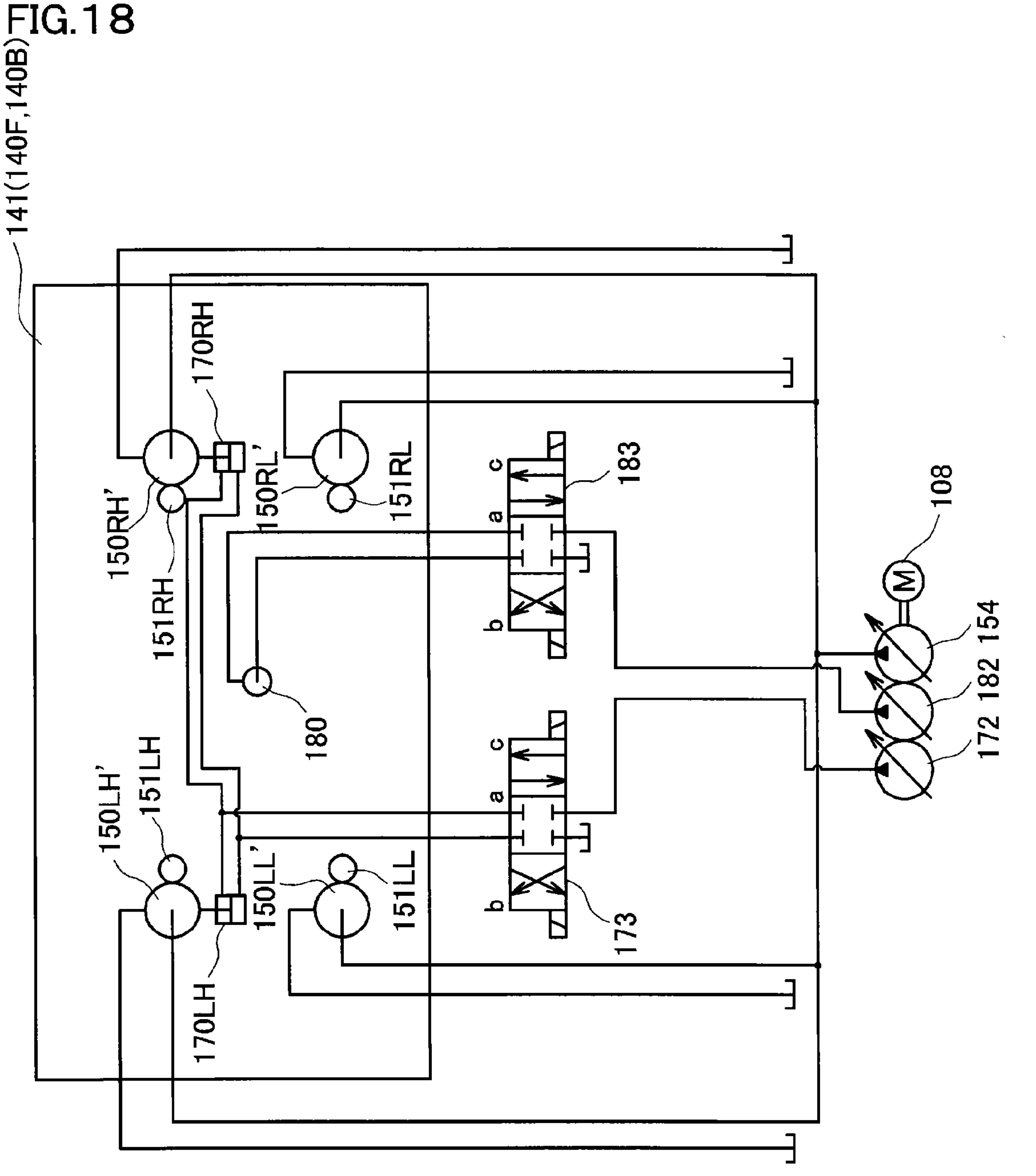
FIG. 18 is a hydraulic circuit diagram showing a modified example of FIG. 15.

FIG. 18 is a hydraulic circuit diagram showing a modified example of FIG. 15. Servo cylinders 150LH', 150RH', 150LL', 150RL'are used for the press cylinders shown on FIG. 18, similarly to the modified example 1-1 (FIG. 11). Accordingly, this modified example can also simplify the hydraulic pressure circuit and control precisely.

Embodiment 3

Figure 19:
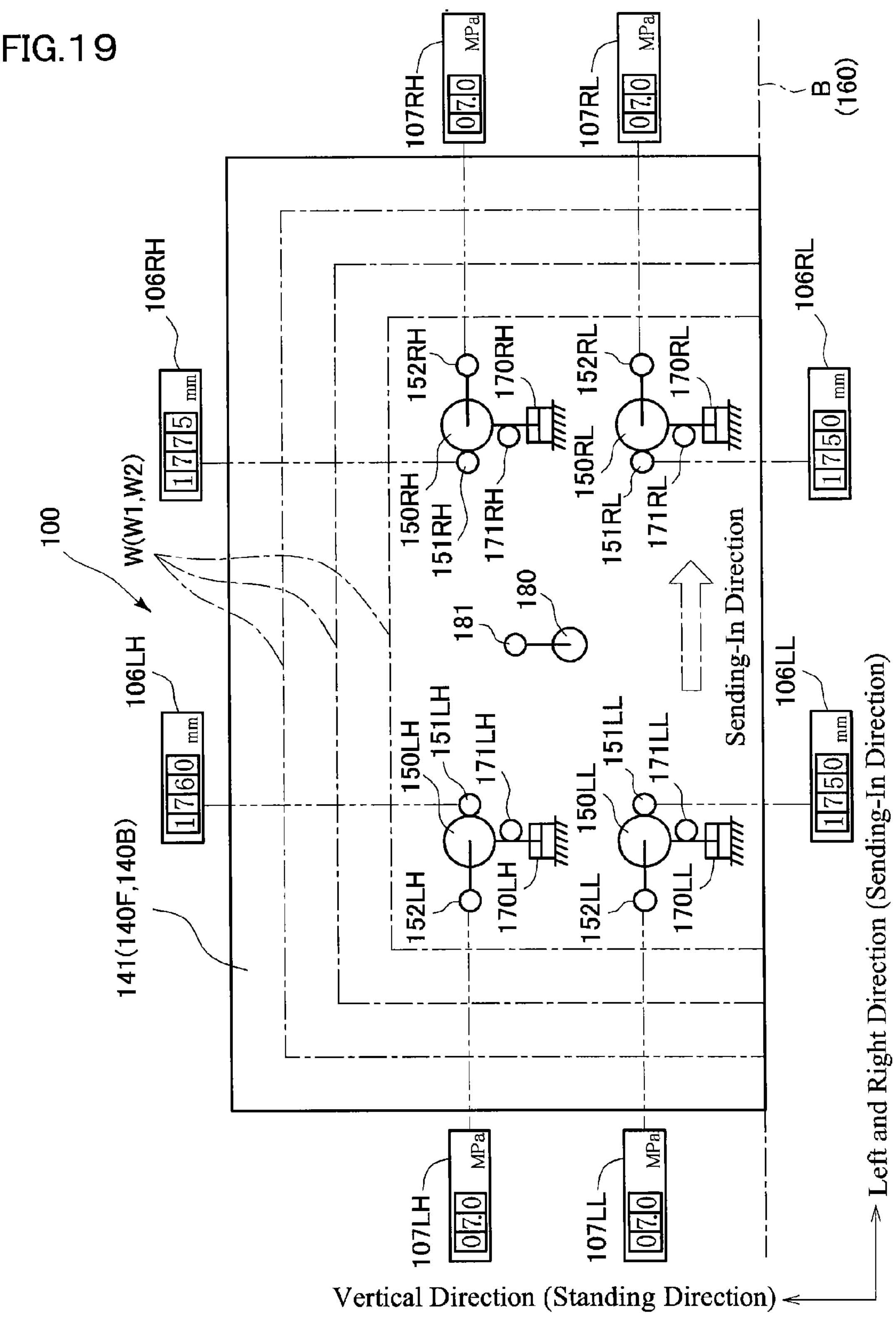
FIG. 19 is an elevation view showing yet another example of an alignment relation of the press control system.
Figure 20:
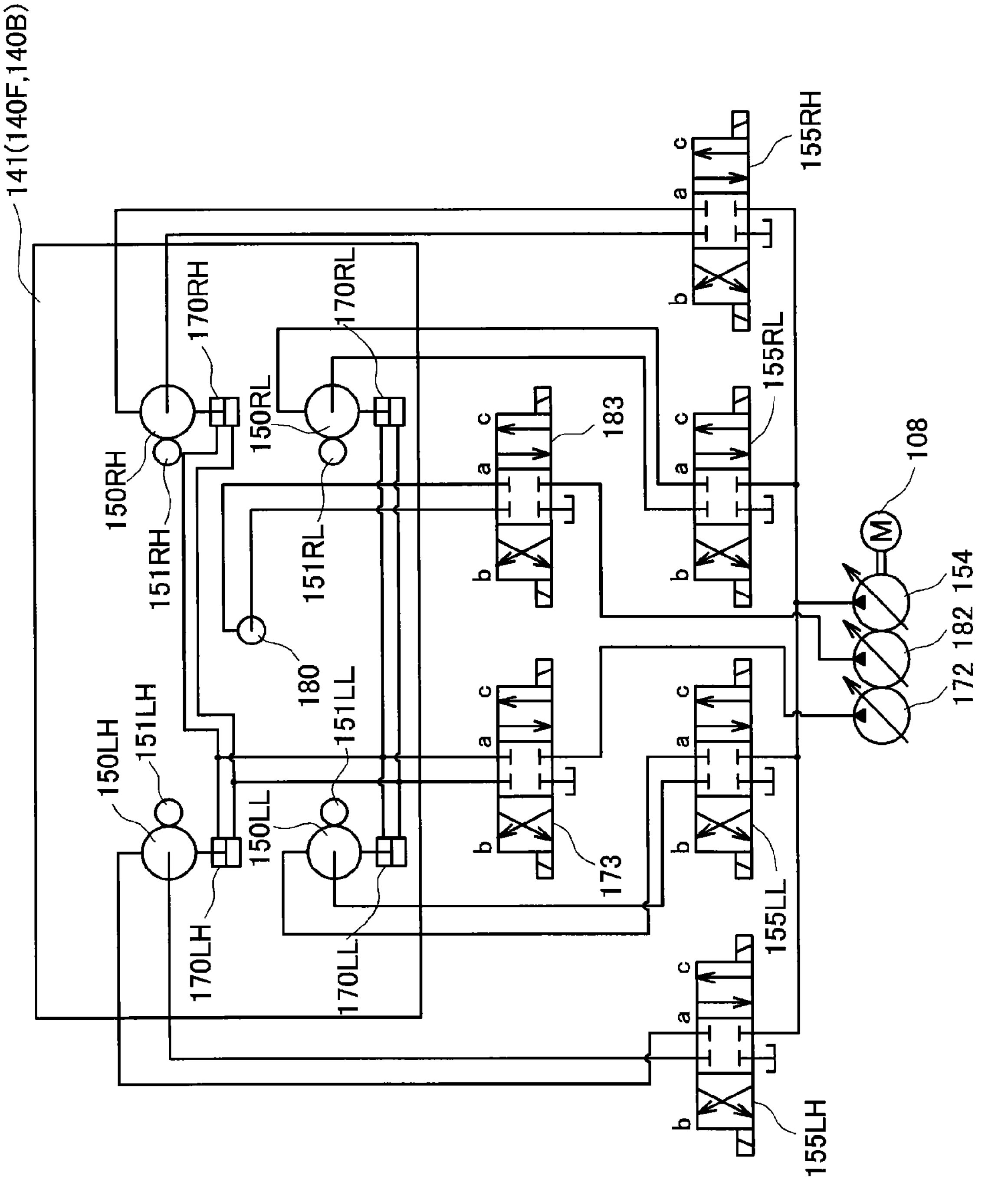
FIG. 20 is a hydraulic circuit diagram of FIG. 19.
Figure 21:
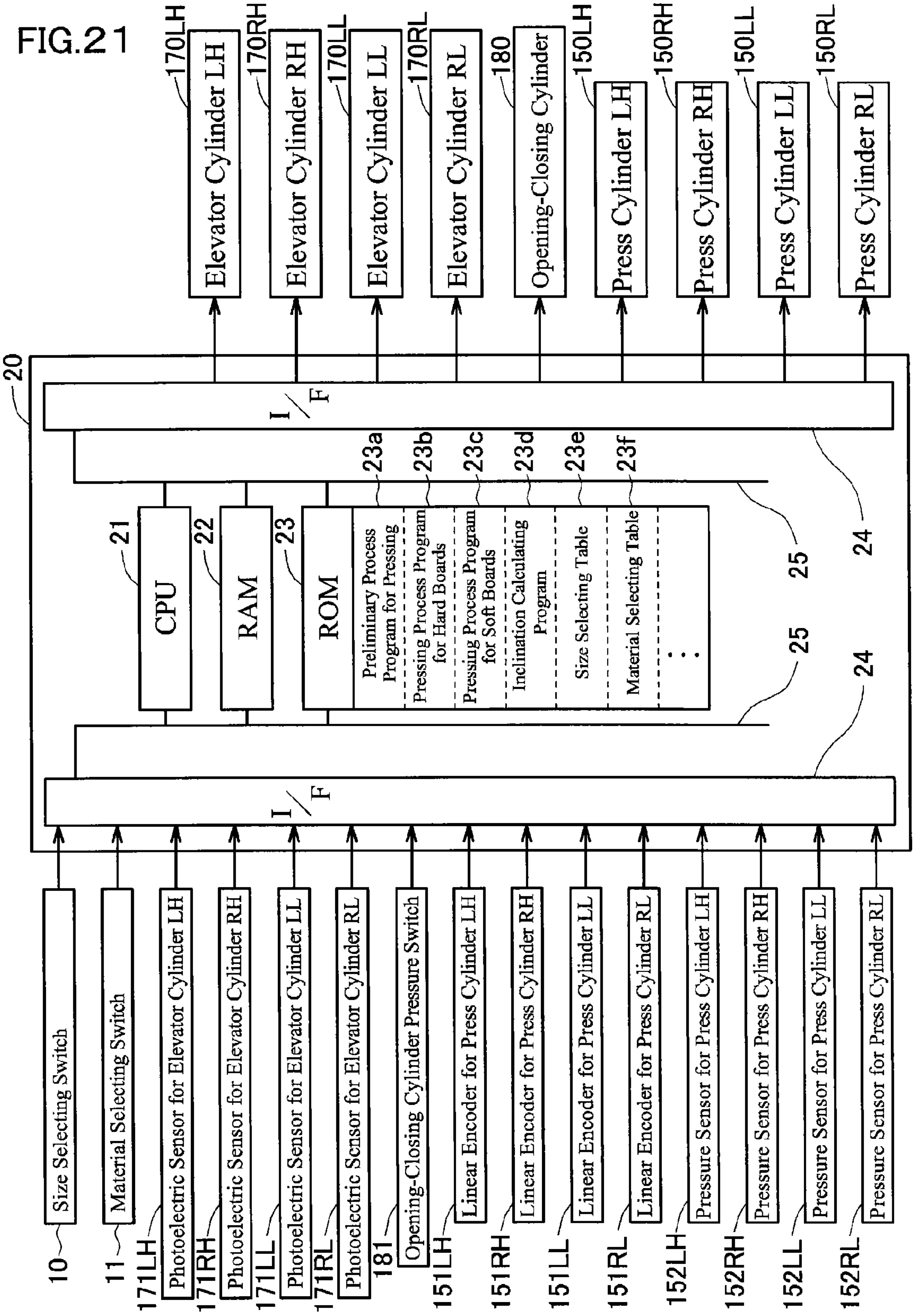
FIG. 21 is a block diagram showing an electrical configuration of FIG. 19.

FIG. 19 is an elevation view showing yet another example of an alignment relation of the press control system, FIG. 20 is a hydraulic circuit diagram thereof, and FIG. 21 is a block diagram showing an electrical configuration thereof. Regarding the hotpress 100 (hot-pressing member; press structure) shown on the alignment view of FIG. 19, additionally to the upper-lined press cylinders 150LH, 150RH (hydraulic cylinders; fluid pressure cylinders), the lower-lined press cylinders 150LL, 150RL (hydraulic cylinders; fluid pressure cylinders) are also constructed as mobile press cylinders having pressing positions shiftable vertically to the pressing surfaces 141 of the press plates 140F 140B. Accordingly, elevator cylinders 170LL, 170RL (hydraulic cylinders; fluid pressure cylinders) are provided additionally as pressing position control-to-shift features of the lower-lined press cylinders 150LL, 150RL. Also, the elevator cylinders 170LL, 170RL comprise photoelectric sensors for elevator cylinders 171LL, 171RL (shift detecting means) of detecting positions of the press cylinders 150LL, 150RL shifting up or down.

As shown on the hydraulic circuit diagram of FIG. 20, an electromagnetic switching valve 173, which is also disposed between a elevator cylinder hydraulic pressure pump 172 and the elevator cylinders 170LL, 170RL. Accordingly, The electromagnetic switching valve 173 connects the hydraulic pressure pump 172 and the elevator cylinders 170LL, 170RL to an elevating direction of the press cylinders 150LL, 150RL when switched from the neutral position a to the position b, and also connects to a decreasing direction when switched to the position c.

As shown on the block diagram of FIG. 21, according to the input of the size selecting switch 10, control output signals for shifting up and down the press cylinders 150LL, 150RL are input from the control board 20 (cylinder controller) through the input-output interface 24 to the respective elevator cylinders 170LL, 170RL. Whereas, according to up or down movement of the press cylinders 150LL, 150RL by the elevator cylinders 170LL, 170RL, position detection signals of the photoelectric sensors 171LL, 171 RL are input to the control board 20 through the input-output interface 24.

Modified Example 3

Figure 22:
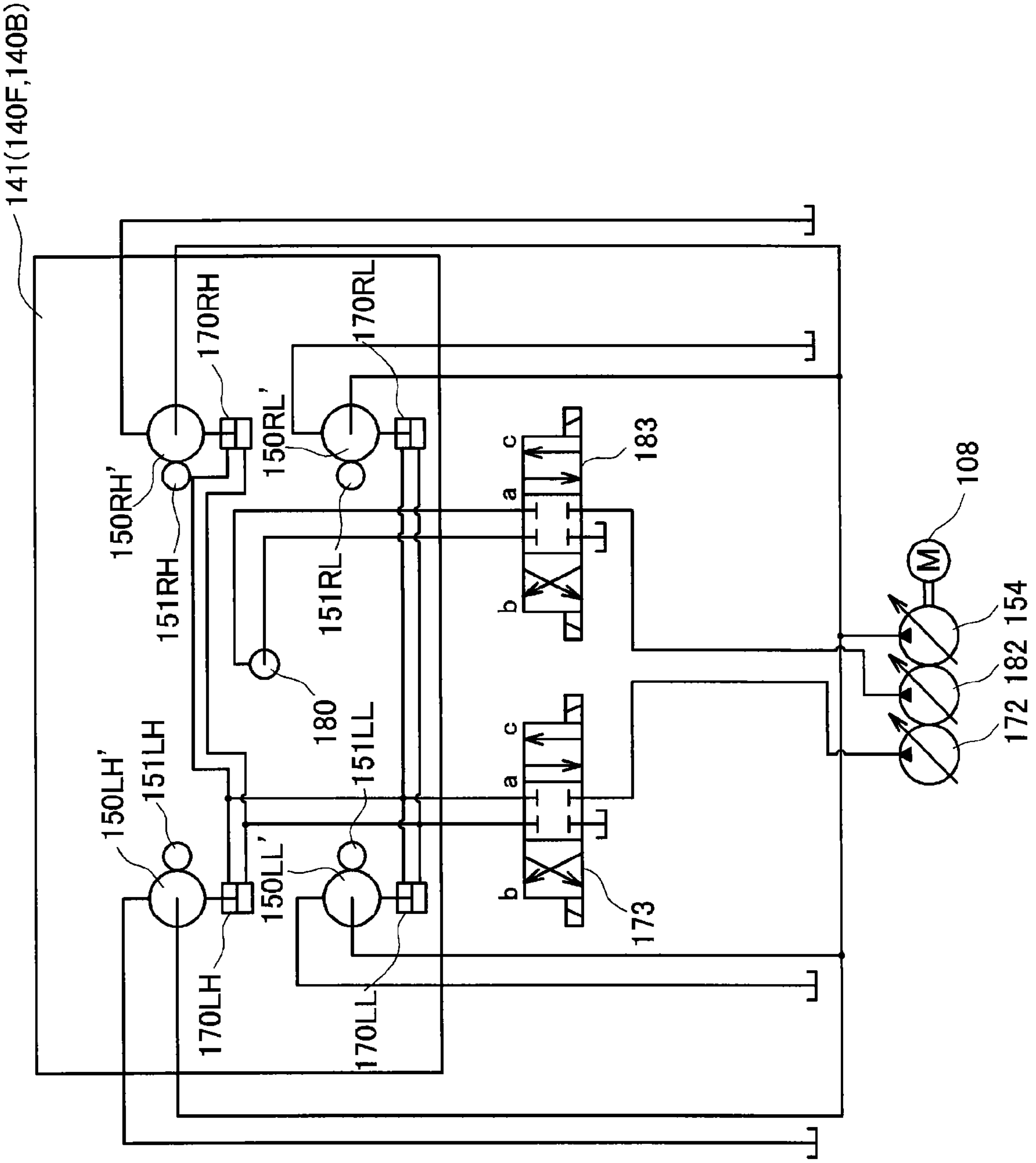
FIG. 22 is a hydraulic circuit diagram showing a modified example of FIG. 20.

FIG. 22 is a hydraulic circuit diagram showing a modified example of FIG. 20. Servo cylinders 150LH', 150RH', 150LL', 150RL'are used for the press cylinders shown on FIG. 22, similarly to the modified example 1-1 (FIG. 11). Accordingly, this modified example can also simplify the hydraulic pressure circuit and control precisely.

Embodiment 4

Figure 23:
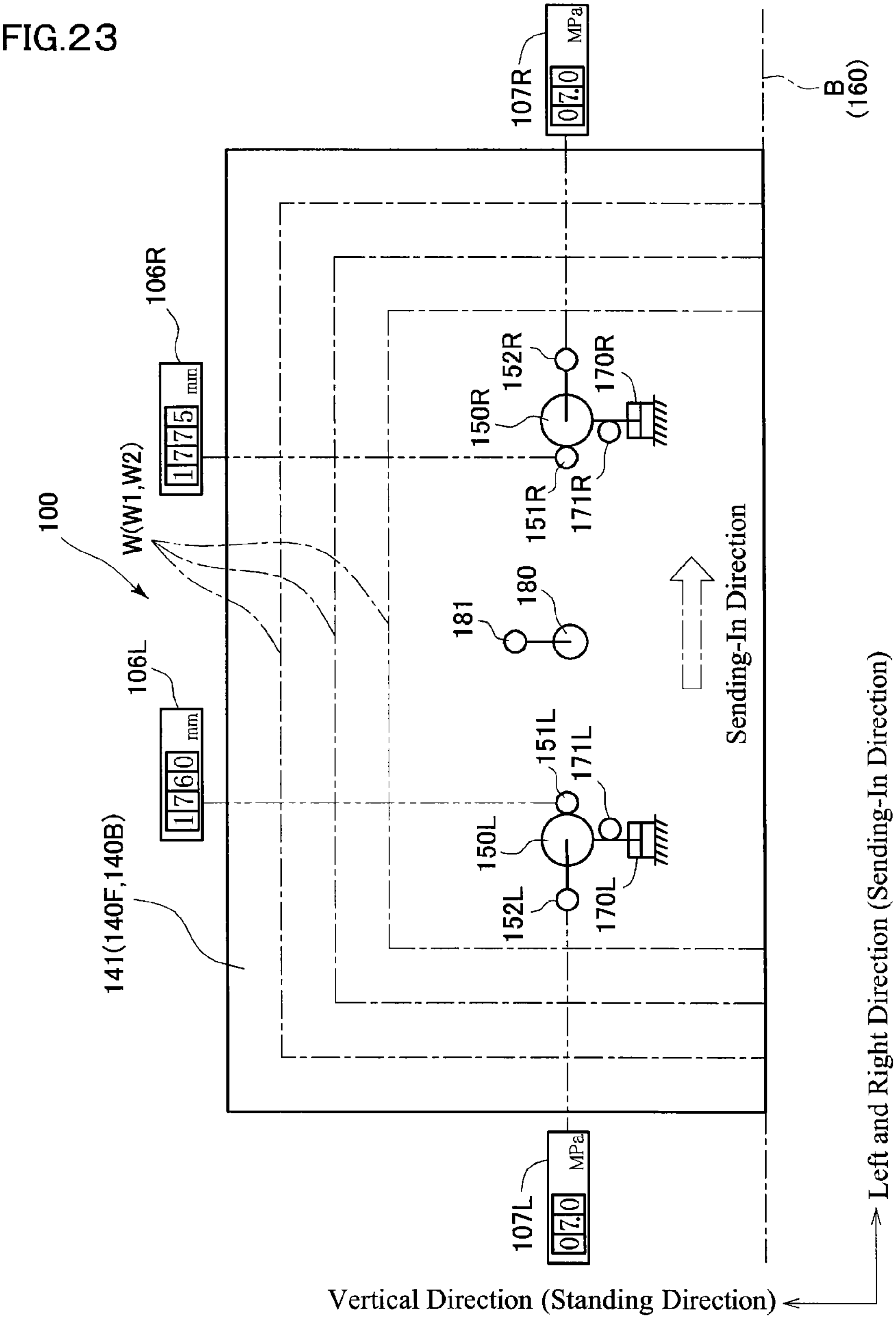
FIG. 23 is an elevation view showing yet another example of an alignment relation of the press control system.
Figure 24:
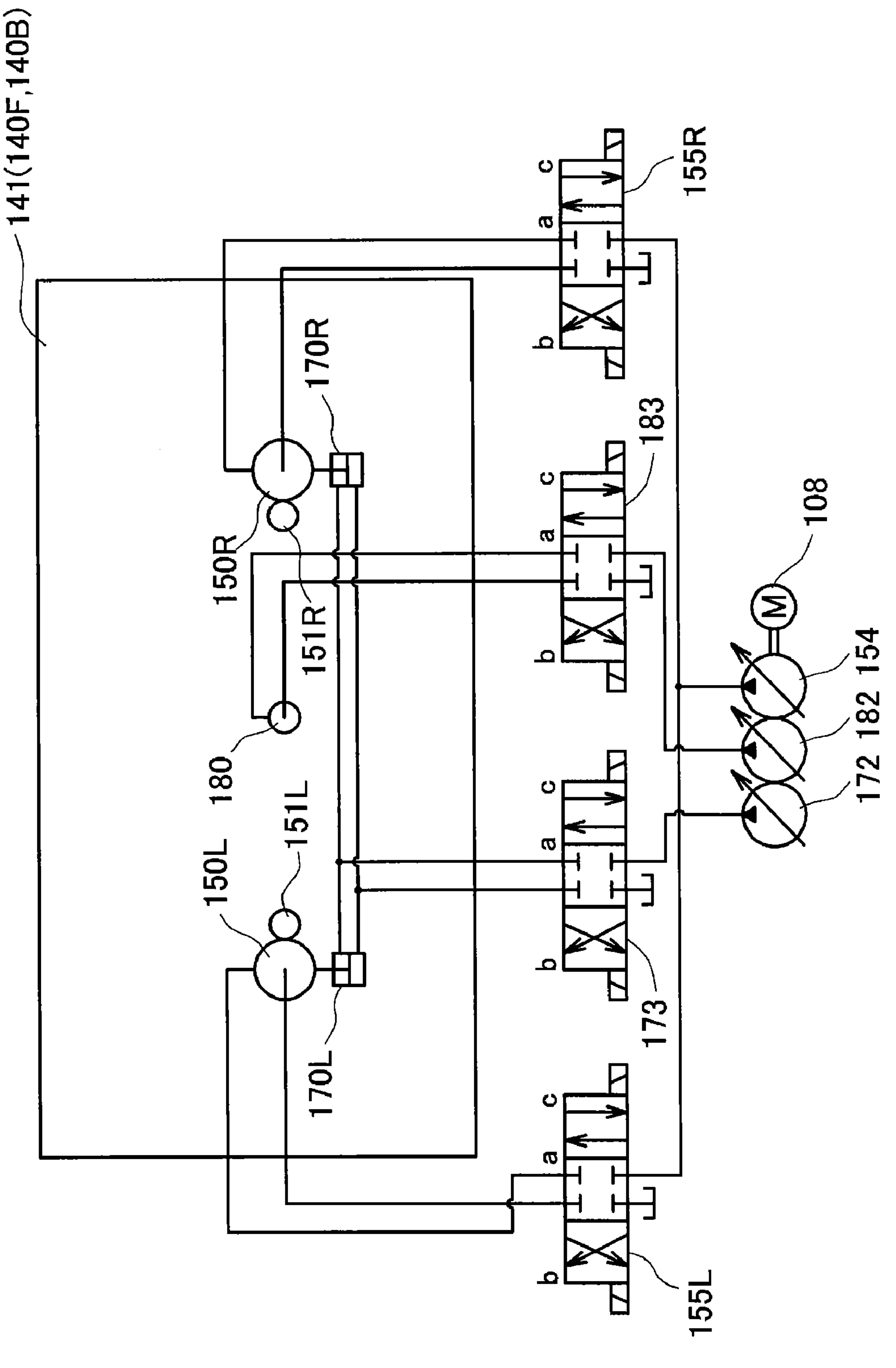
FIG. 24 is a hydraulic circuit diagram of FIG. 23.
Figure 25:
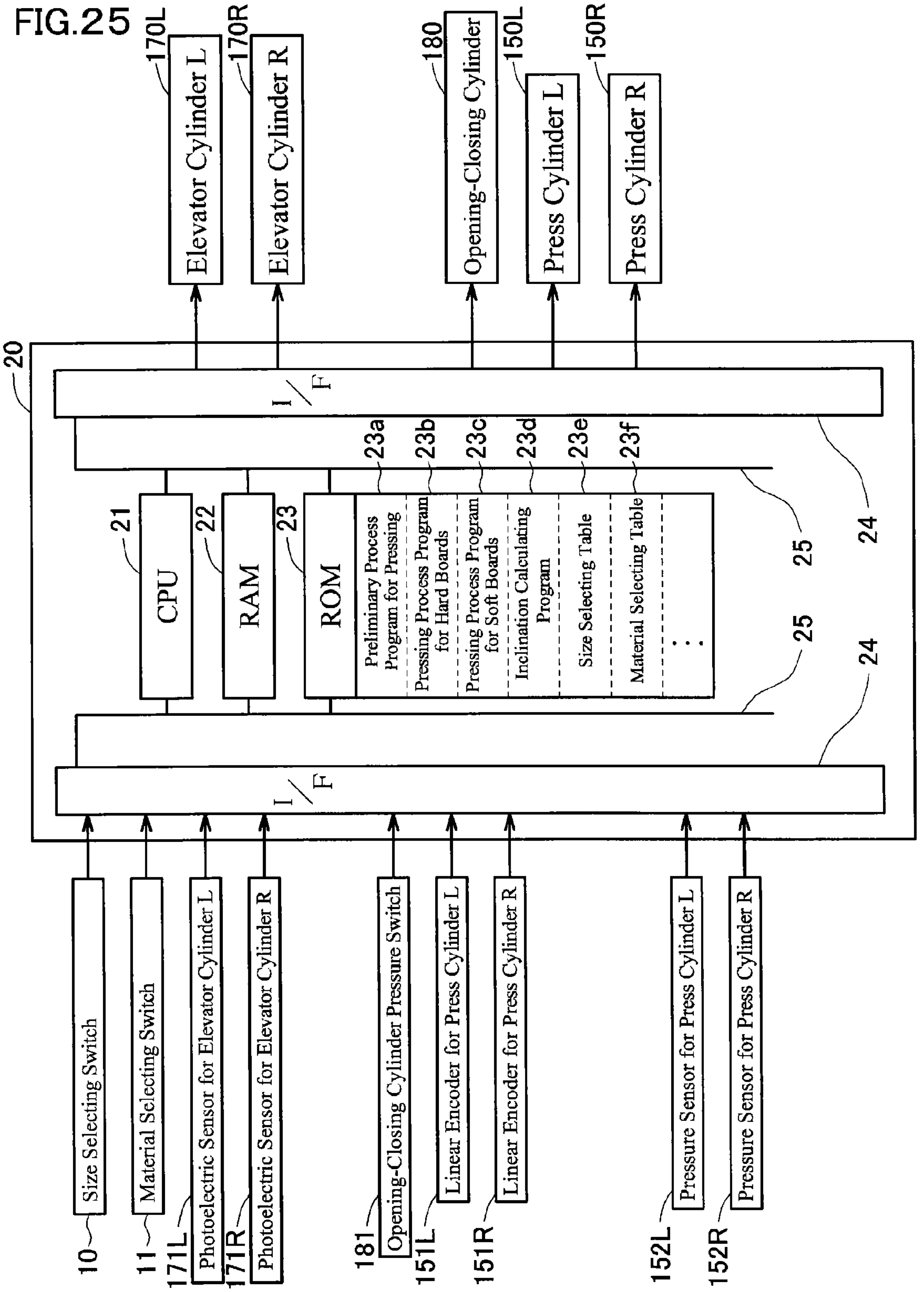
FIG. 25 is a block diagram showing an electrical configuration of FIG. 23.

FIG. 23 is an elevation view showing yet another example of an alignment relation of the press control system, FIG. 24 is a hydraulic circuit diagram thereof, and FIG. 25 is a block diagram showing an electrical configuration thereof. The hotpress 100 (hot-pressing member; press structure) shown on the alignment view of FIG. 23 comprise two press cylinders, and these two press cylinders 150L, 150R (hydraulic cylinders; fluid pressure cylinders) are distanced from the conveying reference plane B for the same space with the opening-closing cylinder 180 (hydraulic cylinders; fluid pressure cylinders), and disposed at left and right having the opening-closing cylinder 180 therebetween.

The respective press cylinders 150L, 150R comprises linear encoders for press cylinders 151L, 151R (displacement detecting means; distance detecting means), which detect loss of the entire thickness of the object-to-be-processed W as the ram displacement (driven distance), and pressure sensors for press cylinders 152L, 152R (pressure detecting means), which detect pressing pressure of the press plates 140F, 140B as the cylinder inner pressure (driven pressure) of the press cylinders 150L, 150R. Elevator cylinders 170L, 170R (hydraulic cylinders; fluid pressure cylinders) are provided as pressing position control-to-shift features of the press cylinders 150L, 150R. Also, the elevator cylinders 170L, 170H comprise photoelectric sensors for elevator cylinders 171L, 171R (shift detecting means) which detect positions of the press cylinders 150L, 150R shifting up or down.

As shown on a hydraulic circuit diagram of FIG. 24, electromagnetic switching valves 155L, 155R, which are a 4-port and 3-position switching type, are respectively disposed between a press cylinder hydraulic pressure pump 154, which is a variable capacity type driven by an electrical motor 108, and the respective press cylinders 150L, 150R. The respective electromagnetic switching valves 155L, 155R connect the hydraulic pump 154 and the press cylinders 150L, 150R to a closing direction of the press plates 140F, 140B when switched from the neutral position a to the position b, and connect to a opening direction of the press plates 140F, 140B when switched to the position c. Also, in order to control drive of the press cylinders 150L, 150R highly accurately, it is desirable to apply PWM control based on duty ratio (so called duty control) or the like to these electromagnetic switching valves 155L, 155R.

An electromagnetic switching valve 173, which is a 4-port and 3-position switching type, is disposed between a opening-closing cylinder hydraulic pressure pump 172, which is a variable capacity driven by the electrical motor 108, and the respective elevator cylinders 170L, 170R. The electromagnetic switching valve 173 connects the hydraulic pump 172 and the respective elevator cylinders 170L, 170R to a elevating direction of the press cylinders 150L, 150R when switched from the neutral position a to the position b, and connects to a decreasing direction similarly when switched to the position c.

In this way, the press cylinders 150L, 150R are constructed as two mobile (elevating type) ones which have pressing position shiftable vertically to the pressing surfaces 141 of the press plates 140F, 140B, and thus structure of the hotpress 100 can be simplified further. Also, the block diagram of FIG. 25 is configured based on the modifications of FIGS. 23 and 24, however the differences from the bock charts shown in the embodiments 1 to 3 (FIGS. 7, 16 and 21) have already been explained and obvious, and thus the explanation of FIG. 25 will be omitted.

Modified Example 4

Figure 26:
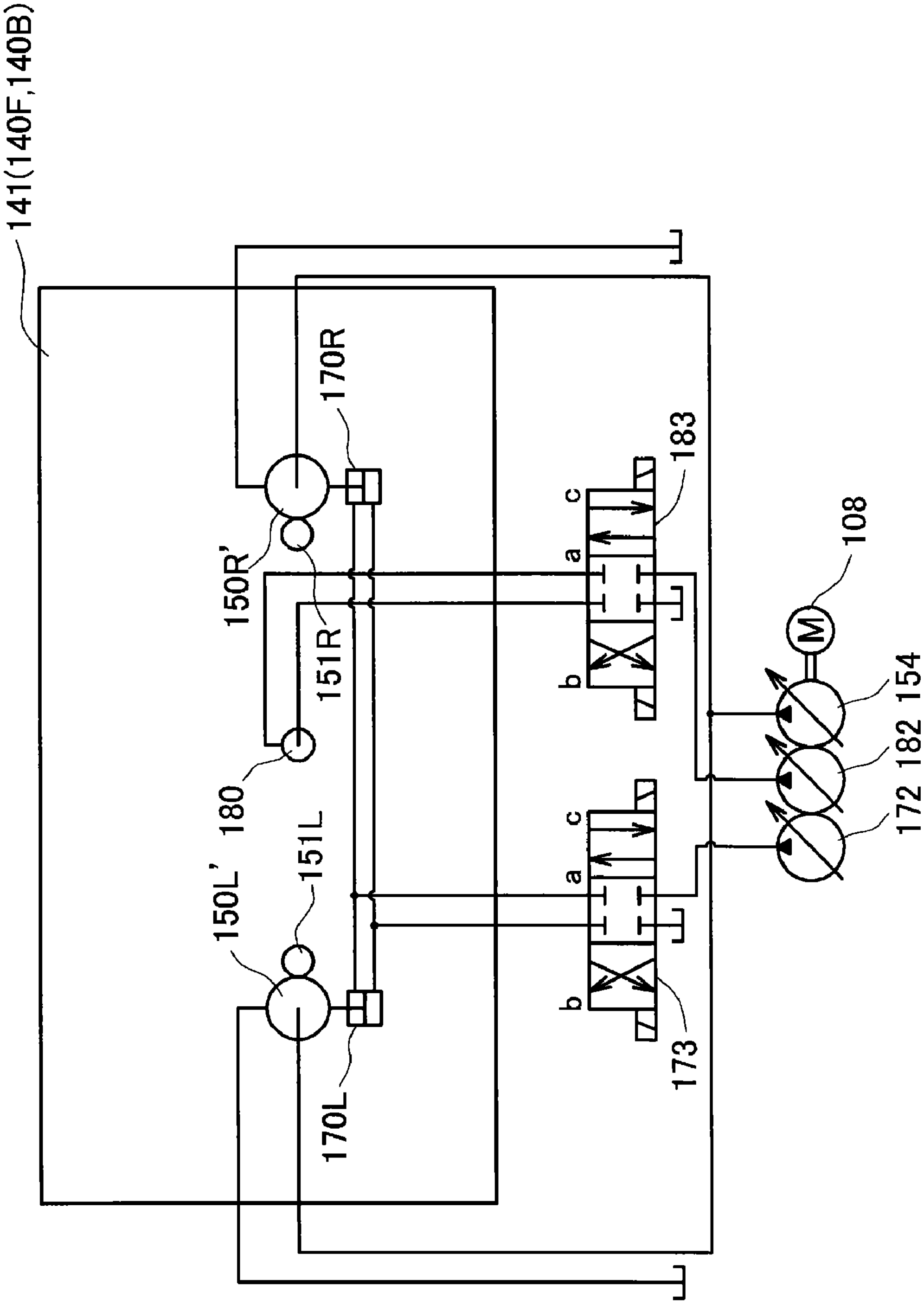
FIG. 26 is a hydraulic circuit diagram showing a modified example of FIG. 24.

FIG. 26 is a hydraulic circuit diagram showing a modified example of FIG. 24. Servo cylinders 150L', 150R' are used also for the press cylinders shown on FIG. 26, similarly to the modified example 1-1 (FIG. 11). Accordingly, this modified example can also simplify the hydraulic pressure circuit and control precisely.

Embodiment 5

Figure 27:
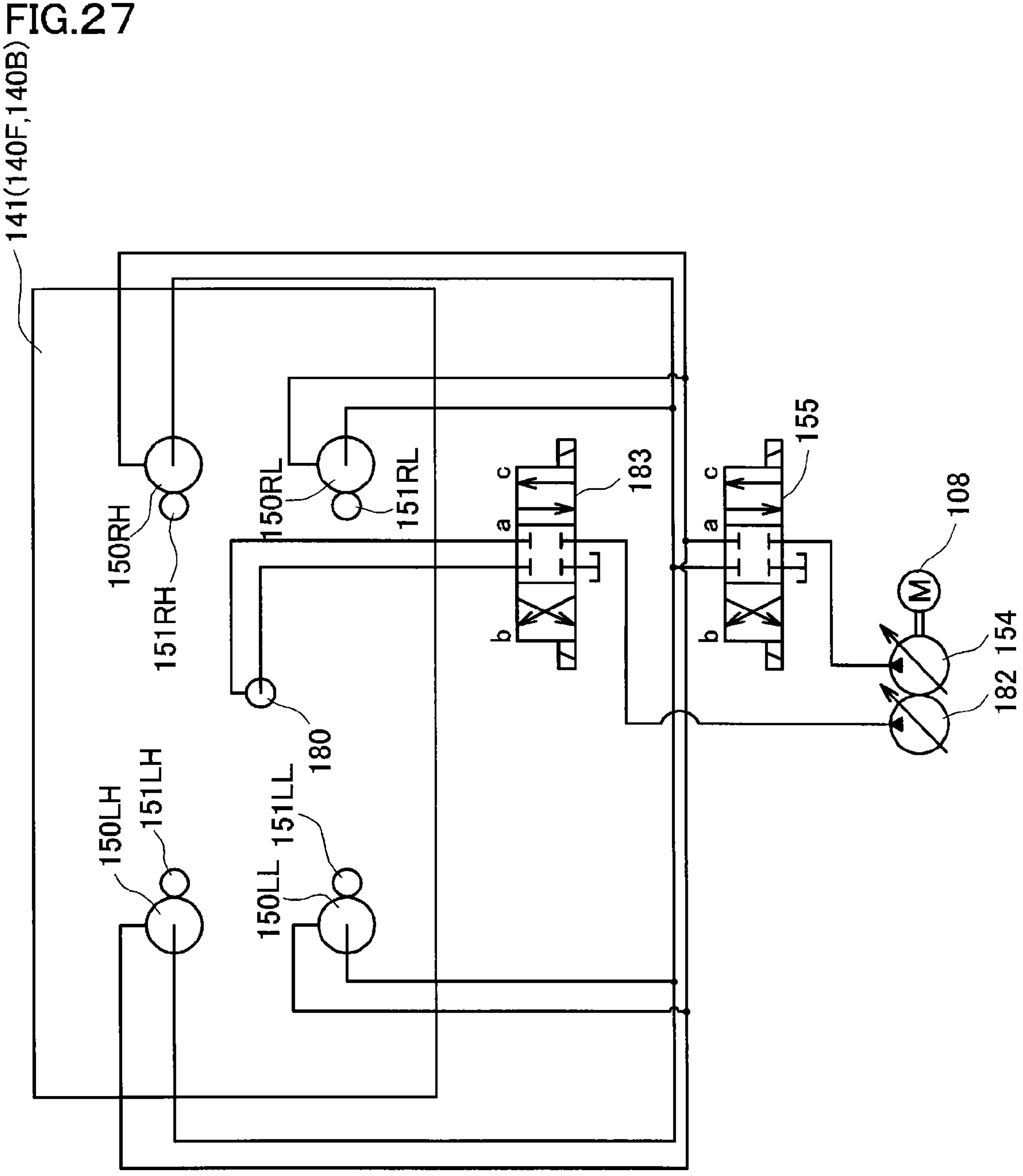
FIG. 27 is a hydraulic circuit diagram showing yet another example of the press control system.
Figure 28:
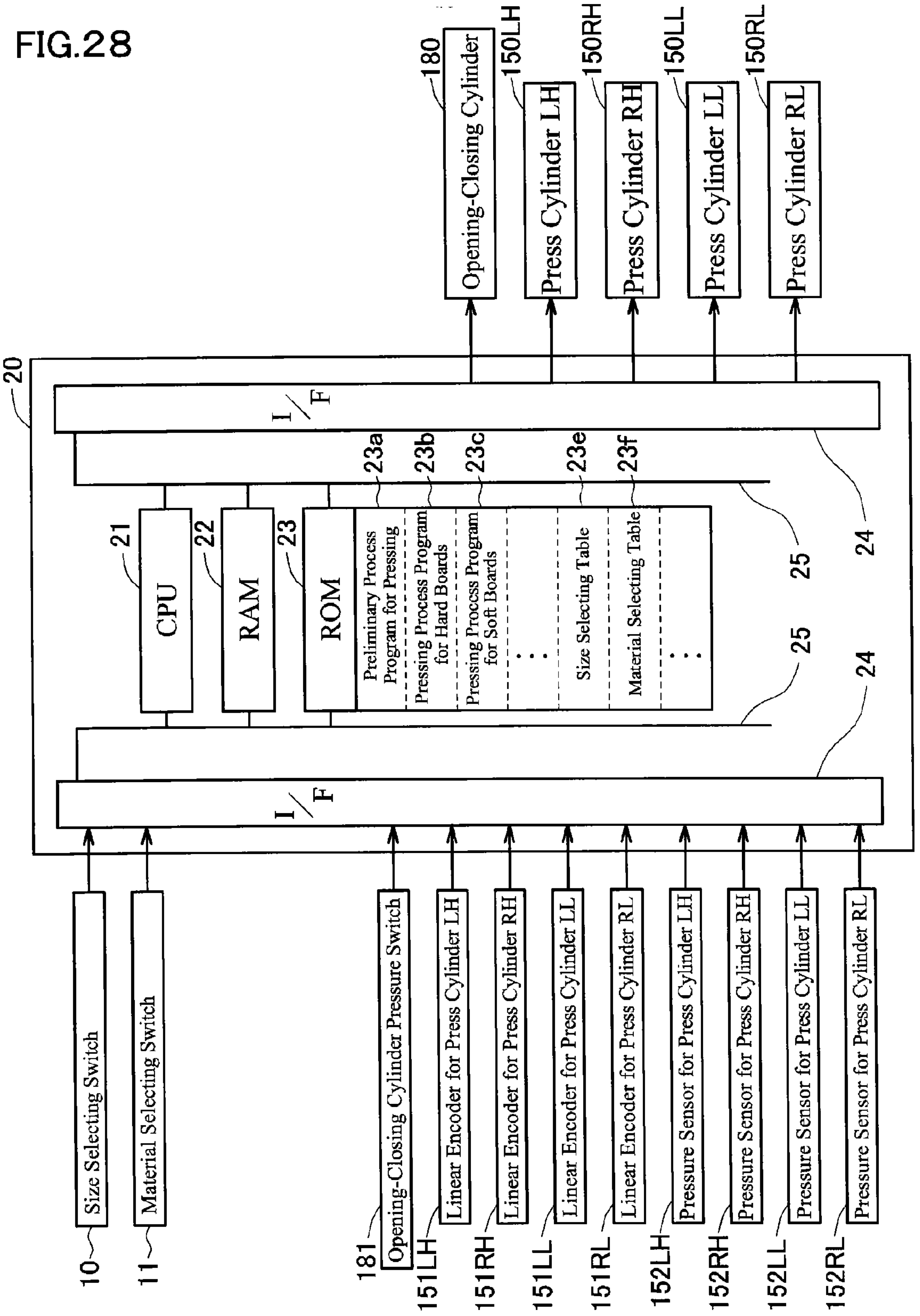
FIG. 28 is a block diagram showing an electrical configuration of FIG. 27.

FIG. 27 is a hydraulic circuit diagram showing yet another example of the press control system, and FIG. 28 is a block diagram showing an electrical configuration thereof. The press control system shown for this embodiment employs a method of controlling drive of a plurality (e.g. four) of the press cylinders jointly (mutually) instead of individually (respectively), and however the alignment relation is similar to the embodiment 1 (FIG. 5).

However, regarding to the hydraulic circuit diagram of FIG. 27, unlike the embodiment 1 (FIG. 6), a single electromagnetic switching valve 155, which is a 4-port and 3-position switching type, is disposed between a press cylinder hydraulic pressure pump 154, which is a variable capacity type driven by an electrical motor 108, and the respective press cylinders 150LH, 150RH, 150LL, 150RL. The electromagnetic switching valve 155 connects the hydraulic pump 154 and the press cylinders 150LH, 150RH, 150LL, 150RL concurrently to a closing direction of the press plates 140F, 140B when switched from the neutral position a to the position b, and connect to a opening direction of the press plates 140F, 140B when switched to the position c. Also, regarding to the block diagram of FIG. 28, unlike the embodiment 1 (FIG. 7), a inclination calculating program is omitted for the ROM 23 of the control board 20 (cylinder controller).

Figure 29:
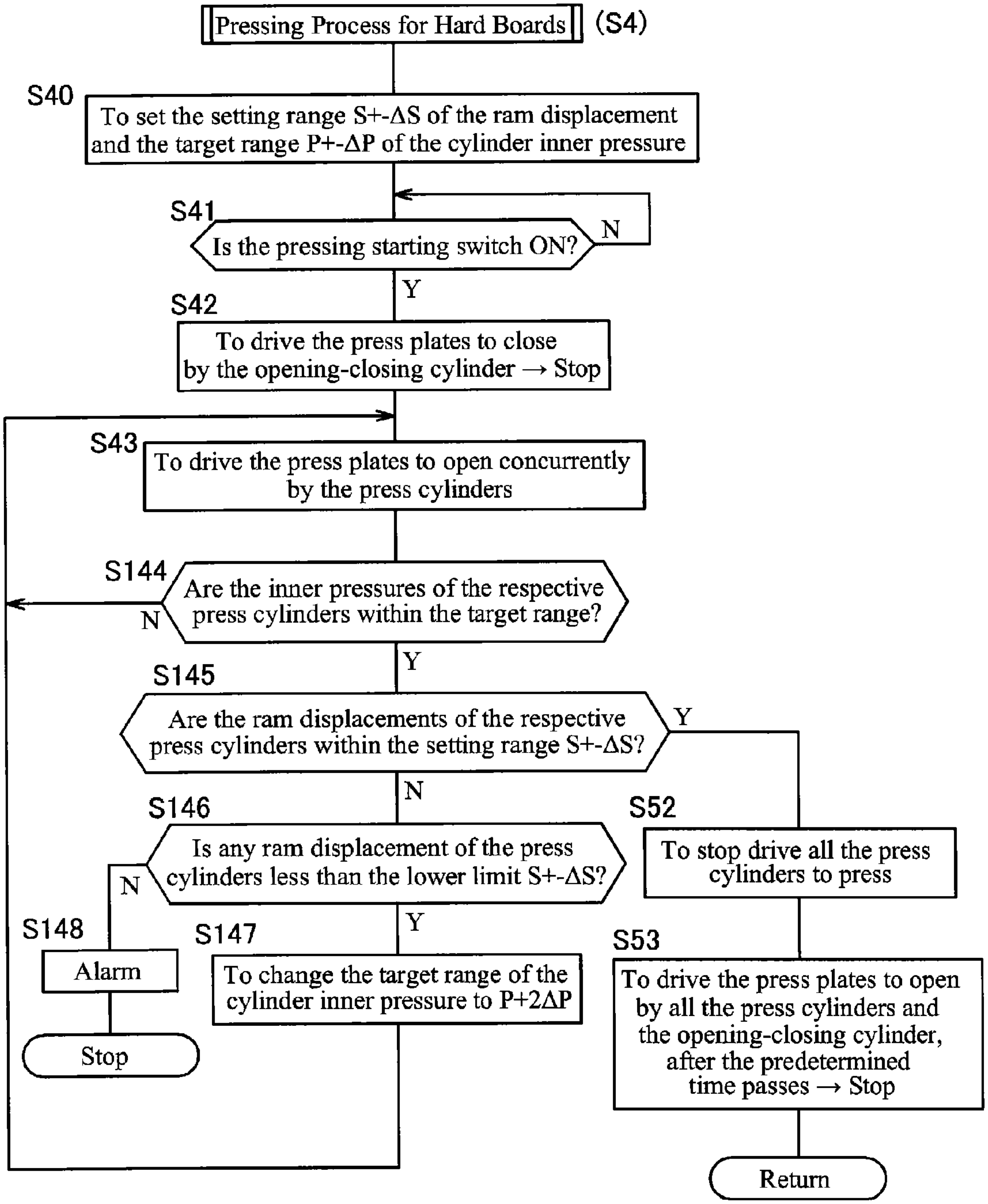
FIG. 29 is a flow chart showing a subroutine of the pressing process for hard boards.
Figure 30:
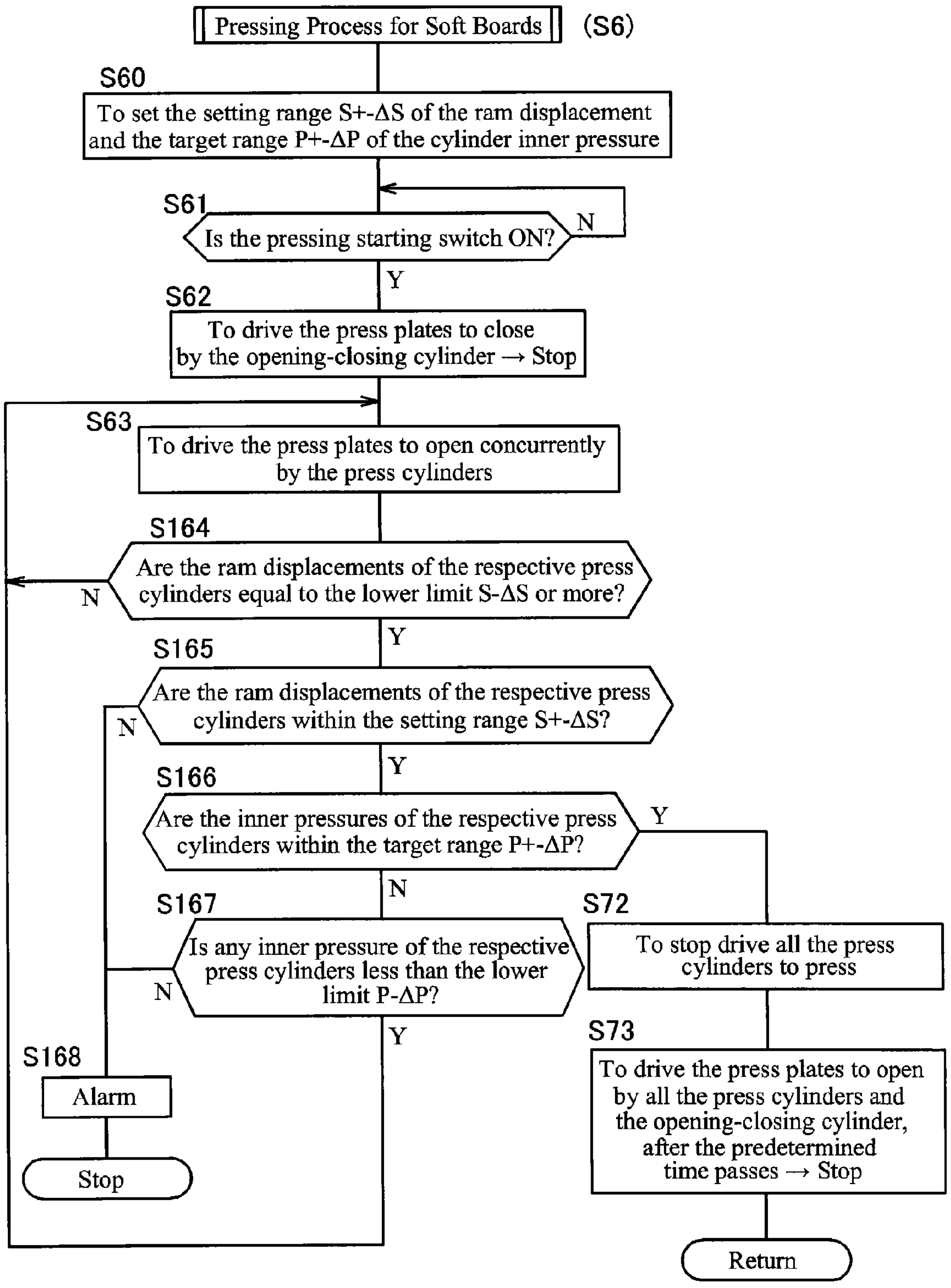
FIG. 30 is a flow chart showing a subroutine of the pressing process for soft boards.

Therefore, regarding to this embodiment, FIG. 29 shows the subroutine of the pressing process for hard boards (S4) conducted following the preliminary process for pressing (referred to FIG. 8), and FIG. 30 shows the subroutine of the pressing process for soft boards (S6).

FIG. 29 shows a subroutine of the pressing process for hard boards (S4) alternative to FIG. 9. If the boards-to-be-processed W1 are hard boards, according to the pressing pressure of the press plates 140F, 140B by the press cylinders 150LH, 150RH, 150LL, 150RL, the inner pressures of the relative cylinders are reached to the target range P+−ΔP. If any ram displacements detected then exceeds the lower limit S−ΔS of the predetermined setting range S+−ΔS, there is great possibility that inclination occurs to the boards-to-be-processed W1 (that means the press plates 140F, 140B (the pressing surfaces 141)). Therefore, in order to correct (reduce) the inclination, additional pressing is conducted by increasing the cylinder inner pressures of the press cylinders 150LH, 150RH, 150LL, 150RL within the allowable range (e.g. P+2ΔP) which is set higher than the target range P+−ΔP.

Specifically, the setting range of the ram displacement S+−ΔS (e.g. 1770+−15 mm) and the target range of the cylinder inner pressure P+−ΔP (e.g. 7.0+−0.2 MPa) are determined on S40, based on the setting value of the ram displacement S, which is finely adjusted according to size of the boards-to-be-processed W1, and the target value P of the cylinder inner pressure (referred to S2 of FIG. 8). When a pressing starting switch (not shown) is turned ON (YES on S41), the electromagnetic switching valve 183 is turned to the position b on S42, the opening-closing cylinder 180 is driven to close the press plates 140F, 140B, and then the drive is stopped by detection of the pressure switch 181. After that, on S43, the press cylinders 150LH, 150RH, 150LL, 150RL are concurrently driven to press the press plates 140F, 140B. On S144, the pressure sensors 152LH, 152RH, 152LL, 152RL determine if the inner pressures of the respective press cylinders 150LH, 150RH, 150LL, 150RL are reached to the target range P+−ΔP (e.g. 7.0+−0.2 MPa).

If the inner pressures of the respective cylinders are reached to the target range P+−ΔP as shown in FIG. 5 (YES on S44), on S145 the linear encoders 151LH, 151RH, 151LL, 151RL determine if the respective ram displacements are within the setting range S+−ΔS (1770+−15 mm here). If the respective ram displacements of the lower-lined press cylinders 150LL, 150RL are not within the setting range S+−ΔS as shown in FIG. 5 (No to S145), next it is determined if any ram displacements are below the lower limit S−ΔS (1755 mm here) of the setting range S+−ΔS on S146. Regarding FIG. 5, if any ram displacements of the lower-lined press cylinders 150LL, 150RL are below the lower limit S−ΔS (YES on S146), there is great possibility that inclination occurs to the boards-to-be-processed W1 (that means the press plates 140F, 140B (the pressing surfaces 141)) and that the boards-to-be-processed W1 still can afford further pressing. Therefore, in order to correct (reduce) the inclination, the target range of the cylinder inner pressure is changed (increased) to P+2ΔP (7.4 MPa here) on S147, and then returning to S43, the pressing continues.

In this way, when the respective ram displacements turn within the setting range S+−ΔS by continuous drive of pressing, or being within the setting value initially (YES on S145), it is determined that the inclination has been corrected (reduced), or there is no inclination, and then drive of all the press cylinders 150LH, 150RH, 150LL, 150RL is stopped to press on S52. Further on S53, the electromagnetic switching valves 155, 183 are turned to the position c after a predetermined time passed (e.g. after 10 seconds), the press plates 140F, 140B are driven to open by the all the press cylinder 150LH, 150RH, 150LL, 150RL and the opening-closing cylinder 180, and the drive is stopped by detection of the pressure switch 181, so as to complete the pressing process for hard boards. Further, when any ram displacements exceed the upper limit S+ΔS (NO on S146), alarm is set off so as to terminate the process on S 148, because of large possibility of irregular products.

Regarding hard boards being hard and having relatively high elasticity and repulsive force such as zelkova, lauan or the like, the press plates 140F, 140B can be inclined easily due to bounce (spring-back) phenomenon. Therefore, firstly the respective cylinder inner pressures are reached to the target range P+−ΔP, and then it is determined (assumed) if the press plates 140F, 140B are inclined or not, and if continuous pressing (increasing pressure) is possible or not, from the ram displacements at that time. If it is determined that "there is inclination" and "continuous pressing is possible", the inclination is corrected (reduced) by further increasing the cylinder inner pressures within the allowable range P+2ΔP. In this way, drive of the press cylinders 150LH, 150RH, 150LL, 150RL is controlled individually focusing on the pressures. Even when the press plates 140F, 140B are inclined especially due to bounce phenomenon of the hard boards, the inclination of the press plates 140F, 140B can be corrected (reduced) on the process of finishing the object-to-be-processed W (the boards-to-be-processed W1+the hot plates 130) to have the entire thickness of a predetermined allowable size, so as to suppress occurrence of irregular products, and improve production yield.

FIG. 30 shows a subroutine of the pressing process for soft boards (S6) alternative to FIG. 10. If the boards-to-be-processed W1 are soft boards, according the pressing pressure of the press plates 140F, 140 by the press cylinders 150LH, 150RH, 150LL, 150RL, the respective ram displacement are reached to the lower limit S−ΔS of the setting range S+−ΔS.

At that time, if any cylinder inner pressures are below the lower limit P−ΔP of the predetermined target range P+−ΔP, there is possibility that inclination occurs to the boards-to-be-processed W1 (that means the press plates 140F, 140B (the pressing surfaces 141)). Therefore, in order to correct (reduce) the inclination, additional pressing is conducted having the ram displacement within the setting range S+−ΔS.

Specifically, the setting range of the ram displacement S+−ΔS (e.g. 1770+−20 mm) and the target range of the cylinder inner pressure P+−ΔP (e.g. 7.0+−0.2 MPa) are determined on S60, based on a setting value of the ram displacement S, which is finely adjusted according to size of the boards-to-be-processed W1, and the target value P of the cylinder inner pressure (referred to S2 of FIG. 8). When a pressing starting switch (not shown) is turned ON (YES on S61), the electromagnetic switching valve 183 is turned to the position b on S42, the opening-closing cylinder is driven to close the press plates 140F, 140B, and then the drive is stopped by detection of the pressure switch 181. After that, on S63, the press cylinders 150LH, 150RH, 150LL, 150RL are concurrently driven to press the press plates 140F, 140B. On S164, the linear encoders 151LH, 151RH, 151LL, 151RL confirm if displacements of the respective ram 153LH, 153RH, 153LL, 153RL are reached to the lower limit S−ΔS (1750 mm here) of the setting range S+−ΔS.

If the respective ram displacements are reached to the lower limit S−ΔS of the setting range S+−ΔS as shown in FIG. 5 (YES on S164), on S165 it is re-determined if the respective ram displacements are within the setting range S+−ΔS (1770+−20 mm). As shown on FIG. 5, If the respective ram displacements are within the setting range S+−ΔS as shown on FIG. 5 (YES on S165), and then the pressure sensors 152LH, 152RH, 152LL, 152RL determine if the respective cylinder inner pressures are reached within the target range P+−ΔP (7.5+−0.2 MPa here) on S166. As shown on FIG. 5, all the cylinder pressures are out of the target range P+−ΔP (NO on S166), and next on S167 it is determined if any cylinder inner pressure is below the lower limit P−ΔP (7.3 MPa here) of the target range P+−ΔP. Regarding FIG. 5, when the ram displacements of the lower-lined press cylinders 150LL, 150RL are equal to the lower limit S−ΔS (YES on S164) and all the cylinder inner pressures are below the lower limit P−ΔP (YES on S167), there is great possibility that inclination occurs to the boards-to-be-processed W1 (that means the press plates 140F, 140B (the pressing surfaces 141)) and that the boards-to-be-processed W1 can still afford further pressing. Therefore, in order to correct (reduce) the inclination, returning to S63, the pressing continues.

In this way, when the respective ram displacements are within the setting range S+−ΔS (YES on S165) and the cylinder inner pressures are within the target range P+−ΔP by continuous pressing (YES on S166), it is determined that the inclination was corrected (reduced), and then drive of all the press cylinders 150LH, 150RH, 150LL, 150RL is stopped pressing on S72. Further on S73, the electromagnetic switching valves 155, 183 are turned to the position c after a predetermined time passed (e.g. after 10 seconds), the press plates 140F, 140B are driven to open by the all the press cylinder 150LH, 150RH, 150LL, 150RL and the opening-closing cylinder 180, and the drive is stopped by detection of the pressure switch 181, so as to complete the pressing process for soft boards. Further, when any ram displacements are above the upper limit S+ΔS (NO on S165), or any cylinder inner pressure exceeds the upper limit P+ΔP (NO on S167), alarm is set off so as to terminate the process on S168, because of large possibility of irregular products.

Regarding soft boards being soft and having low elasticity and repulsive force such as cedar, paulownia or the like, its thickness can be easily decreased by pressing, and when the cylinder inner pressures exceed the target range P+−ΔP even slightly, the thickness after hot-pressing can be easily decreased partially (especially at the cylinder pressing positions) more than specified. Therefore, firstly the respective ram displacements are reached to the lower limit S−ΔS of the setting range S+−ΔS, and then it is determined (assumed) if the press plates 140F, 140B are inclined or not, and if continuous pressing (increasing pressure) is possible or not, from the respective cylinder inner pressures at that time. If it is determined that "there is inclination" and "continuous pressing is possible", the inclination is corrected (reduced) by continuing to drive pressing having the ram displacements within the setting range S+−ΔS. In this way, drive of the press cylinders 150LH, 150RH, 150LL, 150RL is controlled jointly focusing on distance. While suppressing (controlling) occurrence of the excessive pressing especially to the soft boards, the inclination of the press plates 140F, 140B can be corrected (reduced) on the process of finishing the object-to-be-processed W (the boards-to-be-processed W1+the hot plates 130) to have the entire thickness of a predetermined allowable size, so as to suppress occurrence of irregular products, and improve production yield.

As explained above, regarding this embodiment, operations of the respective press cylinders 150LH, 150RH, 150LL, 150RL are not controlled individually (controlled jointly), and thus the entire configuration of the press control system is further simplified form the embodiment 1 (FIGS. 5 to 10). Also, even when inclination occurs to the boards-to-be-processed W1 (that means the press plates 140F, 140B (the pressing surfaces 141)) during hot-pressing, the inclination can be resolved, while controlling drive of the press cylinders 150LH, 150RH, 150LL, 150RL jointly, by controlling at least one of the ram displacements or the cylinder inner pressures.

Modified Example 5

Figure 31:
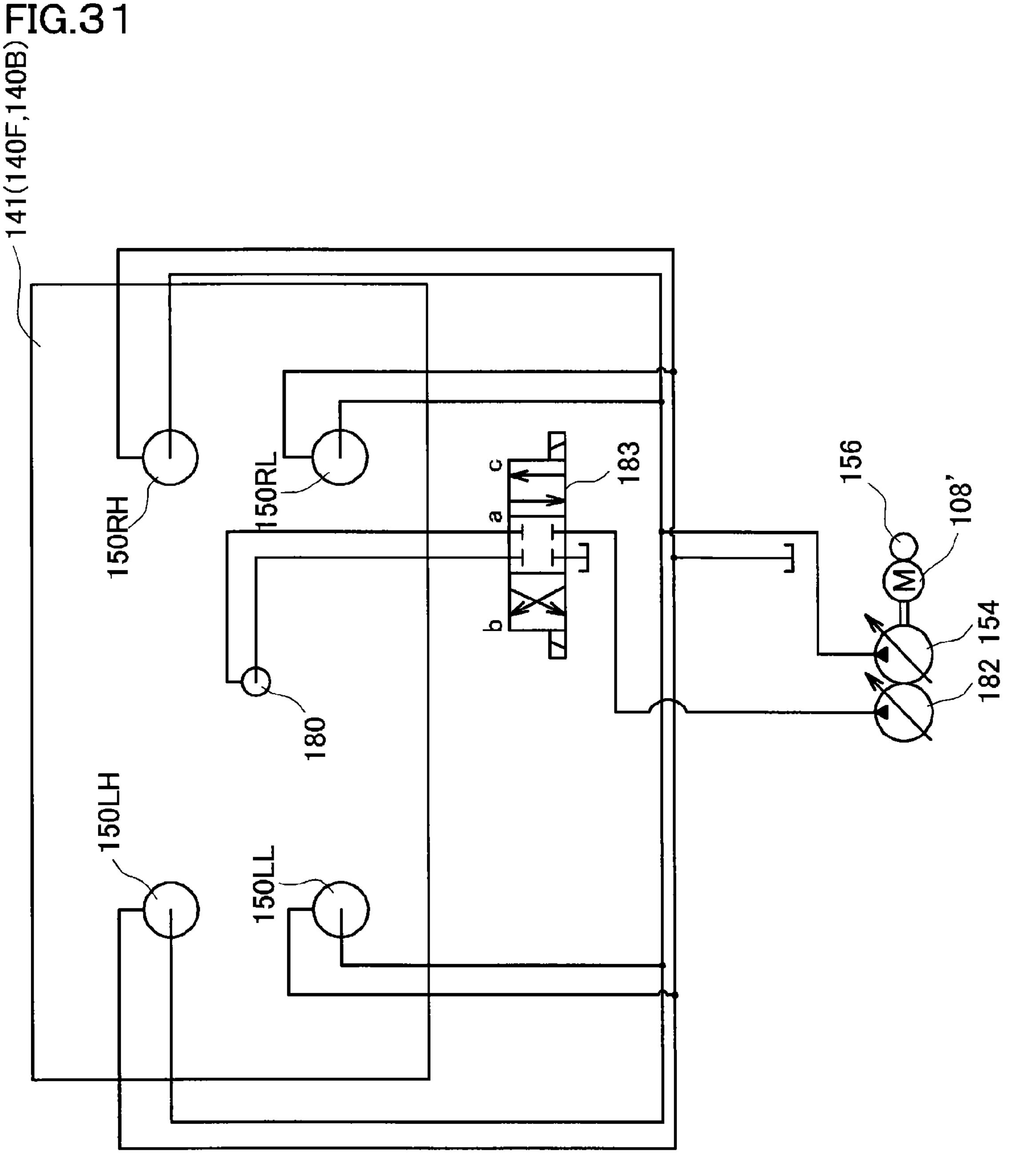
FIG. 31 is a hydraulic circuit diagram showing a modified example of FIG. 27.

FIG. 31 is a hydraulic circuit diagram showing a modified example of FIG. 27. A servo motor 108' is used for the electric motor shown on FIG. 31, which connects and drive an additional feature (servo feature) of controlling to feedback the final controlled position (the driven distance=the ram displacement) by controlling the rotational direction and the rotational frequency, based on the input signals. Also, the servo motor 108' comprises a rotary encoder 156 which detects the rotational direction and the rotational frequency. In this way, the servo feature is driven by the servo motor 108, then the electromagnetic switching valve 155 and the linear encoders 151LH, 151RH, 151LL, 151RL of FIG. 27 are not required on FIG. 31, and thus the hydraulic pressure circuit can be simplified. Also, the servo motor 108' has a function of controlling the rotational frequency (flow speed), and then the ram displacements and the ram shifting speeds of the press cylinders 150LH, 150RH, 150LL, 150RL when the object-to-be-processed W can be controlled compositively during hot-pressing so that further precise control is possible.

Embodiment 6

Figure 32:
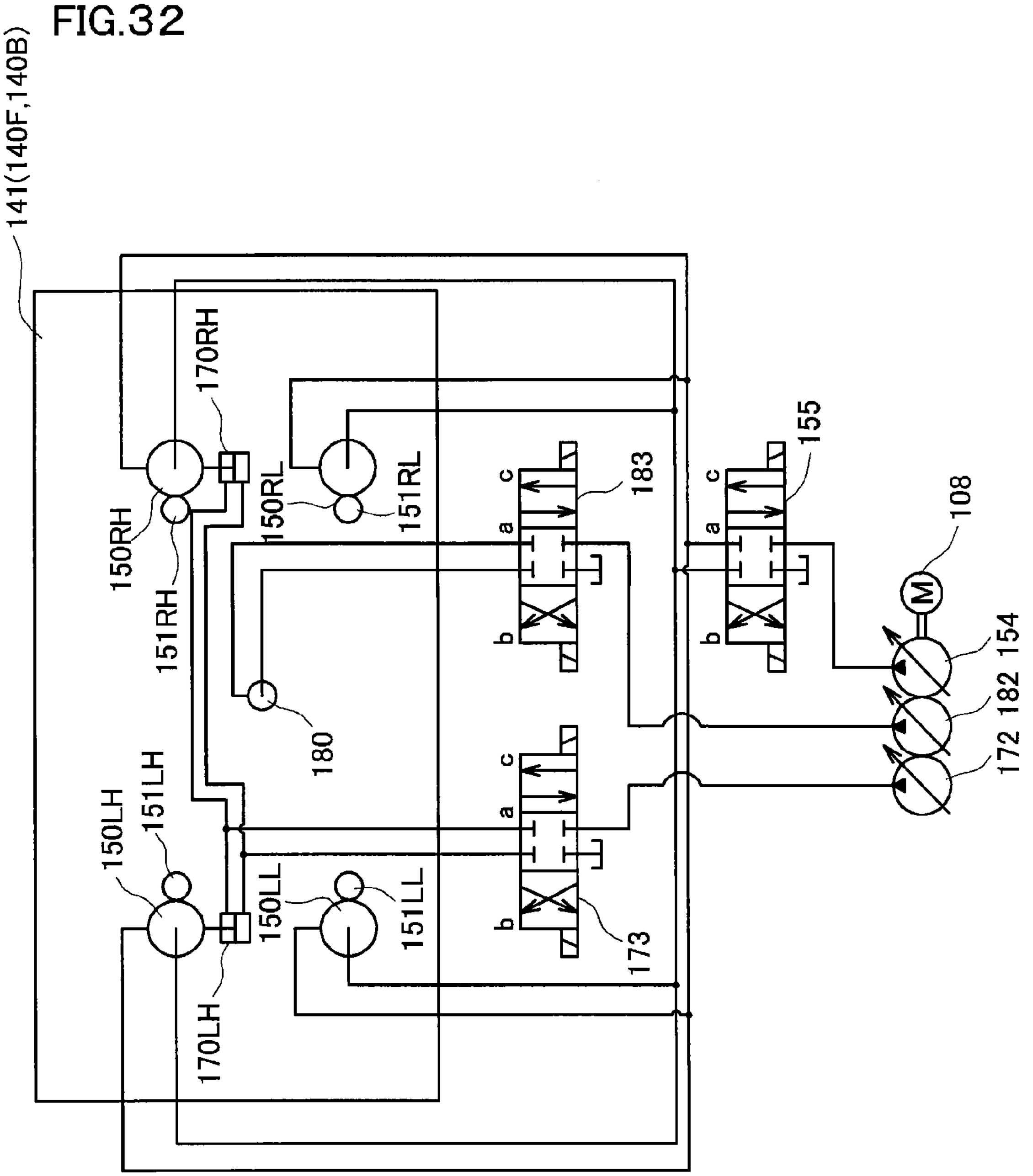
FIG. 32 is a hydraulic circuit diagram showing yet another example of the press control system.
Figure 33:
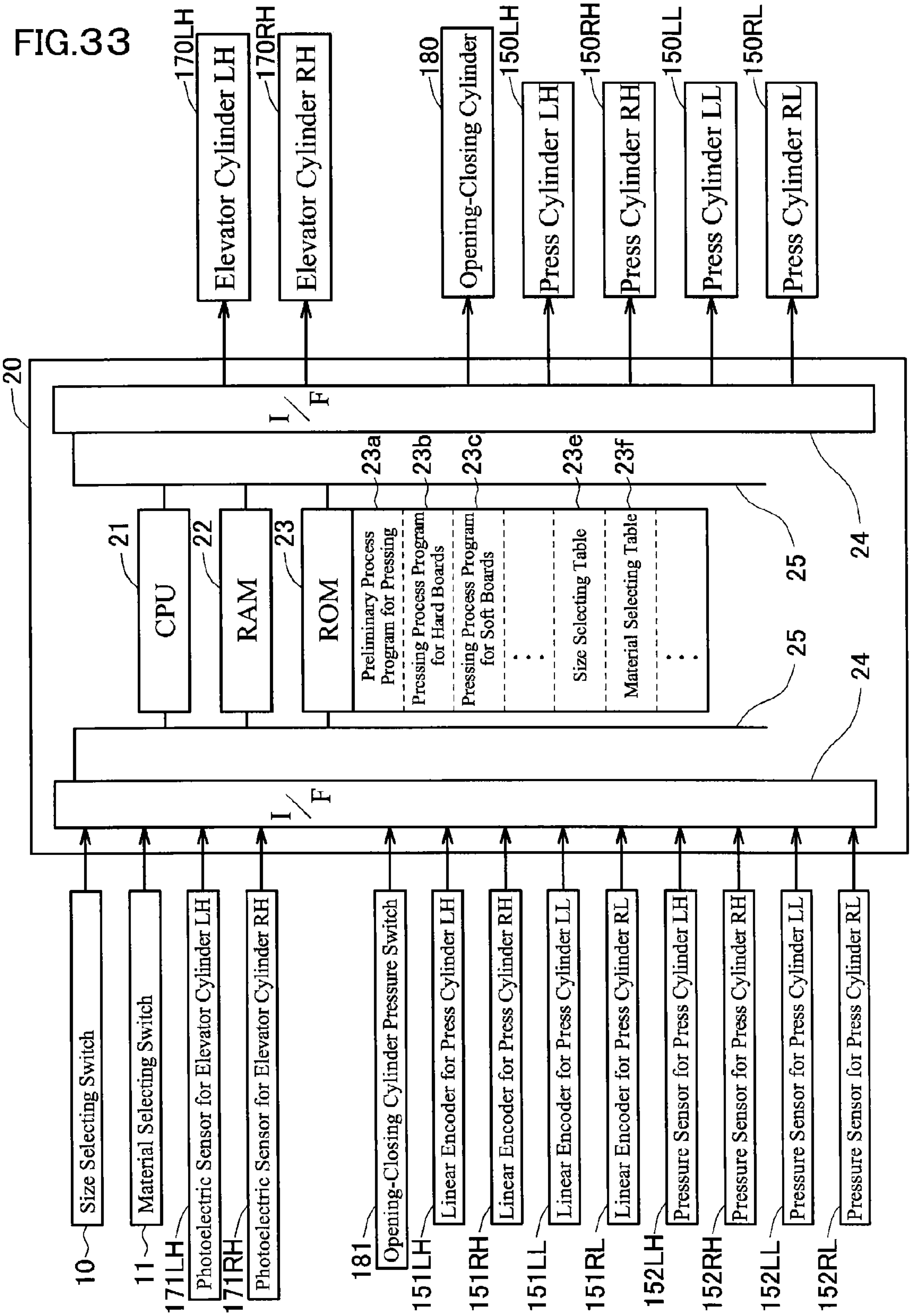
FIG. 33 is a block diagram showing an electrical configuration of FIG. 32.

FIG. 32 is a hydraulic circuit diagram showing yet another example of the press control system, and FIG. 33 is a block diagram showing an electrical configuration thereof. The press control system shown for this embodiment employs a method of controlling drive of a plurality (e.g. four) of the press cylinders jointly (mutually) instead of individually (respectively), and the alignment relation is similar to the embodiment 2 (FIG. 14).

However, regarding the hydraulic circuit diagram of FIG. 32, unlike the embodiment 2 (FIG. 15), an electromagnetic switching valve 155, which is a 4-port and 3-position switching type, is disposed between a press cylinder hydraulic pressure pump 154, which is a variable capacity type driven by an electrical motor 108, and the respective press cylinders 150LH, 150RH, 150LL, 150RL (hydraulic cylinders; fluid pressure cylinders). The electromagnetic switching valve 155 connects the hydraulic pump 154 and the press cylinders 150LH, 150RH, 150LL, 150RL to a closing direction of the press plates 140F, 140B when switched from the neutral position a to the position b, and connects to a opening direction of the press plates 140F, 140B when switched to the position c. Also, regarding the block diagram of FIG. 33, unlike the embodiment 2 (FIG. 16), a inclination calculating program is omitted for the ROM 23 of the control board 20 (cylinder controller).

Accordingly for this embodiment, following the preliminary process for pressing (referred to FIG. 17) a subroutine of the pressing process for hard boards (S4) is shown a FIG. 29, and a subroutine of the pressing process for soft boards (S6) is shown a FIG. 30.

As explained above, regarding this embodiment, operations of the respective press cylinders 150LH, 150RH, 150LL, 150RL are not controlled individually (controlled jointly), and thus the entire configuration of the press control system is further simplified form the embodiment 2 (FIGS. 14 to 17). Also, similar to the embodiment 5 (FIGS. 27 to 30) even when inclination occurs to the boards-to-be-processed W1 (that means the press plates 140F, 140B (the pressing surfaces 141)) during hot-pressing, the inclination can be resolved, while controlling drive of the press cylinders 150LH, 150RH, 150LL, 150RL jointly by controlling at least one of the ram displacements or the cylinder inner pressures.

Modified Example 6

Figure 34:
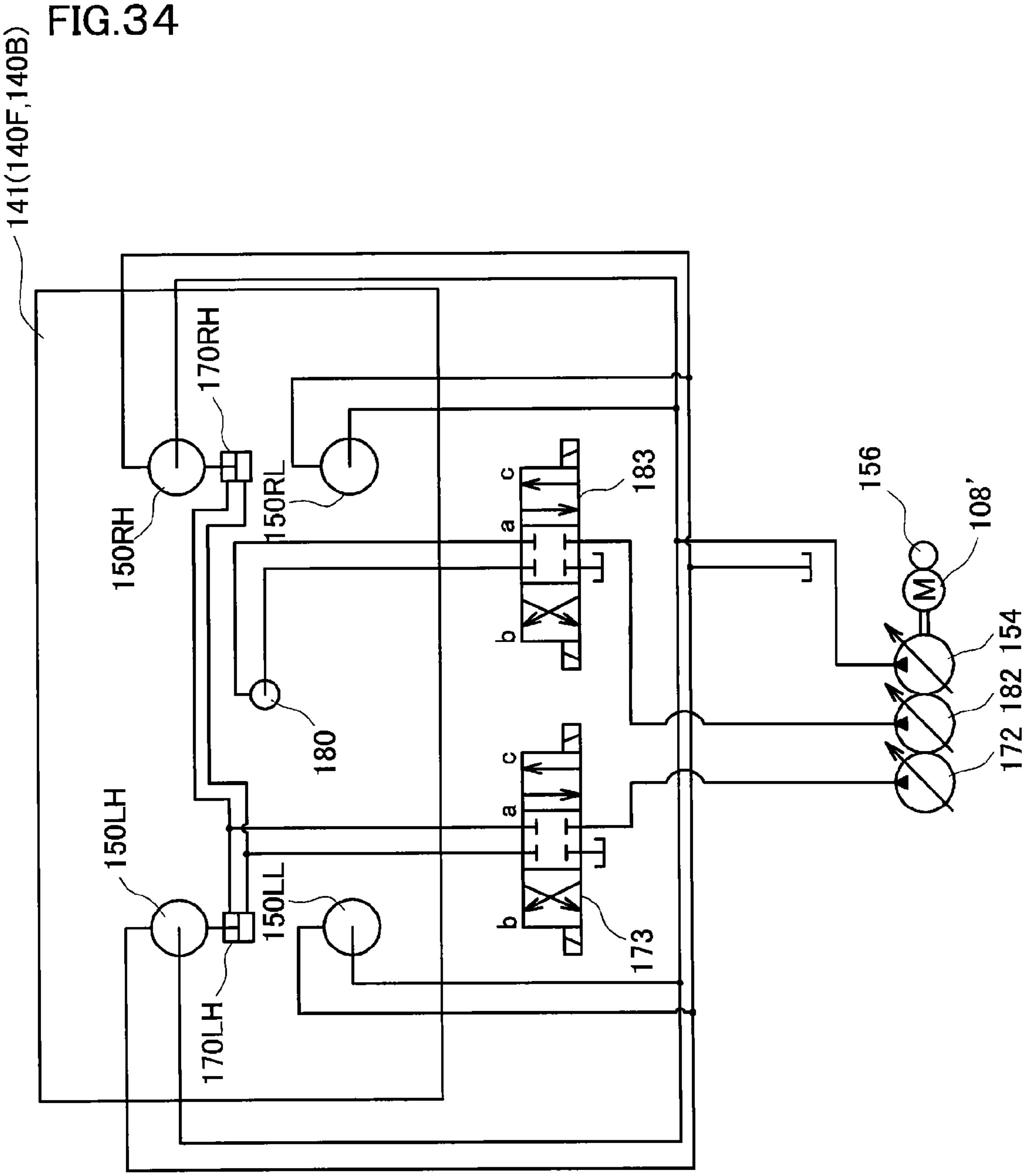
FIG. 34 is a hydraulic circuit diagram showing a modified example of FIG. 32.

FIG. 34 is a hydraulic circuit diagram showing a modified example of FIG. 22. Similarly to the modified example 5 (FIG. 31), a servo motor is used for the electric motor shown on FIG. 34, and provided with a rotary encoder 156. Accordingly, this modified example can also simplify the hydraulic pressure circuit and allow further precise control.

EXPLANATION OF REFERENCES

1 Horizontal hotpress system
10 Size selecting switch
11 Material selecting switch
20 Control board (Cylinder controller)
100 Hotpress (Hot-pressing member; Press structure)
103F, 103B Fixed frame
130 Hot plate
140F, 140B Press plate
141 Pressing surface
150LH, 150RH, 150LL, 150RL Press cylinder (Hydraulic cylinder; Fluid pressure cylinder)
151LH, 151RH, 151LL, 151RL Linear encoders for press cylinders (Displacement detecting means; Distance detecting means)
152LH, 152RH, 152LL, 152RL Pressure sensors for press cylinders (Pressure detecting means)
153LH, 153RH, 153LL, 153RL Ram
170LH, 170RH, 170LL, 170RL Elevator cylinders (Hydraulic cylinders; Fluid pressure cylinders)
171LH, 171RH, 171LL, 171RL Photoelectric sensors for elevator cylinders (Shift detecting means)
180 Opening-closing cylinder (Hydraulic cylinder; Fluid pressure cylinder)
181 Opening-closing cylinder pressure switch (pressure detecting means)
B Conveying reference plane
P Target value of the cylinder inner pressure (driven pressure)
S Setting value of the ram displacement (driven distance)
W Object-to-be-processed
W1 Boards-to-be-processed (boards)
W2 Processed boards (laminated boards)

What is claimed is:

1. A horizontal hotpress system manufacturing a plurality of wooden laminated boards all at once, by
- constructing an object-to-be-processed by sending stacked boards of veneers applied adhesive on bonding surfaces respectively in a standing position between a plurality of hot plates, so as to be superposed in a thickness direction, and
- hot-pressing the boards by pressing from outside in a superposition direction of the object-to-be-processed,
- and further comprising;
  - a plurality of press cylinders disposed at a plurality of positions different from each other to board surfaces of the boards, and pressing the object-to-be-processed from a superposition direction individually; and
  - a cylinder controller of controlling each drive of a plurality of the press cylinders individually.

2. A horizontal hotpress system manufacturing a plurality of wooden laminated boards all at once, by
- constructing an object-to-be-processed by sending stacked rectangular boards, having a longer side thereof as a conveying reference plane, of veneers applied adhesive on bonding surfaces respectively in a standing position between a plurality of hot plates disposed, so as to be superposed in a thickness direction, and
- hot-pressing the boards by driving at least one of press plates disposed on both outer sides in a superposition direction of the object-to-be-processed,
- and further comprising;
  - a opening-closing cylinder disposed near center on pressing surfaces of the press plates, and opening and closing the press plates according to moving away and closer to each other thereof;
  - a plurality of press cylinders disposed at a plurality of positions different from each other to the pressing surfaces of the press plates in order to surround the opening-closing cylinder, and pressing the object-to-be-processed from a superposition direction individually by driving the press plates; and
  - a cylinder controller of controlling each drive of a plurality of the press cylinders individually.

3. The horizontal hotpress system as claimed in claim 1, wherein,
- the cylinder controller comprises;
  - distance detecting means of detecting driven distances respectively when a plurality of the press cylinders press the object-to-be-processed; and
  - pressure detecting means of detecting driven pressures applied to a plurality of the press cylinders respectively, and
- desirably controlling drive of the respective press cylinders individually so as to closely achieve equal driven distances of the respective press cylinders detected by the distance detecting means without unevenness within a predetermined setting range, in order to have thickness of the object-to-be-processed within the allowable size range after hot-pressing.

4. The horizontal hotpress system as claimed in claim 3, wherein, the cylinder controller can stop drive of pressing of a plurality of the press cylinders, when the driven pressures of the respective press cylinder are reached to a predetermined target range along drive of pressing of a plurality of the press cylinder, if the driven distances of the respective press cylinders detected by the distance detecting means are within the setting range, and also being within an even range regarded as even without unevenness.

5. The horizontal hotpress system as claimed in claim 4, wherein, it can be determined if driven distances of the press cylinders are within the even range or not, by difference level of the driven distances of the respective press cylinders detected by the distance detecting means, or inclination level of the boards calculated with the detected values of the driven distances.

6. The horizontal hotpress system as claimed in claim 3, wherein, the cylinder controller can stop drive for pressing a plurality of the press cylinders, when the driven pressures of the respective press cylinder are reached to a predetermined target range along drive for pressing a plurality of the press cylinder, if the driven distances of the respective press cylinders detected by the distance detecting means are within the predetermined setting range, and also being within an even range regarded as even without unevenness, whereas, when any driven distances of the press cylinders are not within the even range, the driven pressure of the corresponding press cylinder can be increased or decreased by reducing an upper limit or raising a lower limit of the target range of the driven pressure of the press cylinder.

7. The horizontal hotpress system as claimed in claim 6, wherein, it can be determined if driven distances of the press cylinders are within the even range or not, by difference level of the driven distances of the respective press cylinders detected by the distance detecting means, or inclination level of the boards calculated with the detected values of the driven distances.

8. The horizontal hotpress system as claimed in claim 3, wherein, the cylinder controller can stop drive of pressing of a plurality of the press cylinders, when the driven distances of the respective press cylinder are reached to the setting range along drive of pressing of a plurality of the press cylinder, if the driven pressures of the respective press cylinders detected by the pressure detecting means are within a predetermined target range, and also being within an even range regarded as even without unevenness.

9. The horizontal hotpress system as claimed in claim 8, wherein, it can be determined if driven distances of the press cylinders are within the even range or not, by difference level of the driven distances of the respective press cylinders detected by the distance detecting means, or inclination level of the boards calculated with the detected values of the driven distances.

10. The horizontal hotpress system as claimed in claim 3, wherein, the cylinder controller can stop drive of pressing of a plurality of the press cylinders, when the driven distances of the respective press cylinder are reached to a lower limit of the setting range along drive of pressing of a plurality of the press cylinder, if the driven pressures of the respective press cylinders detected by the pressure detecting means are equal to a upper limit of a predetermined target range or less, and also being within an even range regarded as even without unevenness, whereas, when any driven distances of the press cylinders are not within the even range, if the driven distance of the corresponding press cylinder is equal to the upper limit of the predetermined setting range or less, the driven pressure can be increased.

11. The horizontal hotpress system as claimed in claim 10, wherein, it can be determined if driven distances of the press cylinders are within the even range or not, by difference level of the driven distances of the respective press cylinders detected by the distance detecting means, or inclination level of the boards calculated with the detected values of the driven distances.

12. A horizontal hotpress system manufacturing a plurality of wooden laminated boards all at once, by constructing an object-to-be-processed by sending stacked rectangular boards, having a longer side thereof as a conveying reference plane, of veneers applied adhesive on bonding surfaces respectively in a standing position between a plurality of hot plates disposed, so as to be superposed in a thickness direction, and hot-pressing the boards by pressing from outside in a superposition direction of the object-to-be-processed, and further comprising;

a plurality of press cylinders disposed at a plurality of positions different from each other to board surfaces of the boards, and pressing the object-to-be-processed from a superposition direction individually; and a cylinder controller of controlling each drive of a plurality of the press cylinders individually or jointly, wherein surfaces of the boards.

a plurality of the press cylinders may include;

a plurality of fixed press cylinders disposed in an area closer to the conveying reference plane, also having fixed pressing positions to board surfaces of the boards; and a plurality of mobile press cylinders disposed in an area farther from the conveying reference plane, also having pressing positions to board surfaces of the boards being shiftable to the fixed pressing positions of the fixed press cylinders.

13. A horizontal hotpress system manufacturing a plurality of wooden laminated boards all at once, by constructing an object-to-be-processed by sending stacked rectangular boards, having a longer side thereof as a conveying reference plane, of veneers applied adhesive on bonding surfaces respectively in a standing position between a plurality of hot plates disposed, so as to be superposed in a thickness direction, and hot-pressing the boards by driving at least one of press plates disposed on both outer sides in a superposition direction of the object-to-be-processed, and further comprising;

an opening-closing cylinder disposed near center on pressing surfaces of the press plates, opening and closing the press plates according to moving away and closer to each other thereof;

a plurality of press cylinders disposed at a plurality of positions different from each other to the pressing surfaces of the press plates in order to surround the opening-closing cylinder, and pressing the object-to-be-processed from a superposition direction individually by driving the press plates; and a cylinder controller of controlling each drive of a plurality of the press cylinders individually or jointly, wherein a plurality of the press cylinders may include;

a plurality of fixed press cylinders disposed in an area closer to the conveying reference plane, also having fixed pressing positions to board surfaces of the boards; and a plurality of mobile press cylinders disposed in an area farther from the conveying reference plane, also having pressing positions to board surfaces of the boards being shiftable to the fixed pressing positions of the fixed press cylinders.

14. The horizontal hotpress system as claimed in claim 2, wherein, the cylinder controller comprises;

distance detecting means of detecting driven distances respectively when a plurality of the press cylinders press the object-to-be-processed; and pressure detecting means of detecting driven pressures applied to a plurality of the press cylinders respectively, and desirably controlling drive of the respective press cylinders individually so as to closely achieve equal driven distances of the respective press cylinders detected by the distance detecting means without unevenness within a predetermined setting range, in order to have thickness of the object-to-be-processed within the allowable size range after hot-pressing.

15. The horizontal hotpress system as claimed in claim 14, wherein, the cylinder controller can stop drive of pressing of a plurality of the press cylinders, when the driven pressures of the respective press cylinder are reached to a predetermined target range along drive of pressing of a plurality of the press cylinder, if the driven distances of the respective press cylinders detected by the distance detecting means are within the setting range, and also being within an even range regarded as even without unevenness.

16. The horizontal hotpress system as claimed in claim 15, wherein, it can be determined if driven distances of the press cylinders are within the even range or not, by difference level of the driven distances of the respective press cylinders detected by the distance detecting means, or inclination level of the boards calculated with the detected values of the driven distances.

17. The horizontal hotpress system as claimed in claim 14, wherein, the cylinder controller can stop drive for pressing a plurality of the press cylinders, when the driven pressures of the respective press cylinder are reached to a predetermined target range along drive for pressing a plurality of the press cylinder, if the driven distances of the respective press cylinders detected by the distance detecting means are within the predetermined setting range, and also being within an even range regarded as even without unevenness, whereas, when any driven distances of the press cylinders are not within the even range, the driven pressure of the corresponding press cylinder can be increased or decreased by reducing an upper limit or raising a lower limit of the target range of the driven pressure of the press cylinder.

18. The horizontal hotpress system as claimed in claim 17, wherein, it can be determined if driven distances of the press cylinders are within the even range or not, by difference level of the driven distances of the respective press cylinders detected by the distance detecting means, or inclination level of the boards calculated with the detected values of the driven distances.

19. The horizontal hotpress system as claimed in claim 14, wherein, the cylinder controller can stop drive of pressing of a plurality of the press cylinders, when the driven distances of the respective press cylinder are reached to the setting range along drive of pressing of a plurality of the press cylinder, if the driven pressures of the respective press cylinders detected by the pressure detecting means are within a predetermined target range, and also being within an even range regarded as even without unevenness.

20. The horizontal hotpress system as claimed in claim 19, wherein, it can be determined if driven distances of the press cylinders are within the even range or not, by difference level of the driven distances of the respective press cylinders detected by the distance detecting means, or inclination level of the boards calculated with the detected values of the driven distances.

21. The horizontal hotpress system as claimed in claim 14, wherein, the cylinder controller can stop drive of pressing of a plurality of the press cylinders, when the driven distances of the respective press cylinder are reached to a lower limit of the setting range along drive of pressing of a plurality of the press cylinder, if the driven pressures of the respective press cylinders detected by the pressure detecting means are equal to a upper limit of a predetermined target range or less, and also being within an even range regarded as even without unevenness, whereas, when any driven distances of the press cylinders are not within the even range, if the driven distance of the corresponding press cylinder is equal to the upper limit of the predetermined setting range or less, the driven pressure can be increased.

22. The horizontal hotpress system as claimed in claim 21, wherein, it can be determined if driven distances of the press cylinders are within the even range or not, by difference level of the driven distances of the respective press cylinders detected by the distance detecting means, or inclination level of the boards calculated with the detected values of the driven distances.

* * * * *